US012623328B2

(12) United States Patent
Duncan et al.

(10) Patent No.: US 12,623,328 B2
(45) Date of Patent: May 12, 2026

(54) POWER TOOL

(71) Applicant: MILWAUKEE ELECTRIC TOOL CORPORATION, Brookfield, WI (US)

(72) Inventors: Ian Duncan, Colgate, WI (US); Ryan A. Dedrickson, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/815,168

(22) Filed: Aug. 26, 2024

(65) Prior Publication Data

US 2024/0416495 A1 Dec. 19, 2024

Related U.S. Application Data

(63) Continuation of application No. 17/894,210, filed on Aug. 24, 2022, now Pat. No. 12,083,661, which is a (Continued)

(51) Int. Cl.
*B25D 16/00* (2006.01)
*B25D 17/04* (2006.01)

(52) U.S. Cl.
CPC ......... *B25D 16/006* (2013.01); *B25D 16/003* (2013.01); *B25D 17/043* (2013.01);

(Continued)

(58) Field of Classification Search
CPC .. B25D 16/006; B25D 16/003; B25D 17/043; B25D 2216/0023; B25D 2216/0069;

(Continued)

(56) References Cited

U.S. PATENT DOCUMENTS 2,835,497 A * 5/1958 Suhner ................ B23B 31/2072 279/42
3,020,789 A 2/1962 Etzkorn (Continued)

FOREIGN PATENT DOCUMENTS

DE 2436503 2/1976
DE 4038502 6/1992

(Continued)

OTHER PUBLICATIONS

International Preliminary Report on Patentability for Application No. PCT/US2018/031017 dated Nov. 5, 2019 (17 pages).

(Continued)

*Primary Examiner* — Michelle Lopez
(74) *Attorney, Agent, or Firm* — Michael Best & Friedrich LLP

(57) ABSTRACT

A power tool includes a drive mechanism including an electric motor, a housing, and a spindle rotatable about a longitudinal axis in response to the drive mechanism. The power tool further includes a lockout mechanism including a plurality of detents asymmetrically positioned around the longitudinal axis, where each of the detents are movable between a locking position and an unlocking position. The power tool also includes a collar rotatably coupled to the housing, the collar including a plurality of recesses asymmetrically positioned around the longitudinal axis, wherein in the unlocking position, each of the detents is received in one of the recesses and the spindle is axially movable within the housing, and wherein in the locking position, at least one of the detents is not received in one of the recesses and axial movement of the spindle is prevented by the lockout mechanism.

20 Claims, 29 Drawing Sheets

Related U.S. Application Data continuation of application No. 17/482,041, filed on Sep. 22, 2021, now Pat. No. 11,426,852, which is a continuation of application No. 16/922,110, filed on Jul. 7, 2020, now Pat. No. 11,583,988, which is a continuation of application No. 15/971,007, filed on May 4, 2018, now Pat. No. 10,737,373.

(60) Provisional application No. 62/531,054, filed on Jul. 11, 2017, provisional application No. 62/501,962, filed on May 5, 2017.

(52) U.S. Cl.
CPC ................ *B25D 2216/0023* (2013.01); *B25D 2216/0038* (2013.01); *B25D 2216/0069* (2013.01); *B25D 2216/0084* (2013.01); *B25D 2250/165* (2013.01); *B25D 2250/221* (2013.01)

(58) Field of Classification Search
CPC ...... B25D 2216/0084; B25D 2250/165; B25D 2250/221
See application file for complete search history.

(56) References Cited

U.S. PATENT DOCUMENTS

| | | | | |
|---|---|---|---|---|
| 3,187,865 | A | 6/1965 | Blachowski | |
| 3,511,321 | A | 5/1970 | Schnettler | |
| 3,834,252 | A | 9/1974 | Abell et al. | |
| 4,273,344 | A * | 6/1981 | Benson | B23B 31/1071 408/226 |
| 5,356,350 | A | 10/1994 | Schreiber | |
| 5,451,127 | A | 9/1995 | Chung | |
| 5,458,206 | A | 10/1995 | Bourner et al. | |
| 5,505,271 | A | 4/1996 | Bourner | |
| 5,704,433 | A | 1/1998 | Bourner et al. | |
| 5,738,177 | A | 4/1998 | Schell et al. | |
| 6,213,222 | B1 | 4/2001 | Banach | |
| 6,406,197 | B1 | 6/2002 | Okuda et al. | |
| RE37,905 | E | 11/2002 | Bourner et al. | |
| 6,502,648 | B2 | 1/2003 | Milbourne | |
| 6,595,300 | B2 | 7/2003 | Milbourne | |
| 6,676,557 | B2 | 1/2004 | Milbourne et al. | |
| 6,776,244 | B2 | 8/2004 | Milbourne | |
| 6,976,545 | B2 | 12/2005 | Greitmann | |
| 6,984,188 | B2 | 1/2006 | Potter et al. | |
| 7,000,709 | B2 | 2/2006 | Milbourne | |
| 7,101,300 | B2 | 9/2006 | Milbourne et al. | |
| 7,225,884 | B2 | 6/2007 | Aeberhard | |
| 7,314,097 | B2 | 1/2008 | Jenner et al. | |
| 7,469,753 | B2 | 12/2008 | Klemm et al. | |
| 7,658,239 | B2 | 2/2010 | Klemm et al. | |
| 7,717,191 | B2 | 5/2010 | Trautner | |
| 7,717,192 | B2 | 5/2010 | Schroeder et al. | |
| 7,762,349 | B2 | 7/2010 | Trautner et al. | |
| 7,798,245 | B2 | 9/2010 | Trautner | |
| 7,854,274 | B2 | 12/2010 | Trautner et al. | |
| 7,980,324 | B2 | 7/2011 | Bixler et al. | |
| 7,987,920 | B2 | 8/2011 | Schroeder et al. | |
| 8,205,685 | B2 | 6/2012 | Bixler et al. | |
| 8,220,561 | B2 | 7/2012 | Milbourne et al. | |
| 8,235,137 | B2 | 8/2012 | Walker et al. | |
| 8,794,348 | B2 | 8/2014 | Rudolph et al. | |
| 8,820,430 | B2 | 9/2014 | Walker et al. | |
| 9,193,055 | B2 | 11/2015 | Lim et al. | |
| 9,283,667 | B2 | 3/2016 | Zhang et al. | |
| 9,579,785 | B2 | 2/2017 | Bixler et al. | |
| 9,908,228 | B2 | 3/2018 | Elger | |
| 10,737,373 | B2 | 8/2020 | Duncan et al. | |
| 2004/0026099 | A1 | 2/2004 | Stirm | |
| 2007/0079979 | A1 * | 4/2007 | Braun | B25B 21/02 173/29 |
| 2009/0126957 | A1 | 5/2009 | Schroeder et al. | |
| 2009/0194305 | A1 | 8/2009 | Xu et al. | |
| 2012/0222879 | A1 | 9/2012 | Bixler et al. | |
| 2012/0293099 | A1 | 11/2012 | Velderman et al. | |
| 2012/0318547 | A1 | 12/2012 | Milbourne et al. | |
| 2013/0269461 | A1 | 10/2013 | Hecht et al. | |
| 2014/0110140 | A1 | 4/2014 | Elger | |
| 2016/0354888 | A1 | 12/2016 | Huber et al. | |
| 2020/0331136 | A1 | 10/2020 | Duncan et al. | |

FOREIGN PATENT DOCUMENTS

| | | | |
|---|---|---|---|
| DE | 20305853 | U1 | 9/2003 |
| DE | 102012005864 | | 4/2013 |
| EP | 1157791 | | 11/2001 |
| EP | 1681138 | | 7/2006 |
| WO | WO02058883 | | 8/2002 |
| WO | WO2008064953 | | 6/2008 |
| WO | WO2012061176 | | 5/2012 |

OTHER PUBLICATIONS

Extended European Search Report for Application No. 18794567.0 dated Feb. 4, 2021 (9 pages).
International Search Report and Written Opinion for Application No. PCT/US2018/031017 dated Sep. 5, 2018 (21 pages).

* cited by examiner

POWER TOOL

CROSS-REFERENCE TO RELATED APPLICATIONS

This application is a continuation of U.S. patent application Ser. No. 17/894,210, filed on Aug. 24, 2022, now U.S. Pat. No. 12,083,661, which is a continuation of U.S. patent application Ser. No. 17/482,041, filed on Sep. 22, 2021, now U.S. Pat. No. 11,426,852, which is a continuation of U.S. patent application Ser. No. 16/922,110, filed on Jul. 7, 2020, now U.S. Pat. No. 11,583,988, which is a continuation of U.S. patent application Ser. No. 15/971,007, filed on May 4, 2018, now U.S. Pat. No. 10,737,373, which claims priority to U.S. Provisional Patent Application No. 62/531,054, filed on Jul. 11, 2017 and U.S. Provisional Patent Application No. 62/501,962, filed on May 5, 2017, the entire contents of all of which are incorporated herein by reference.

FIELD OF THE INVENTION

The present invention relates to power tools, and more particularly to hammer drills.

BACKGROUND OF THE INVENTION

Some power tools include mode selector collars and clutch-setting selector collars to respectively select modes of operation and clutch settings for that power tool. For instance, mode selector collars are sometimes provided on hammer drills to allow an operator to cycle between "hammer drill," "drill only," and "screwdriver" modes of the hammer drill. Clutch-setting selector collars are sometimes provided on hammer drills to allow an operator to select different clutch settings while in the "screwdriver" mode of operation.

SUMMARY OF THE INVENTION

The present invention provides, in one aspect, a power tool including a drive mechanism including an electric motor, a housing enclosing at least a portion of the drive mechanism, and a spindle rotatable about a longitudinal axis in response to receiving torque from the drive mechanism. The power tool also includes a lockout mechanism including a plurality of detents asymmetrically positioned around the longitudinal axis, where each of the detents are movable between a locking position and an unlocking position. The power tool further includes a collar rotatably coupled to the housing including a plurality of recesses asymmetrically positioned around the longitudinal axis. In the unlocking position, each of the detents is received in one of the recesses and the spindle is axially movable within the housing. In the locking position, at least one of the detents is not received in one of the recesses and axial movement of the spindle along the longitudinal axis in a direction toward the drive mechanism is prevented by the lockout mechanism.

The present invention provides, in another aspect, to a power tool including a drive mechanism including an electric motor, a housing enclosing at least a portion of the drive mechanism, and a spindle rotatable about a longitudinal axis in response to receiving torque from the drive mechanism. The power tool further includes a lockout mechanism including a plurality of detents asymmetrically positioned around the longitudinal axis and a collar rotatably coupled to the housing and including a plurality of recesses asymmetrically positioned around the longitudinal axis. The collar is movable between a first rotational position, in which all the recesses are aligned with the corresponding detents, and a second rotational position in which at least one of the detents is misaligned with one of the recesses. In the first rotational position of the collar, the detents are radially displaced in response to axial movement of the spindle along the longitudinal axis in a direction towards the drive mechanism. In the second rotational position of the collar, the detents are maintained in a radially inward position to prevent axial movement of the spindle along the longitudinal axis in a direction towards the drive mechanism.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
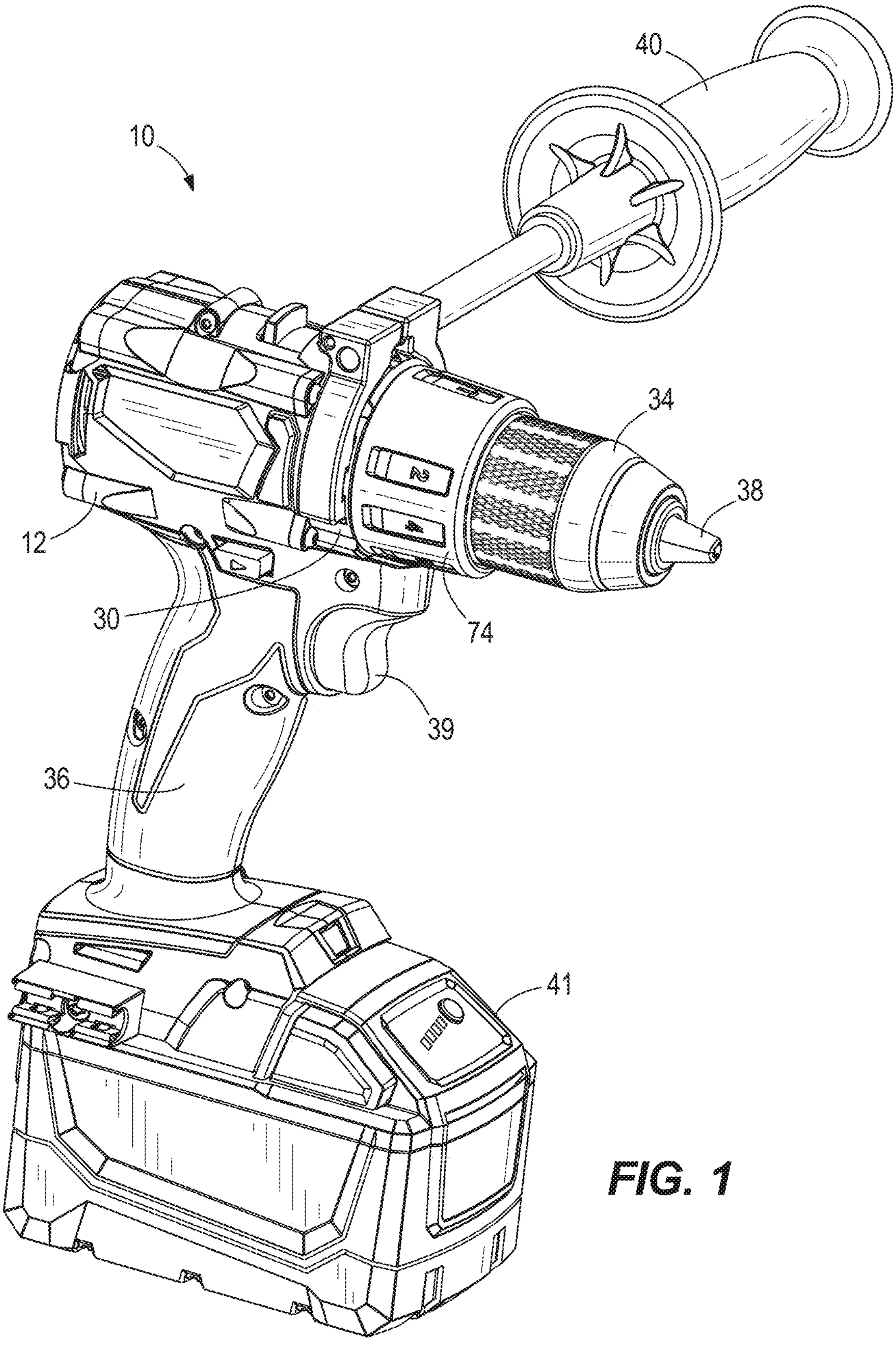
FIG. 1 is a perspective view of a portion of a hammer drill in accordance with an embodiment of the invention.
Figure 2:
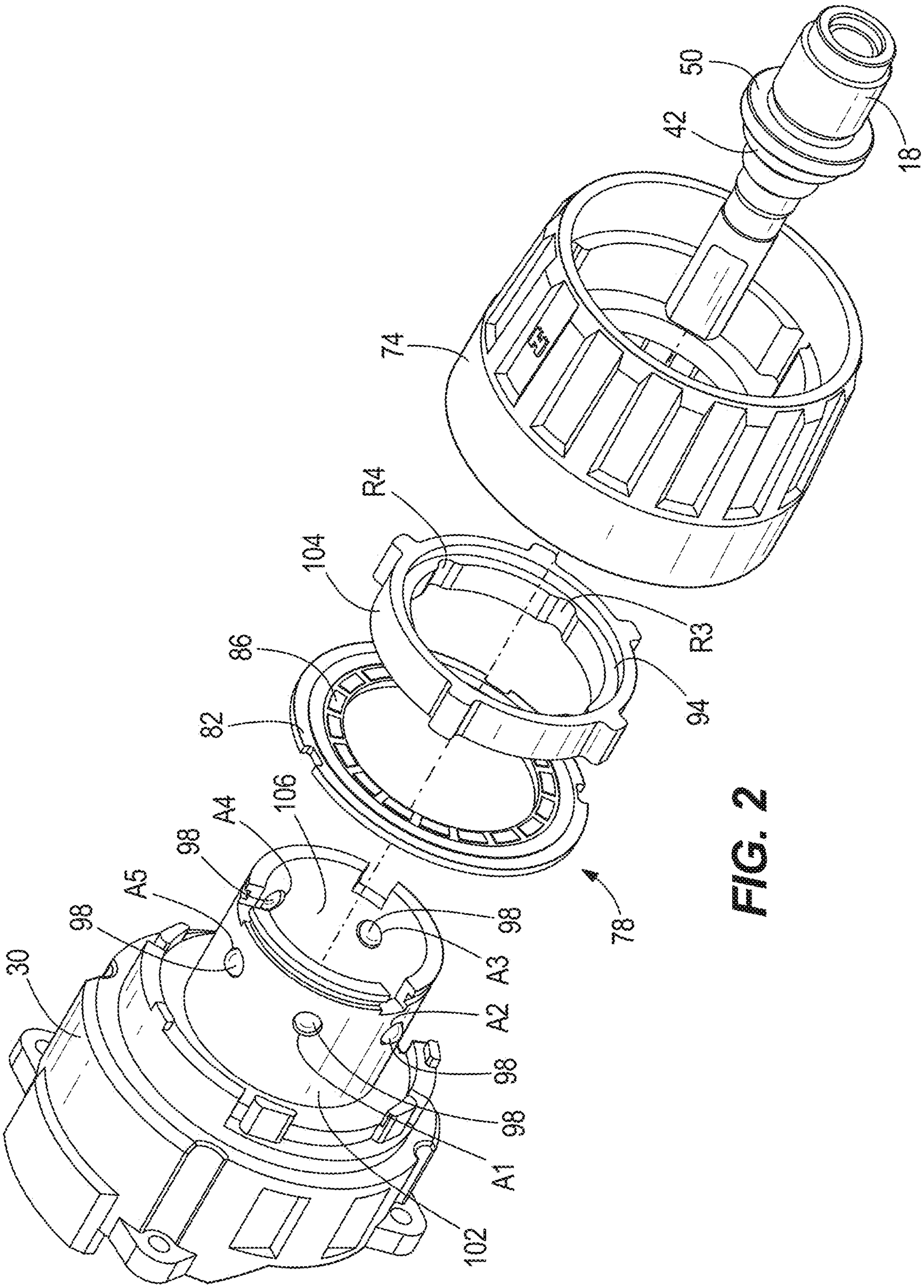
FIG. 2 is an enlarged, exploded view of a front portion of the hammer drill of FIG. 1, with a collar rendered transparent to illustrate a selector ring.
Figure 3:
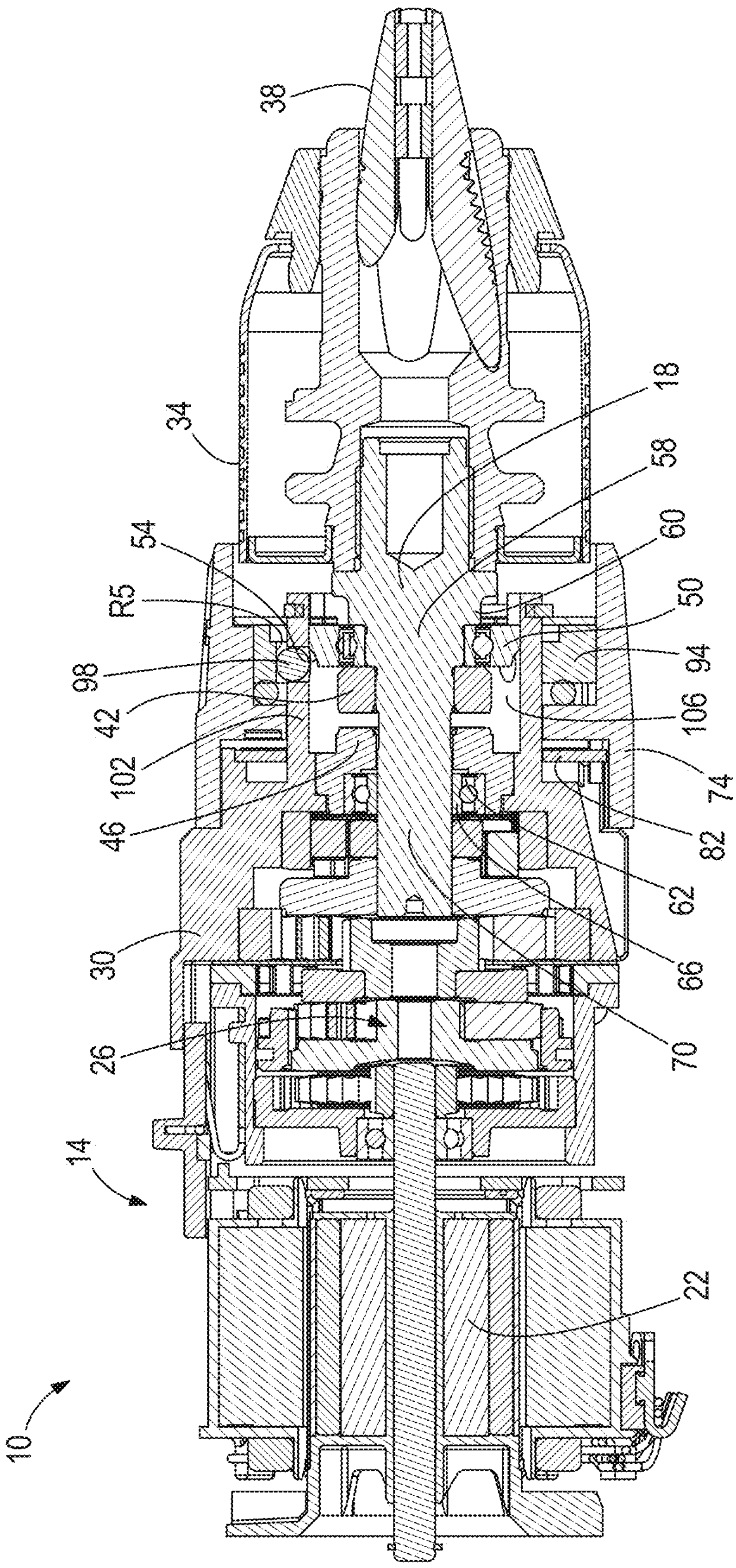
FIG. 3 is a longitudinal cross-sectional view of the hammer drill of FIG. 1.

As shown in FIGS. 1-3, a rotary power tool, in this embodiment a hammer drill 10, includes a housing 12, a drive mechanism 14 and a spindle 18 rotatable in response to receiving torque from the drive mechanism 14. As shown in FIG. 3, the drive mechanism 14 includes an electric motor 22 and a multi-speed transmission 26 between the motor 22 and the spindle 18. The drive mechanism 14 is at least partially enclosed by a transmission housing 30. As shown in FIGS. 1 and 3, a chuck 34 is provided at the front end of the spindle 18 so as to be co-rotatable with the spindle 18. The chuck 34 includes a plurality of jaws 38 configured to secure a tool bit or a drill bit (not shown), such that when the drive mechanism 14 is operated, the bit can perform a rotary and/or percussive action on a fastener or workpiece. The hammer drill 10 includes a pistol grip handle 36, a trigger 39 for activating the motor 22, and an auxiliary handle 40 that can be selectively removed from the transmission housing 30. The hammer drill 10 may be powered by an on-board power source such as a battery 41 or a remote power source (e.g., an alternating current source) via a cord (not shown).

Figure 4:
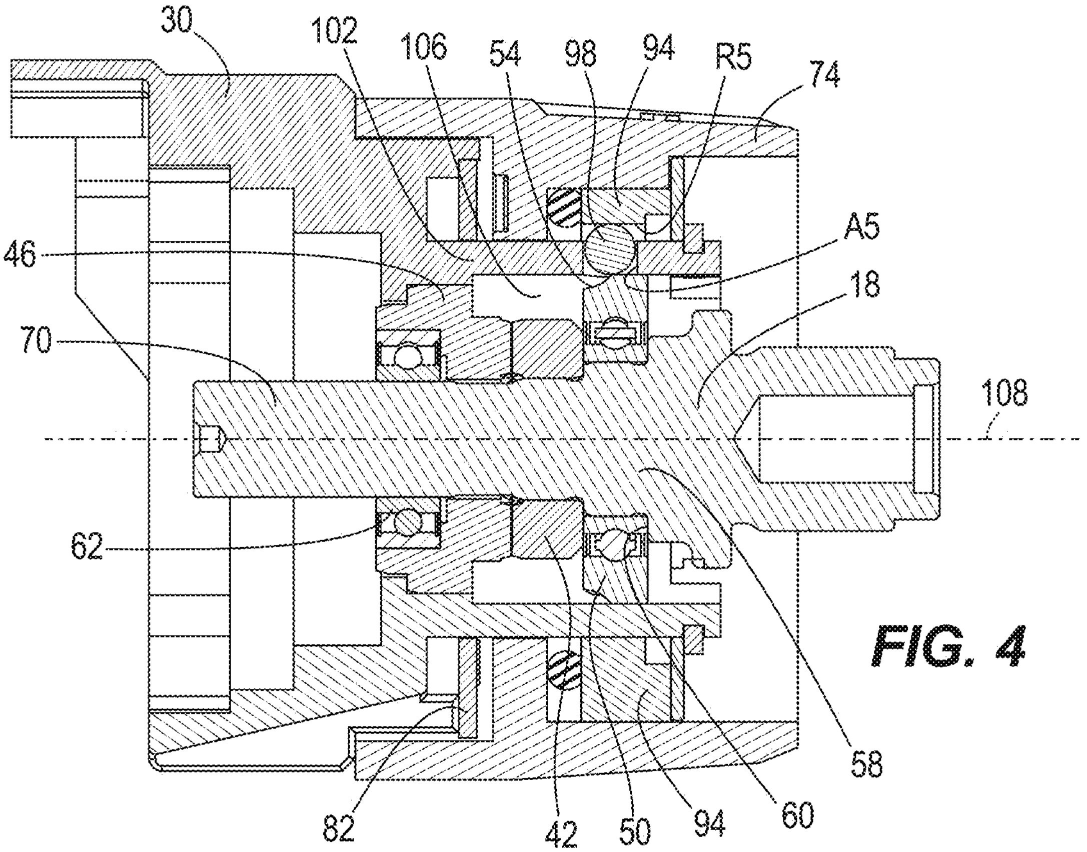
FIG. 4 is an enlarged view of the hammer drill of FIG. 3, with portions removed, illustrating a hammer lock-out mechanism in a disabled mode.
Figure 6:
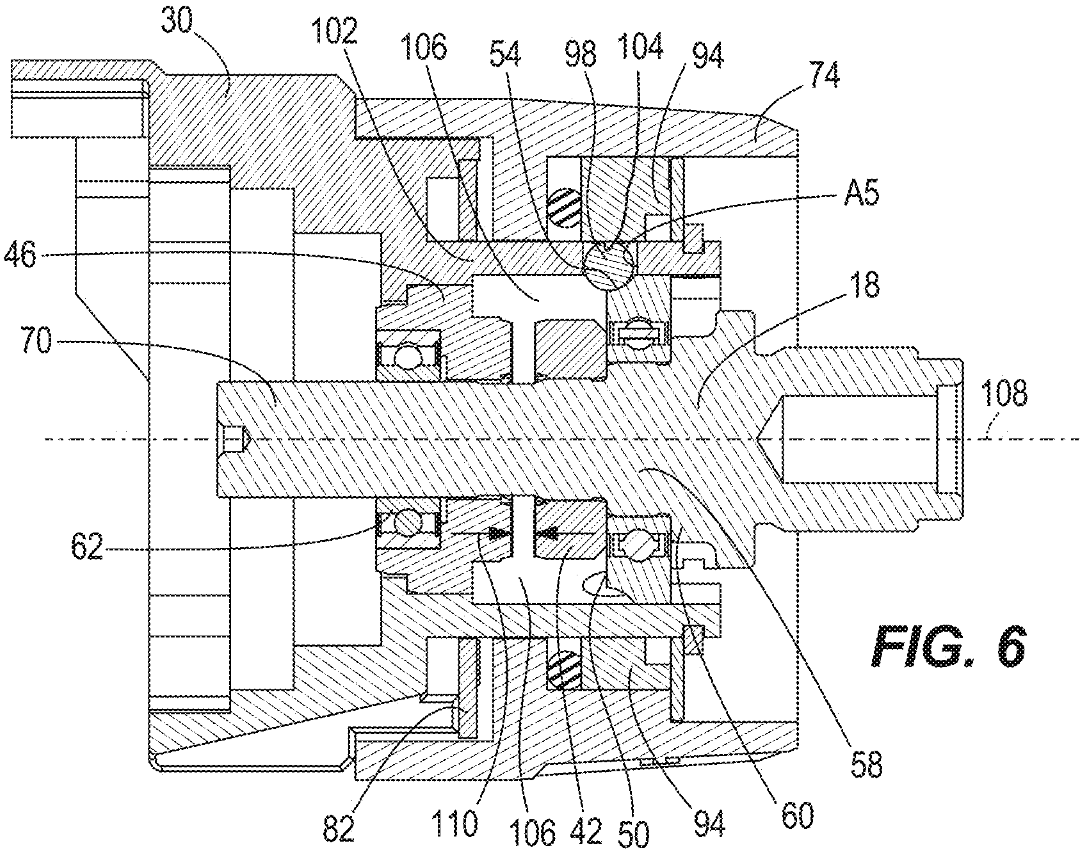
FIG. 6 is an enlarged view of the hammer drill of FIG. 3, with portions removed, illustrating the hammer lock-out mechanism in an enabled mode.

With reference to FIGS. 2 and 3, the hammer drill 10 includes a first ratchet 42 coupled for co-rotation with the spindle 18 and a second ratchet 46 axially and rotationally fixed to the transmission housing 30. In some embodiments, the second ratchet 46 is rotationally fixed to the transmission housing 30 but allowed to translate axially with respect to the transmission housing 30. As shown in FIGS. 3, 4 and 6, a first bearing 50 with an edge 54 is radially positioned between the transmission housing 30 and the spindle 18 and supports a front portion 58 of the spindle 18. In the illustrated embodiment, the edge 54 is concave, but in other embodiments, the edge 54 may be chamfered or a combination of chamfered and concave. As shown in FIGS. 3, 4 and 6, the front portion 58 of the spindle 18 includes a radially outward-extending shoulder 60 adjacent to and axially in front of the bearing 50, such that the spindle 18 is not capable of translating axially rearward unless the bearing 50 also translates axially rearward. In some embodiments, the bearing 50 is omitted and the edge 54 is located on the spindle 18.

As shown in FIG. 3, the second ratchet 46 includes a bearing pocket 62 defined in a rear end of the second ratchet 46. A second bearing 66 is at least partially positioned in the bearing pocket 62 and supports a rear portion 70 of the spindle 18. In the illustrated embodiment, the second bearing 66 is wholly received in the bearing pocket 62, but in other embodiments the second bearing 66 may at least partially extend from the bearing pocket 62. By incorporating the bearing pocket 62 in the second ratchet 46, the second bearing 66 is arranged about the rear portion 70 of the spindle 18 in a nested relationship within the second ratchet 46, thereby reducing the overall length of the hammer drill 10 while also supporting rotation of the spindle 18. In other embodiments (not shown), the second ratchet 46 does not include a bearing pocket and the second bearing 66 is press-fit to the transmission housing 30.

With reference to FIGS. 1-7, the hammer drill 10 includes a collar 74 that is rotatably adjustable by an operator of the hammer drill 10 to shift between "hammer drill," "drill-only," and "screwdriver" modes of operation, and to select a particular clutch setting when in "screwdriver mode." Thus, the collar 74 is conveniently provided as a single collar that can be rotated to select different operating modes of the hammer drill 10 and different clutch settings. As shown in FIGS. 2 and 3, the hammer drill 10 also includes an electronic clutch 78 capable of limiting the amount of torque that is transferred from the spindle 18 to a fastener (i.e., when in "screwdriver mode") by deactivating the motor 22 in response to a detected torque threshold or limit. In some embodiments, the torque threshold is based on a detected current that is mapped to or indicative of an output torque of the motor. The electronic clutch 78 includes a printed circuit board ("PCB") 82 coupled to the transmission housing 30 and a wiper (not shown), which is coupled for co-rotation with the collar 74. The PCB 82 includes a plurality of electrical pads 86 which correspond to different clutch settings of the hammer drill 10. In other embodiments, instead of a wiper moving against pads 86, one or more of a potentiometer, hall sensor, or inductive sensor could be used for selecting the different clutch settings or mode settings.

The hammer drill 10 also includes a hammer lockout mechanism 90 (FIGS. 4-7) for selectively inhibiting the first and second ratchets 42, 46 from engaging when the hammer drill 10 is in a "screwdriver mode" or a "drill-only mode." The hammer lockout mechanism 90 includes a selector ring 94 coupled for co-rotation with and positioned inside the collar 74, and a plurality of balls 98 situated within corresponding radial apertures A1, A2, A3, A4, and A5 asymmetrically positioned around an annular portion 102 of the transmission housing 30. As shown in FIGS. 2, 5 and 7-25, the selector ring 94 includes a plurality of recesses R1, R2, R3, R4, and R5 asymmetrically positioned about an inner periphery 104 of the selector ring 94. The number of recesses R1-R5 corresponds to the number of apertures A1-A5 and the number of balls 98 within the respective apertures A1-A5.

Figure 5:
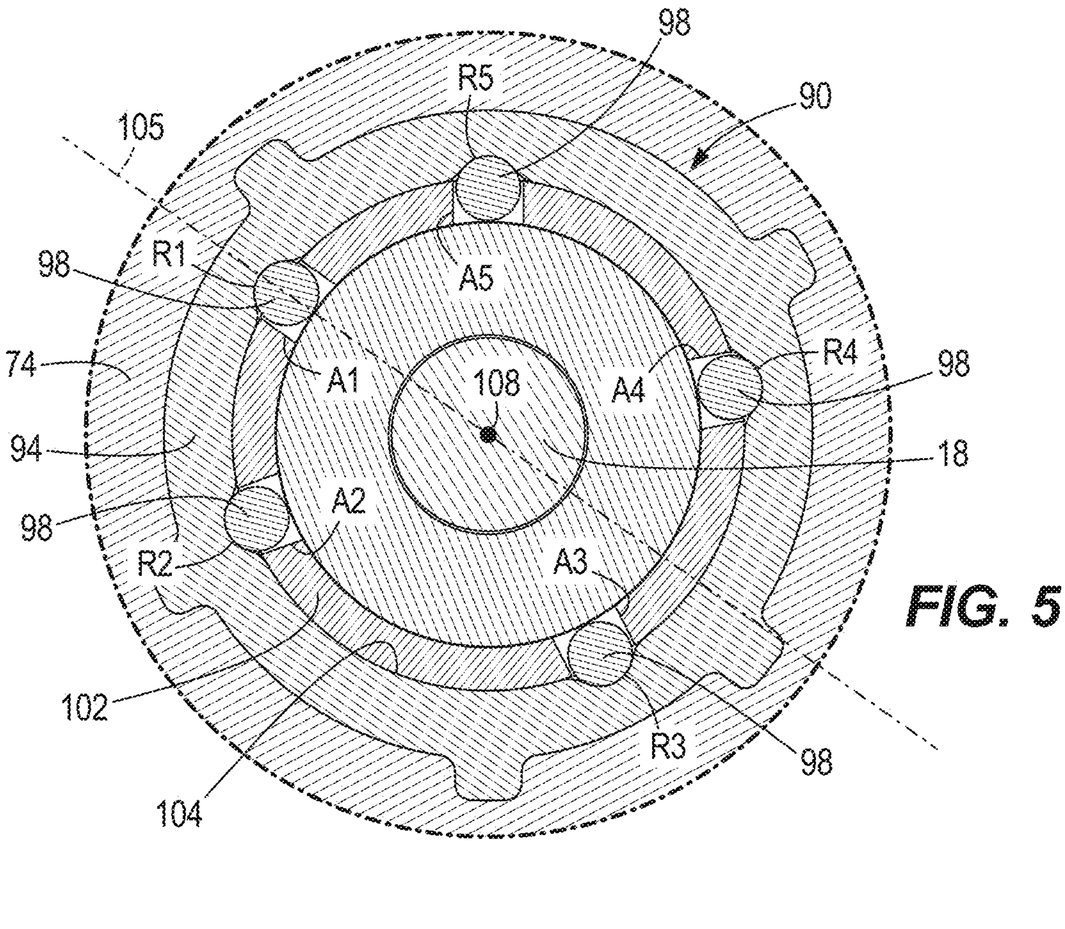
FIG. 5 is a lateral cross-sectional view of the hammer lock-out mechanism of FIG. 4 coinciding with a first rotational position of a collar of the hammer drill of FIG. 1.
Figure 7:
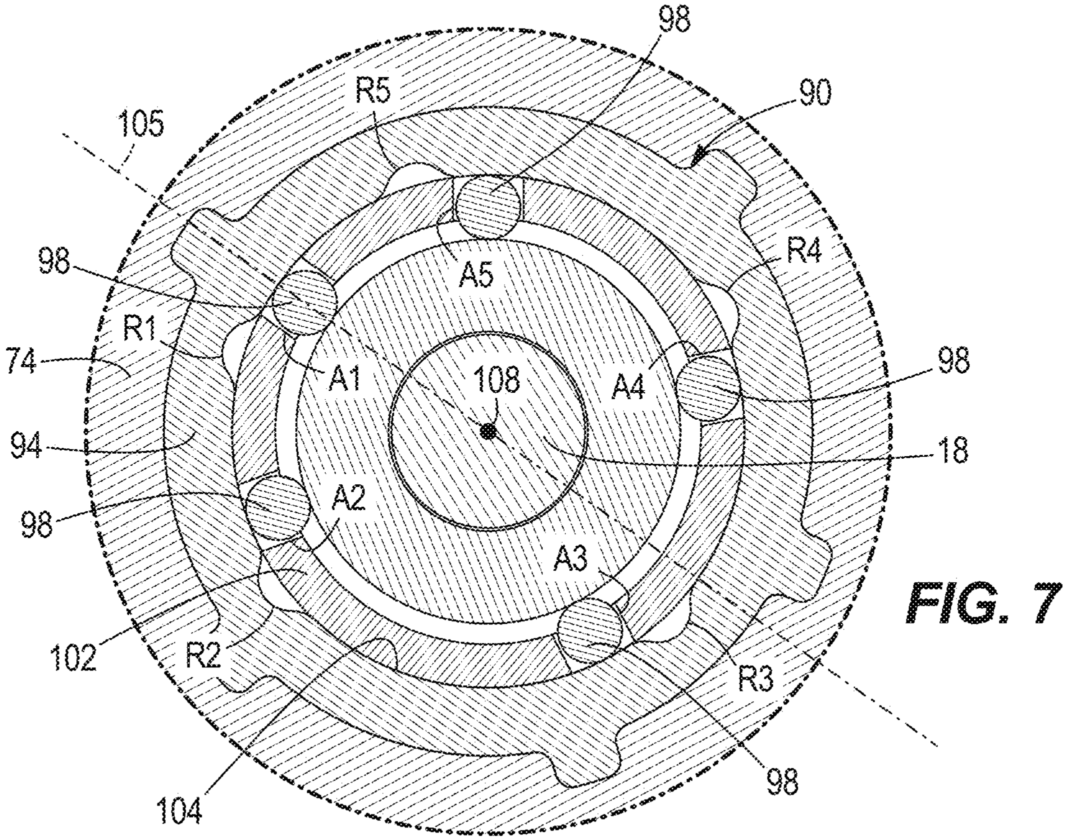
FIG. 7 is a lateral cross-sectional view of the hammer lock-out mechanism of FIG. 6 coinciding with a second rotational position of the collar.
Figure 8:
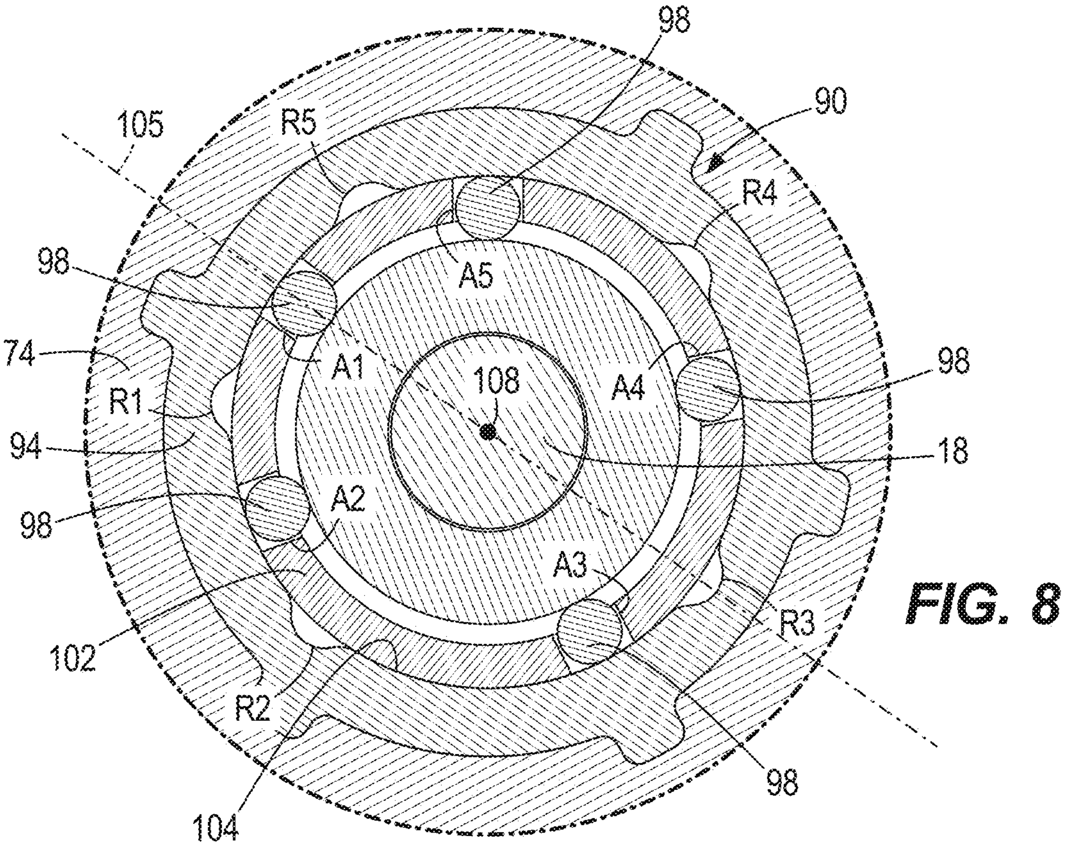
FIG. 8 is a lateral cross-sectional view of the hammer lock-out mechanism coinciding with a third rotational position of the collar.
Figure 9:
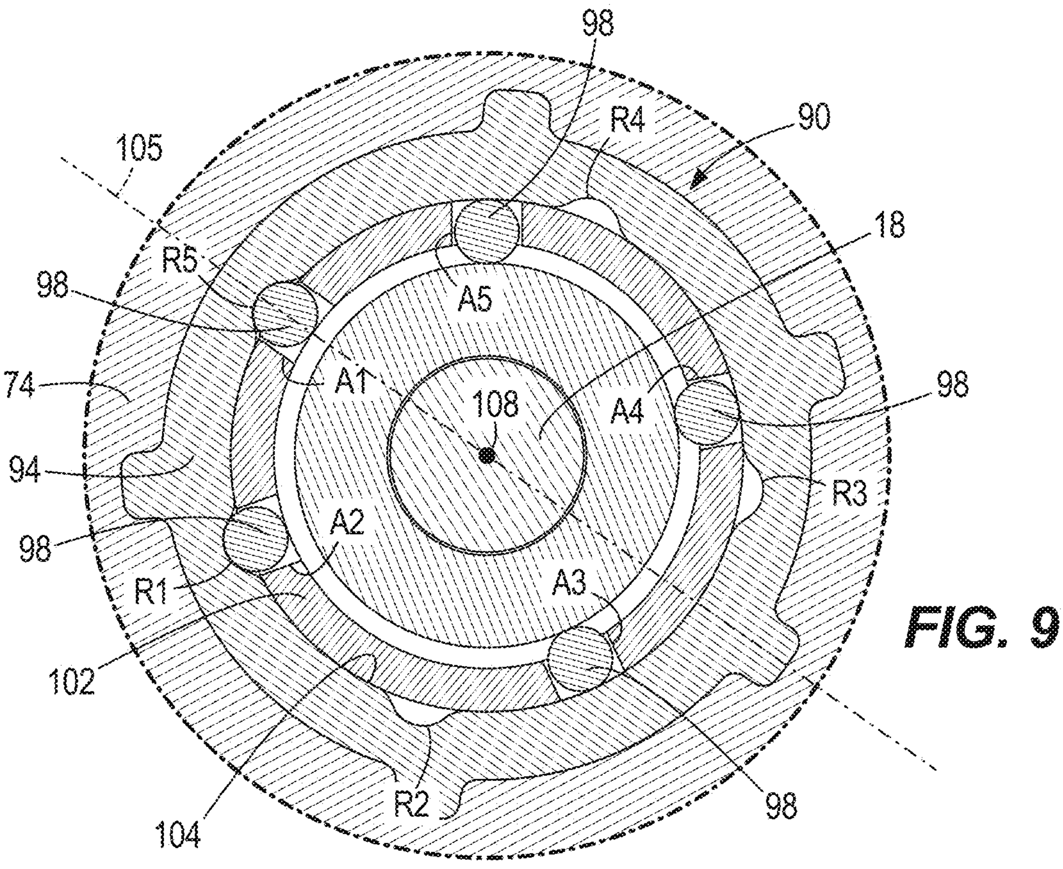
FIG. 9 is a lateral cross-sectional view of the hammer lock-out mechanism coinciding with a fourth rotational position of the collar.
Figure 10:
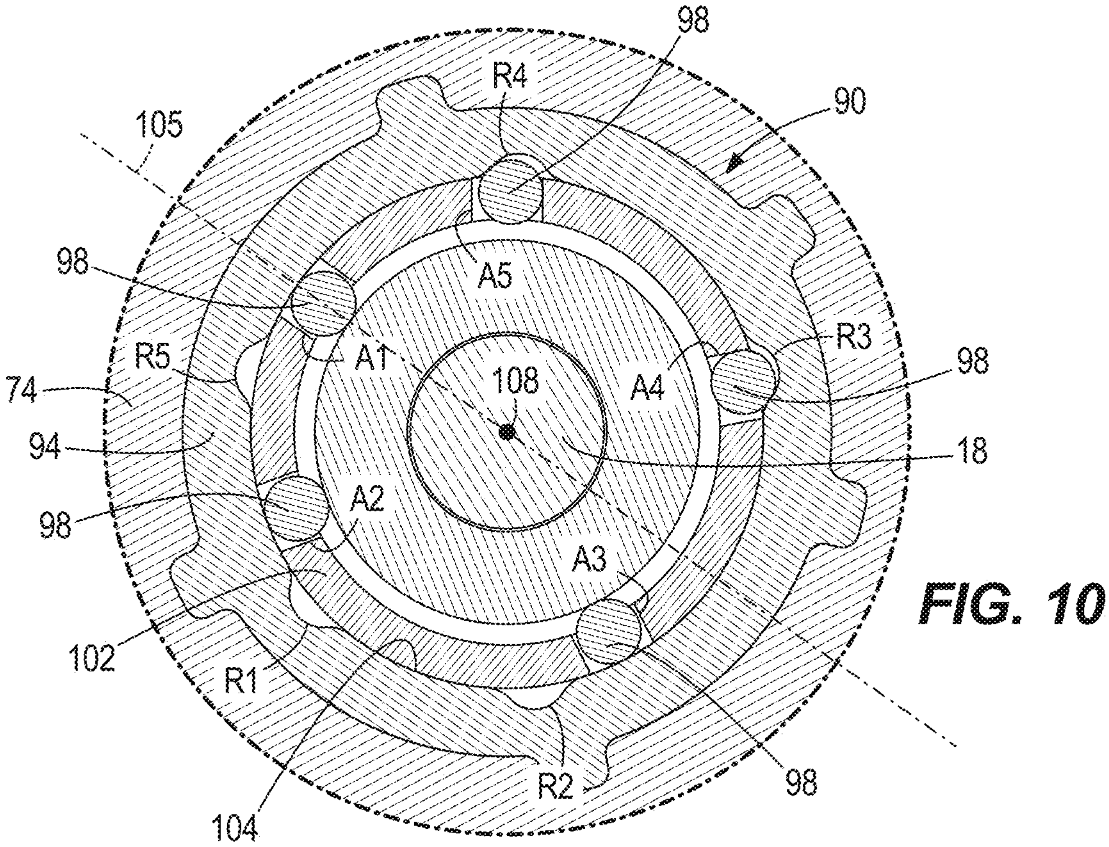
FIG. 10 is a lateral cross-sectional view of the hammer lock-out mechanism coinciding with a fifth rotational position of the collar.
Figure 11:
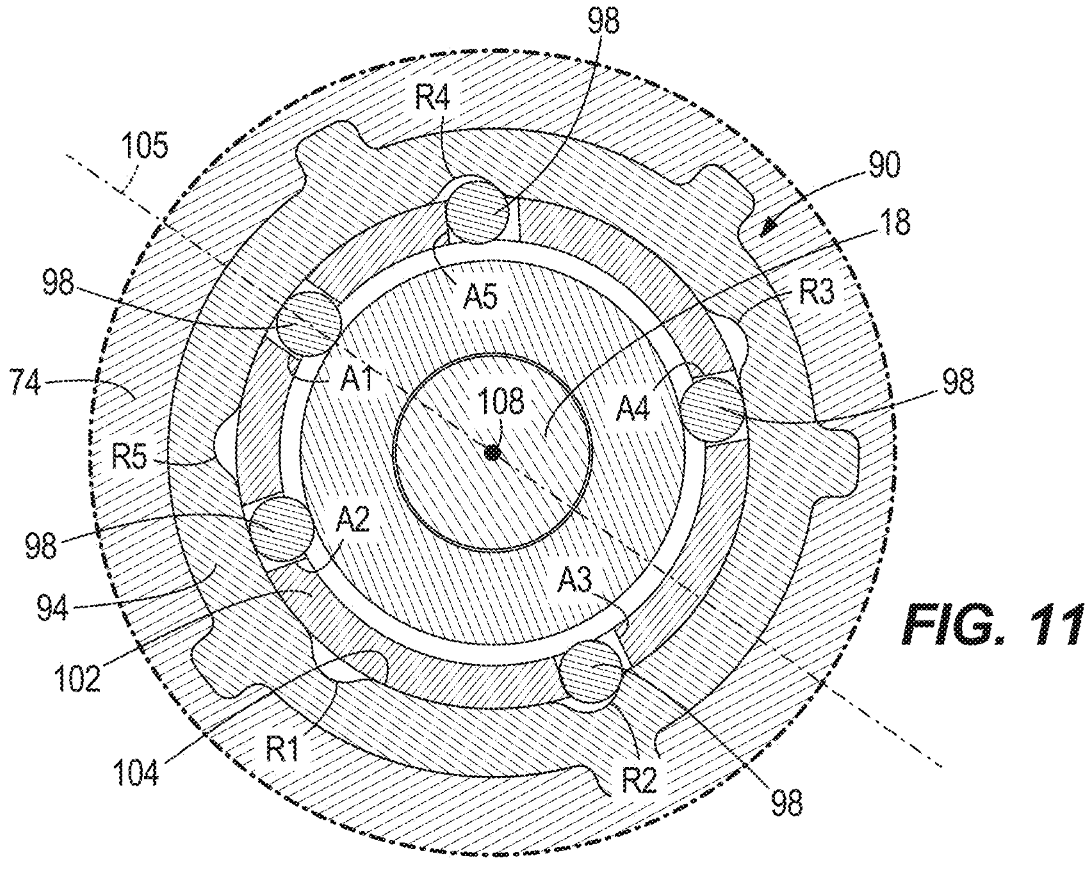
FIG. 11 is a lateral cross-sectional view of the hammer lock-out mechanism coinciding with a sixth rotational position of the collar.
Figure 12:
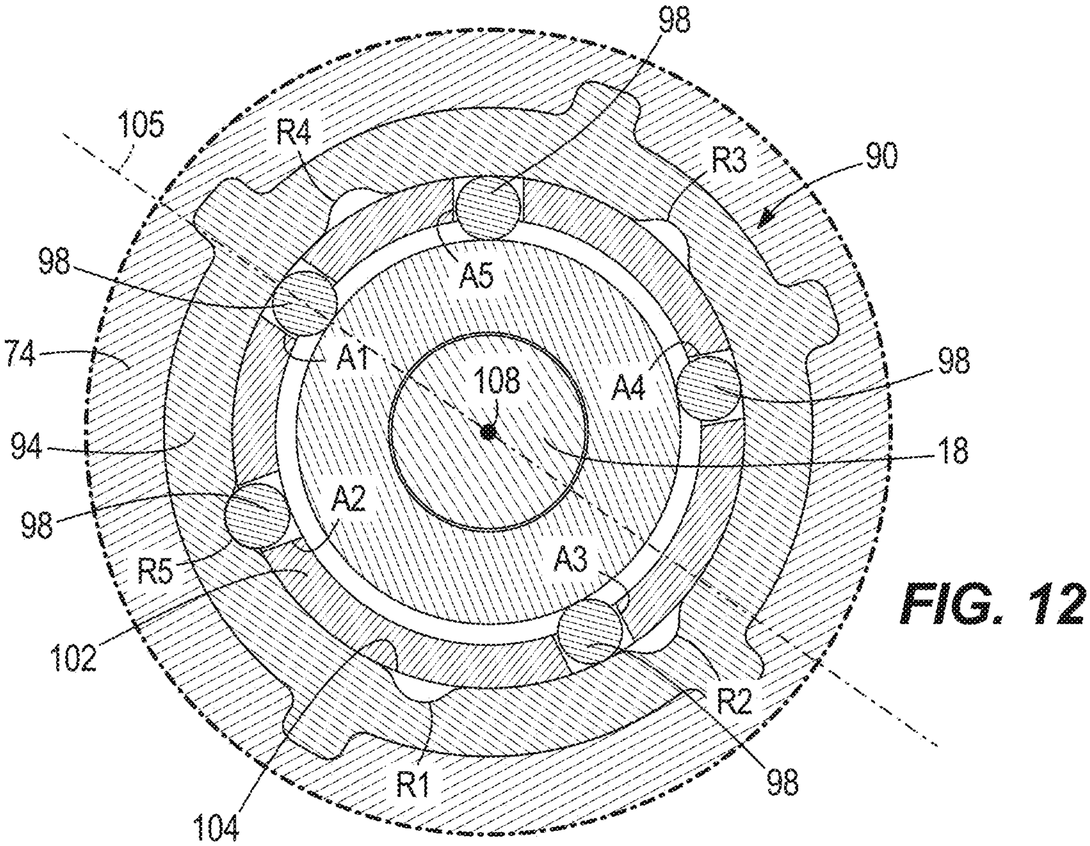
FIG. 12 is a lateral cross-sectional view of the hammer lock-out mechanism coinciding with a seventh rotational position of the collar.
Figure 13:
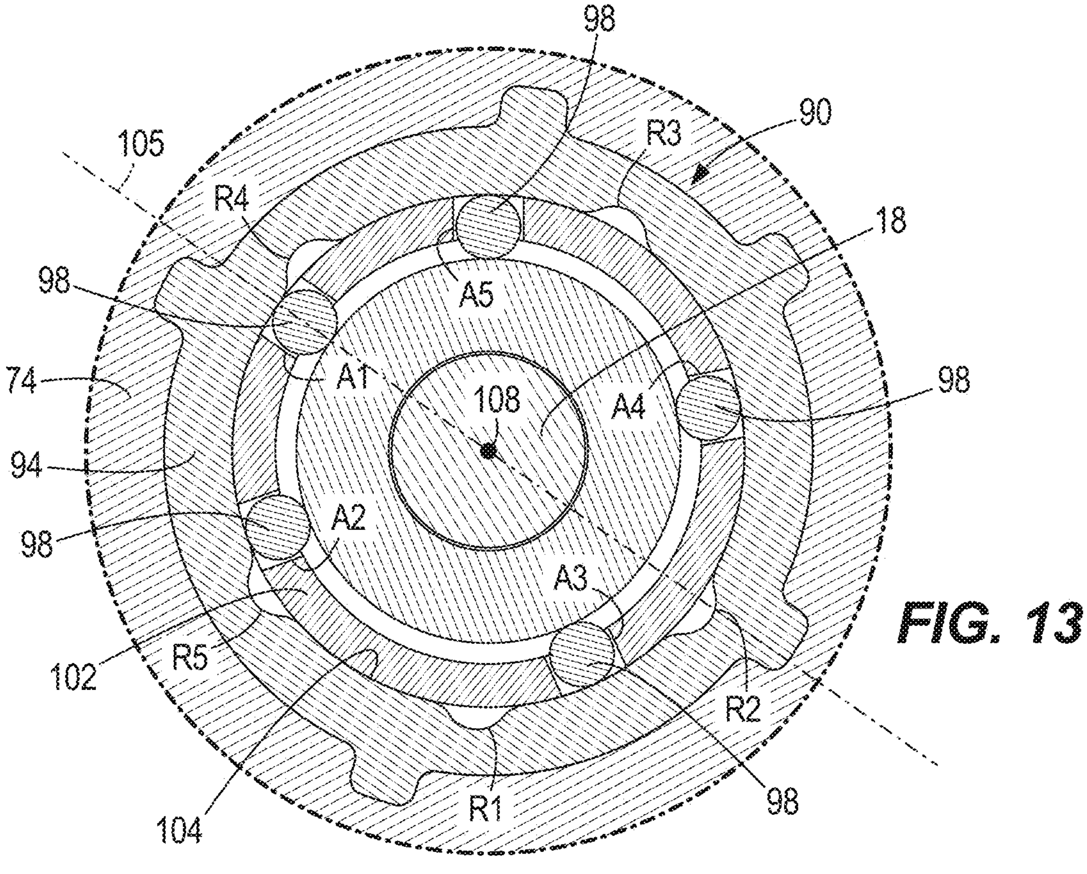
FIG. 13 is a lateral cross-sectional view of the hammer lock-out mechanism coinciding with an eighth rotational position of the collar.
Figure 14:
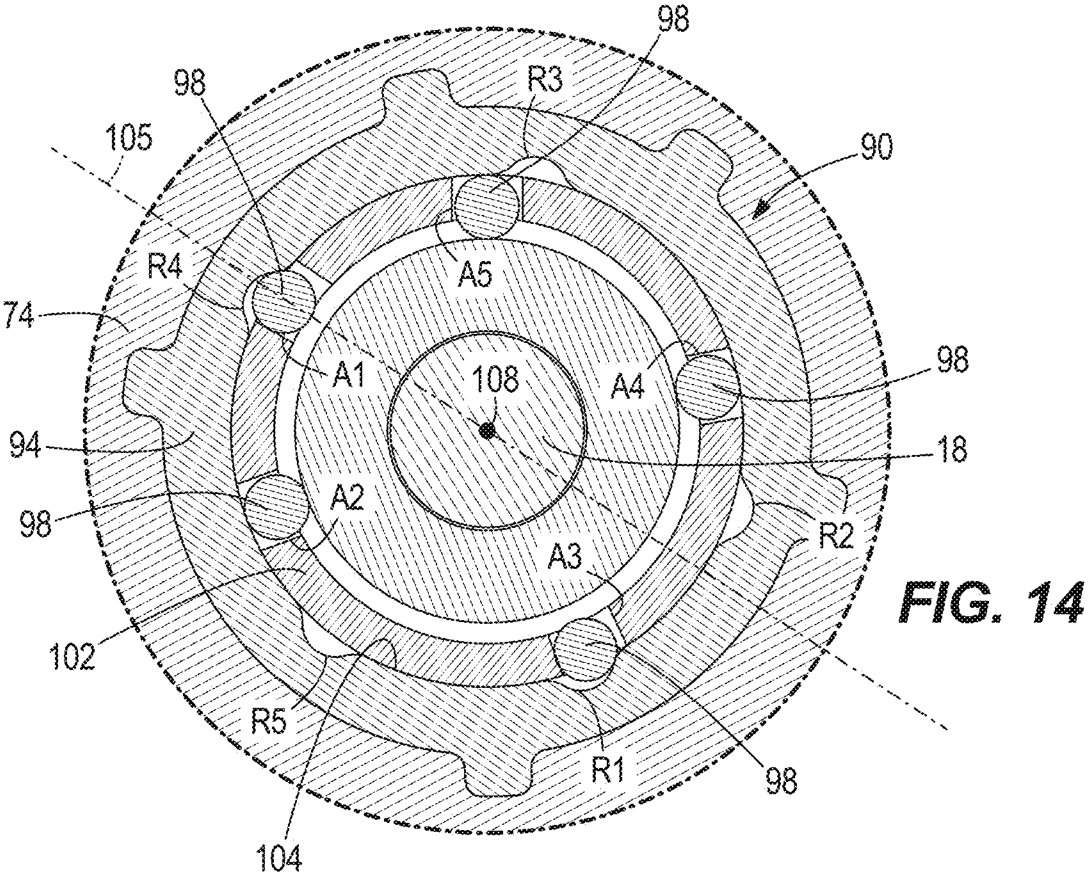
FIG. 14 is a lateral cross-sectional view of the hammer lock-out mechanism coinciding with a ninth rotational position of the collar.
Figure 15:
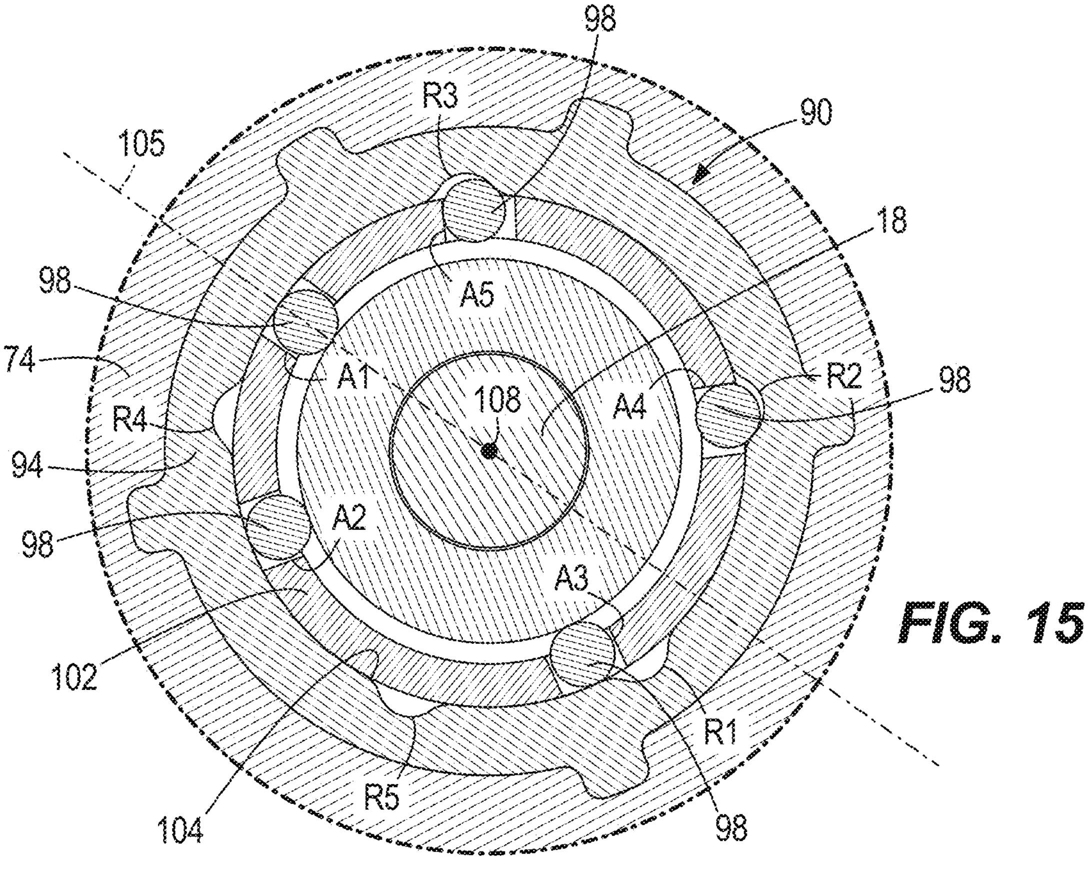
FIG. 15 is a lateral cross-sectional view of the hammer lock-out mechanism coinciding with a tenth rotational position of the collar.
Figure 16:
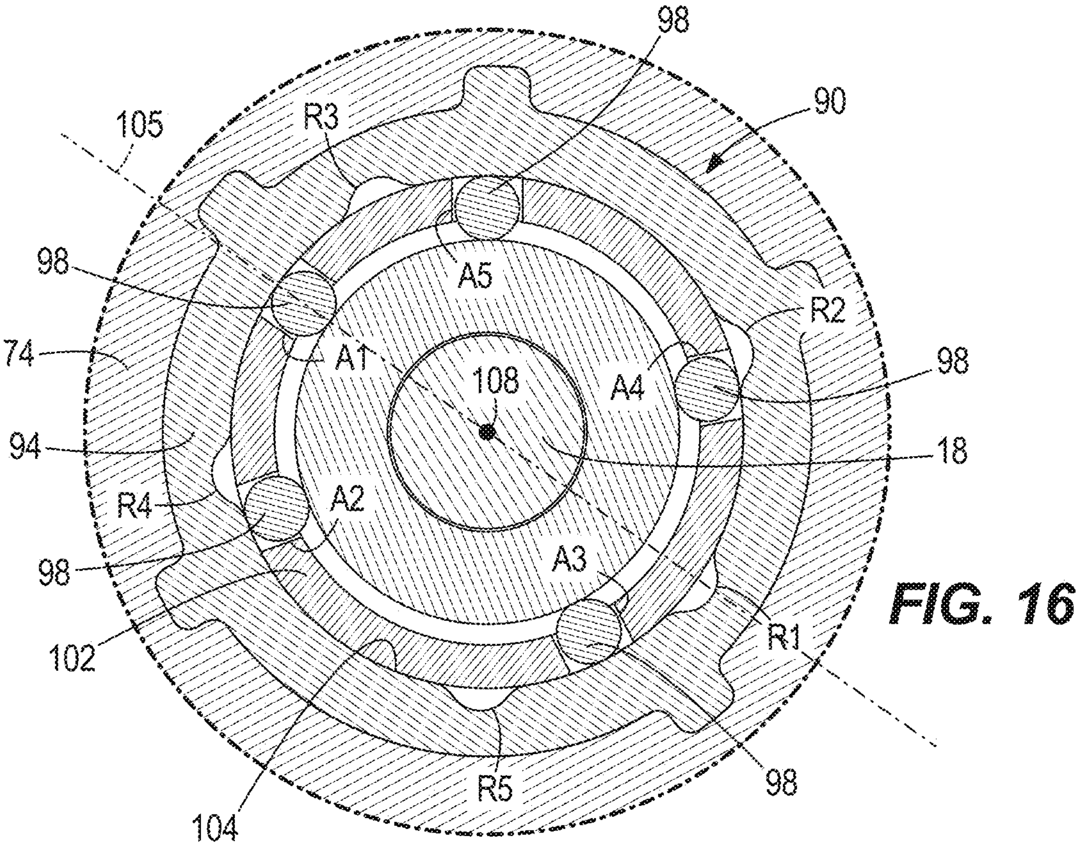
FIG. 16 is a lateral cross-sectional view of the hammer lock-out mechanism coinciding with a eleventh rotational position of the collar.
Figure 17:
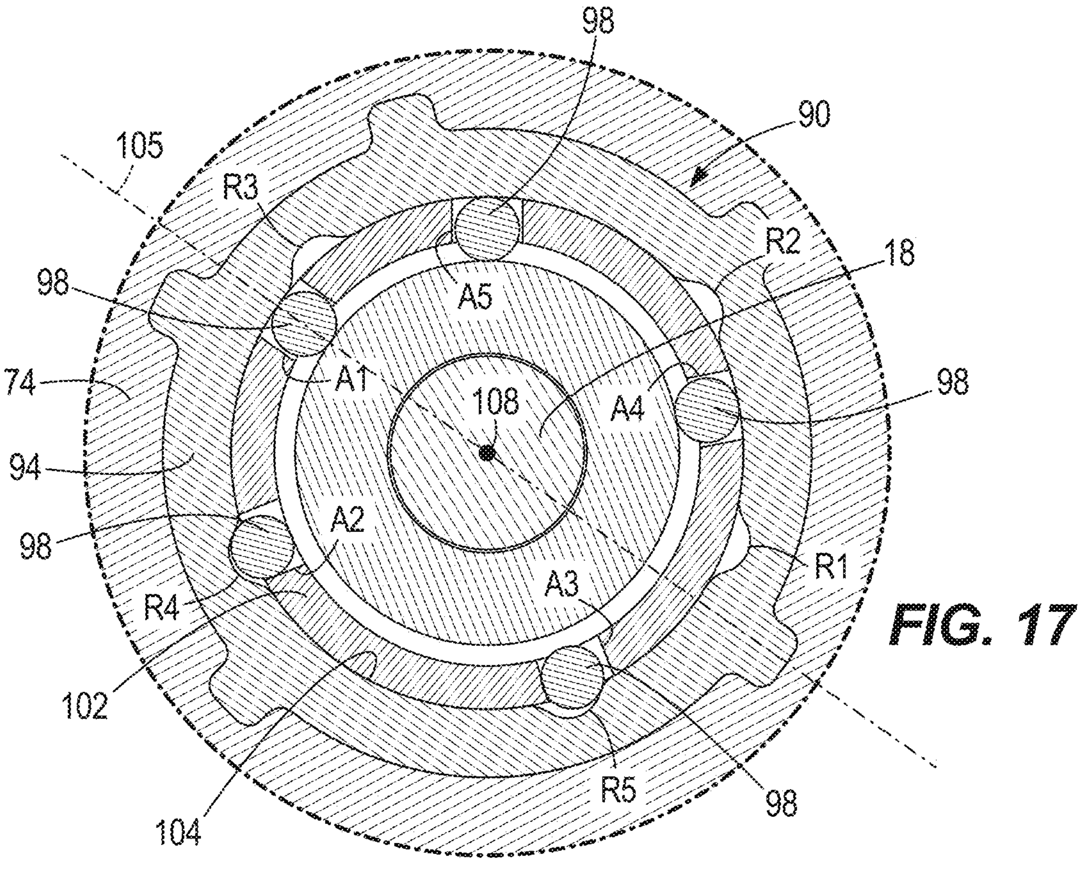
FIG. 17 is a lateral cross-sectional view of the hammer lock-out mechanism coinciding with a twelfth rotational position of the collar.
Figure 18:
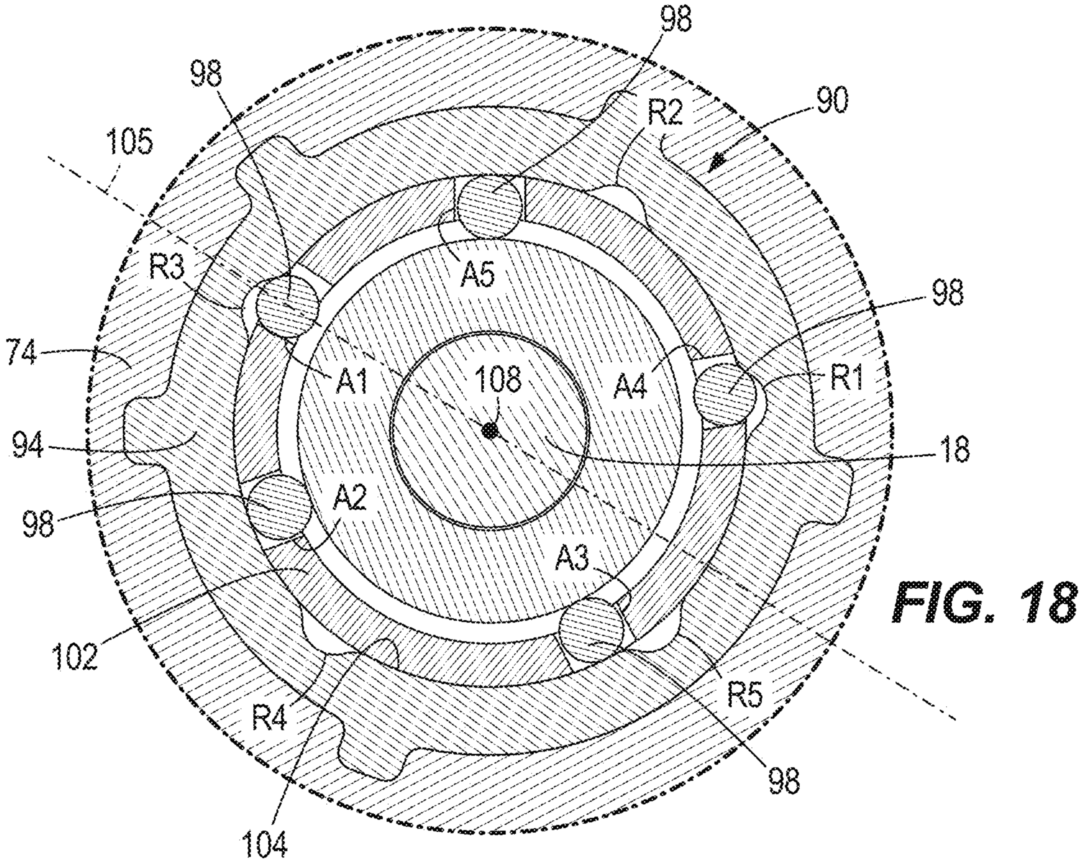
FIG. 18 is a lateral cross-sectional view of the hammer lock-out mechanism coinciding with a thirteenth rotational position of the collar.
Figure 19:
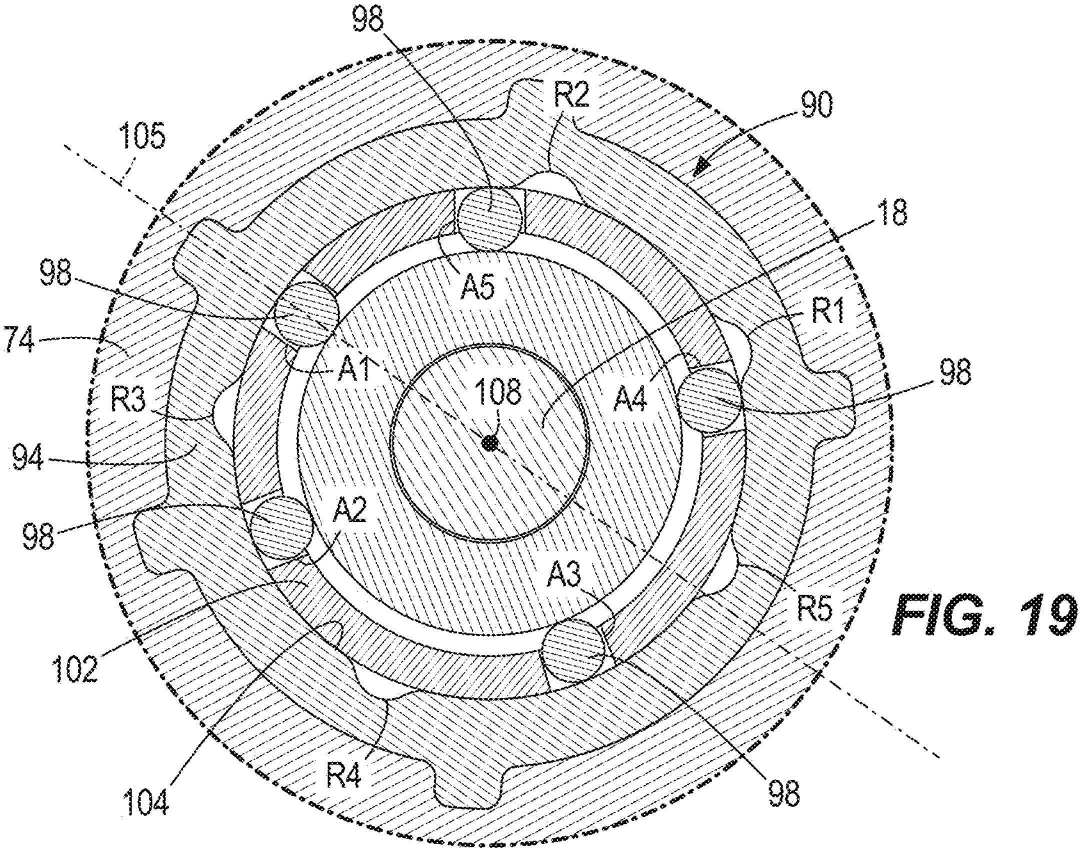
FIG. 19 is a lateral cross-sectional view of the hammer lock-out mechanism coinciding with a fourteenth rotational position of the collar.
Figure 20:
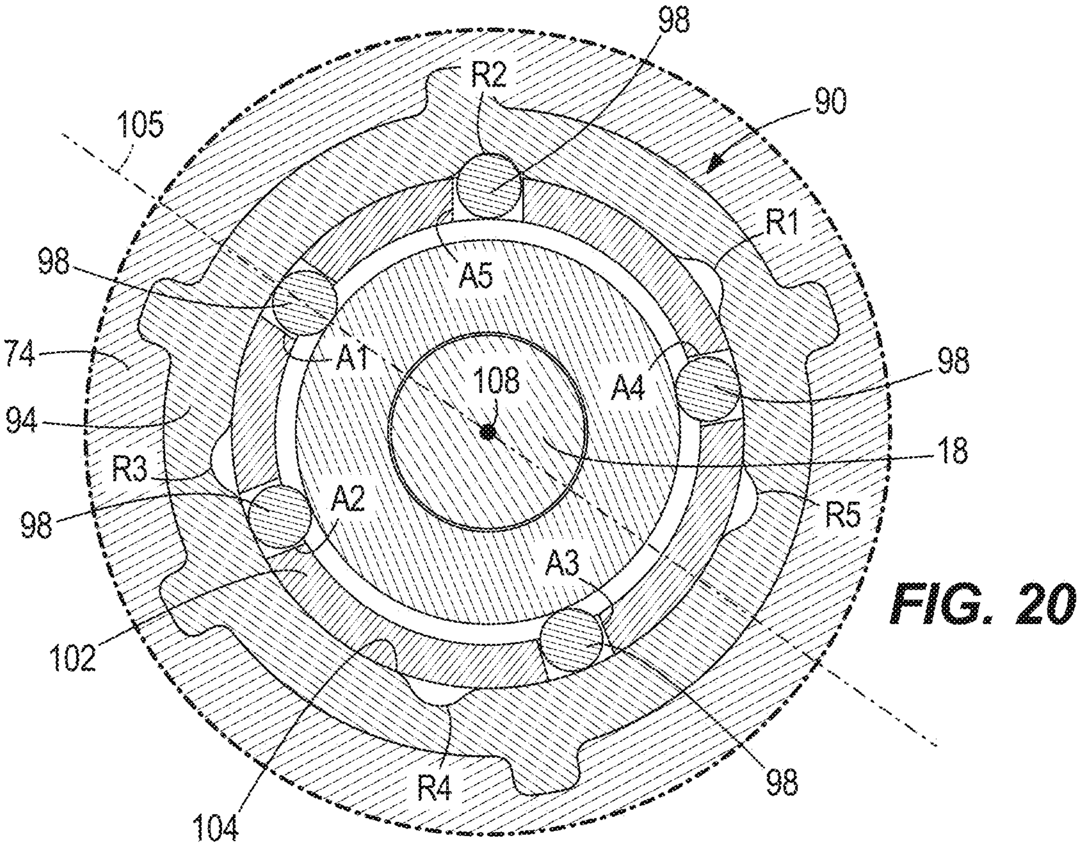
FIG. 20 is a lateral cross-sectional view of the hammer lock-out mechanism coinciding with a fifteenth rotational position of the collar.
Figure 21:
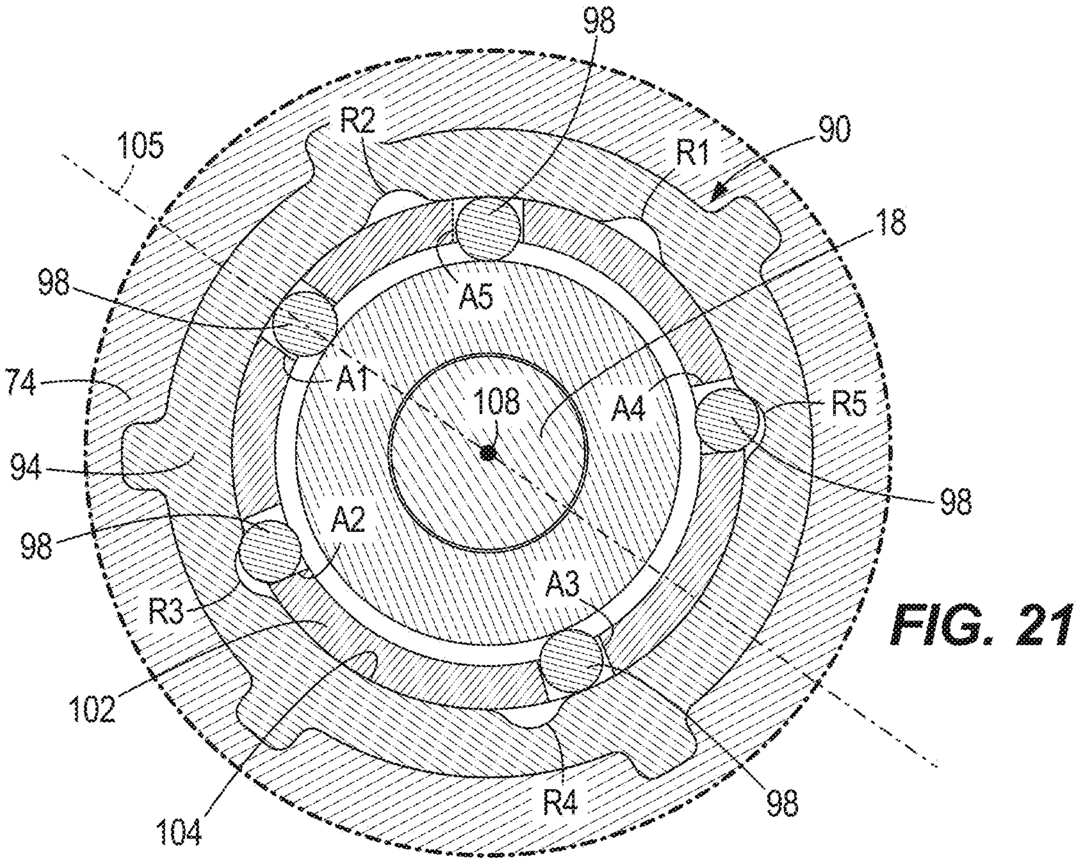
FIG. 21 is a lateral cross-sectional view of the hammer lock-out mechanism coinciding with a sixteenth rotational position of the collar.
Figure 22:
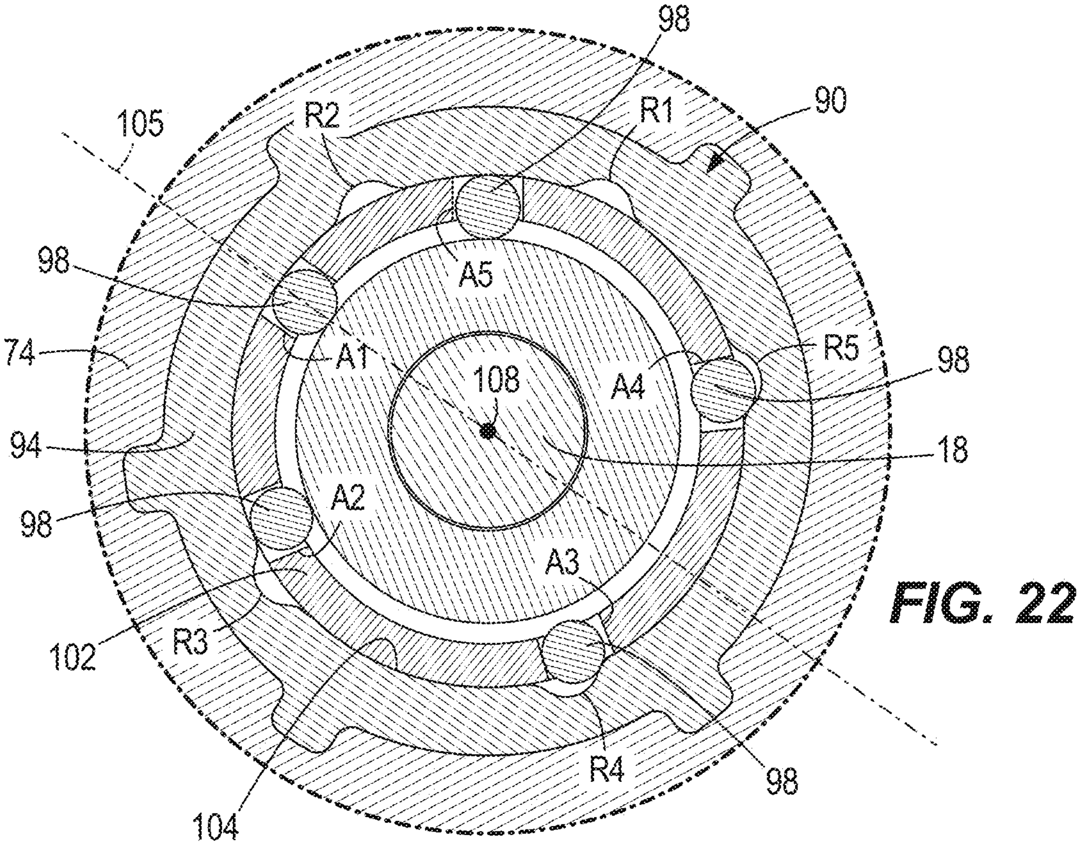
FIG. 22 is a lateral cross-sectional view of the hammer lock-out mechanism coinciding with a seventeenth rotational position of the collar.
Figure 23:
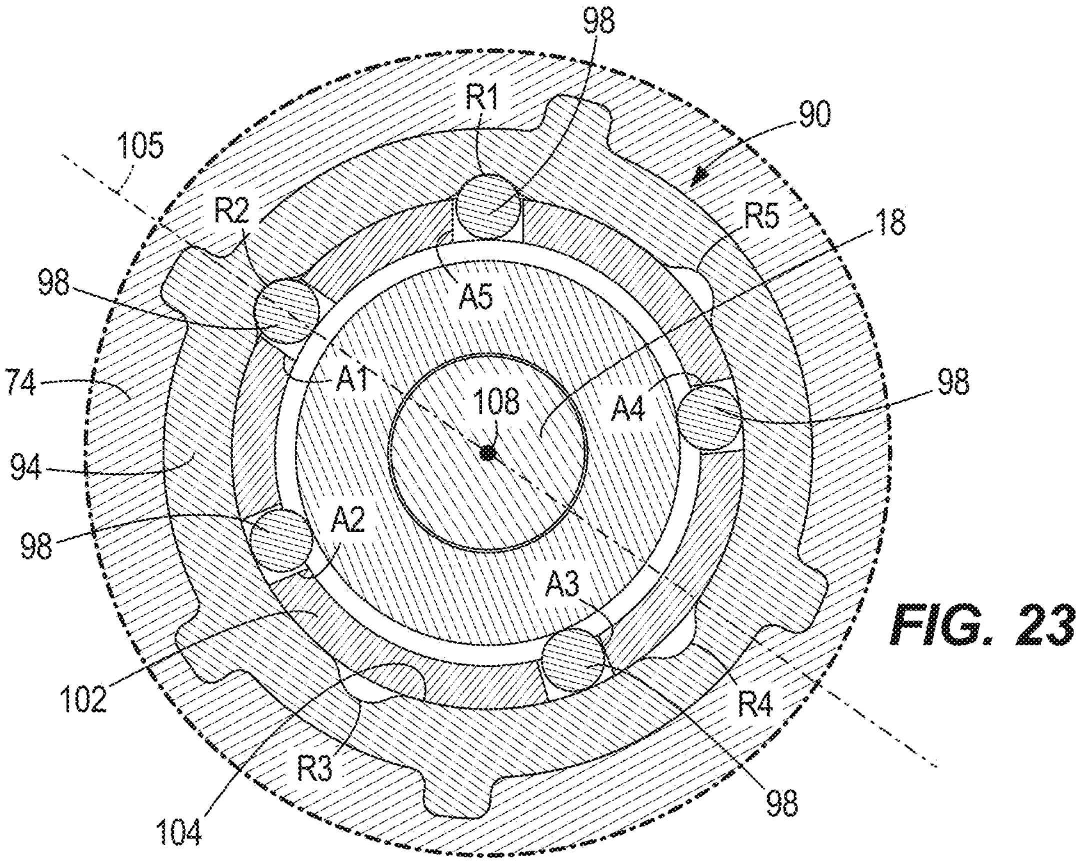
FIG. 23 is a lateral cross-sectional view of the hammer lock-out mechanism coinciding with a eighteenth rotational position of the collar.
Figure 24:
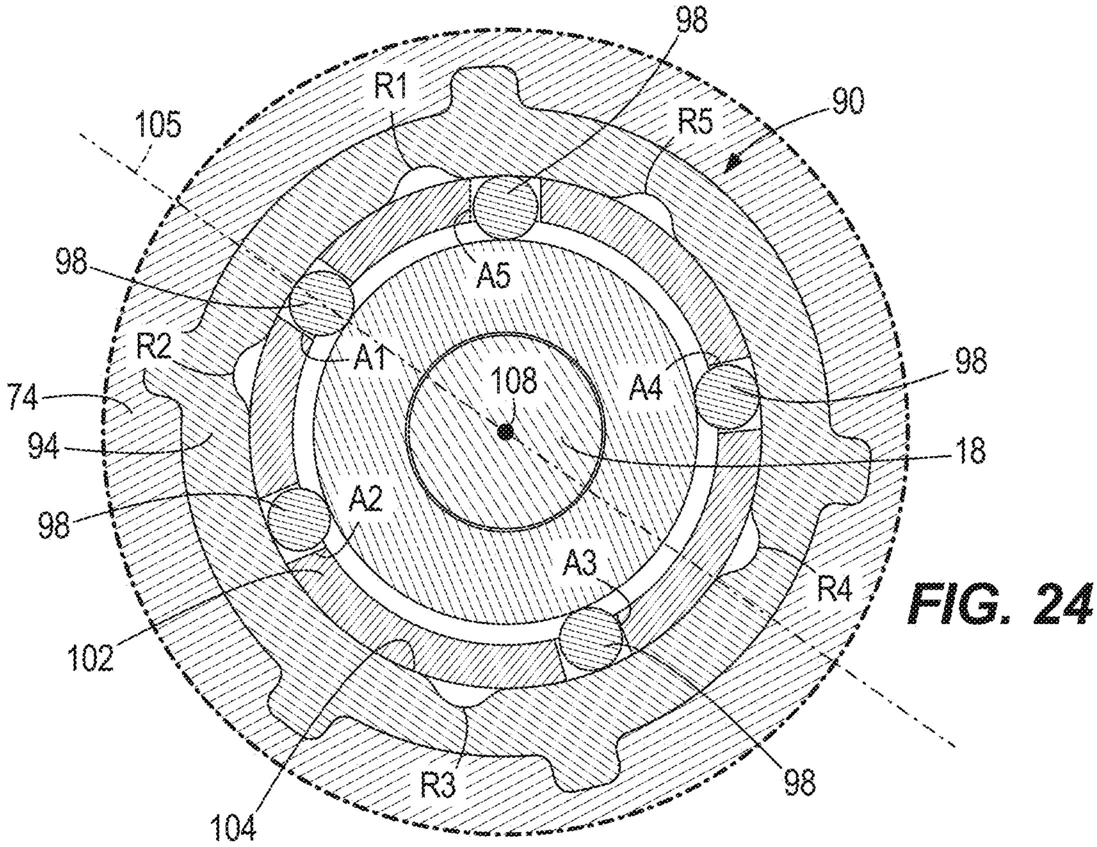
FIG. 24 is a lateral cross-sectional view of the hammer lock-out mechanism coinciding with a nineteenth rotational position of the collar.
Figure 25:
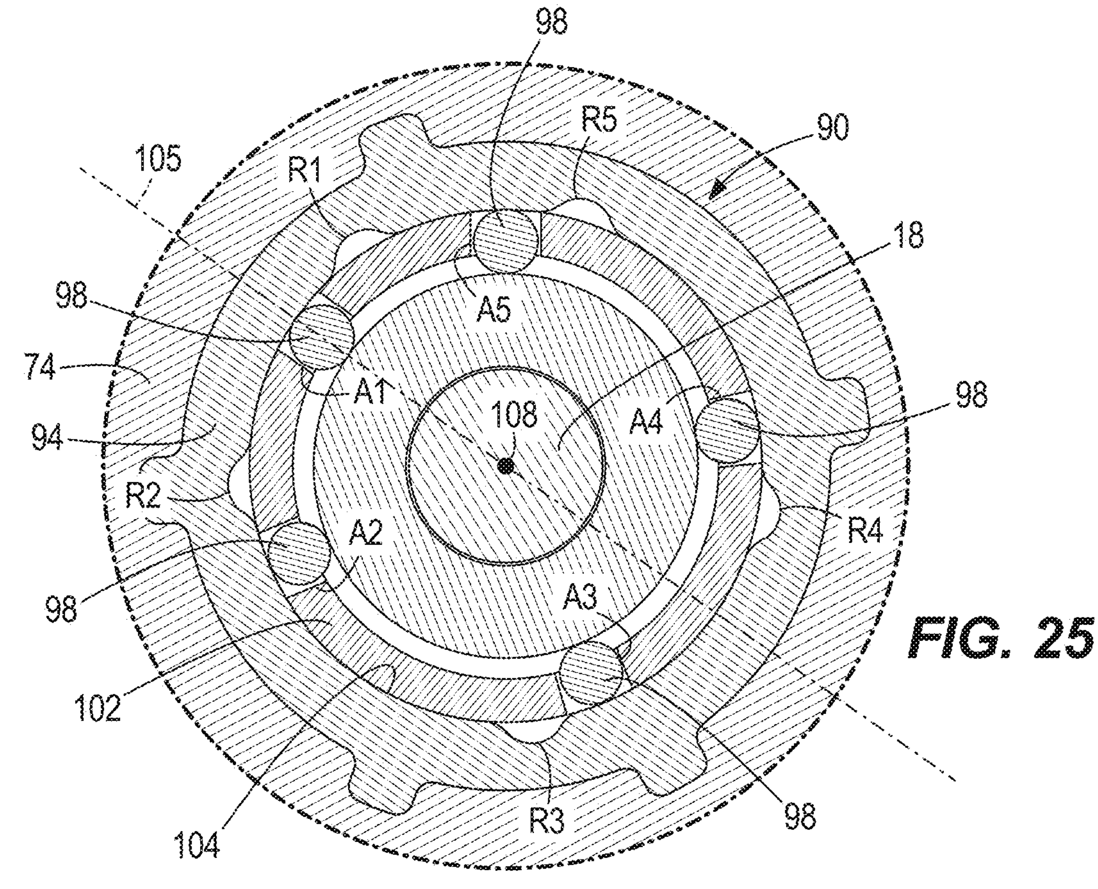
FIG. 25 is a lateral cross-sectional view of the hammer lock-out mechanism coinciding with a twentieth rotational position of the collar.

In the illustrated embodiment, five apertures A1-A5, each containing a detent, such as a ball 98, are located in the transmission housing 30 and five recesses R1-R5 are defined in the selector ring 94. However, in other embodiments, the hammer lockout mechanism 90 could employ more or fewer apertures, balls, and recesses. As shown in FIGS. 5 and 7, the five apertures A1-A5 are approximately located at 0 degrees, 55 degrees, 145 degrees, 221 degrees, and 305 degrees, respectively, measured in a counterclockwise direction from an oblique plane 105 containing a longitudinal axis 108 of the hammer drill 10 and bisecting aperture A1. As shown in FIGS. 4 and 6, the first ratchet 42 and the first bearing 50 are set within a cylindrical cavity 106 defined within the annular portion 102 of the transmission housing 30, and the selector ring 94 is radially arranged between the annular portion 102 and the collar 74, surrounding the apertures A1-A5.

In operation, as shown in FIGS. 4 and 5 when the collar 74 and ring 94 are rotated together to a position corresponding to a "hammer drill" mode, all five apertures A1-A5 are aligned with all five recesses R1-R5 in the selector ring 94, respectively. Therefore, when the bit held by the jaws 38 contacts a workpiece, the normal force of the workpiece pushes the bit axially rearward, i.e., away from the workpiece. The axial force experienced by the tool bit is applied through the spindle 18 in a rearward direction, causing the spindle 18 to move axially rearward, thus forcing the first bearing 50 to move rearward and the edge 54 of the first bearing 50 to displace each of the balls 98 situated in the respective apertures A1-A5 radially outward to a "unlocking position", in which the balls 98 are partially received into the recesses R1-R5, thereby disabling the hammer lockout mechanism 90. Thus, the first ratchet 42 is permitted to engage with the second ratchet 46 to impart reciprocation to the spindle 18 as it rotates.

However, when the collar 74 and selector ring 94 are incrementally rotated (e.g., by 18 degrees) in a counterclockwise direction to the second rotational position shown in FIGS. 6 and 7, none of the apertures A1-A5 are aligned with the recesses R1-R5. Thus, in this position of the collar 74 and selector ring 94, the balls 98 in the respective apertures A1-A5 are prevented from being radially displaced into the recesses R1-R5 in response to the tool bit contacting a workpiece and the spindle 18 and bearing 50 attempting to move axially rearward. Rather, the edge 54 of the first bearing 50 presses against the balls 98, which in turn abut against the inner periphery 104 of the selector ring 94 and are inhibited from displacing radially outward. In other words, the balls 98 remain in "locking positions" and each ball 98 is prevented from moving from the locking position to the unlocking position. Thus, the spindle 18 is blocked by the balls 98 in their locking positions, via the first bearing 50, and therefore the spindle 18 is prevented from moving rearward, maintaining a gap 110 between the first and second ratchets 42, 46. Thus, in the second rotational position of the collar 74 and the selector ring 94, the hammer lockout mechanism 90 is enabled, preventing the spindle 18 from reciprocating in an axial manner as it is rotated by the drive mechanism 14, operating the hammer drill 10 in a “drill only” mode.

There are a total of twenty different positions between which the collar 74 and selector ring 94 can rotate, such that the collar 74 is rotated 18 degrees between each of the positions. The wiper is in electrical and sliding contact with the PCB 82 as the collar 74 is rotated between each of the twenty positions. Depending upon which of the electrical pads 86 on the PCB 82 the wiper contacts, the electronic clutch 78 adjusts which clutch setting to apply to the motor 22. In the “hammer drill” mode and the “drill only” mode coinciding with the first and second rotational positions of the collar 74 and selector ring 94, respectively, the electronic clutch 78 operates the motor 22 to output torque at a predetermined maximum value to the spindle 18. In some embodiments, the predetermined maximum value of torque output by the motor 22 may coincide with the maximum rated torque of the motor 22.

As shown in FIG. 5 and the Table below, the “hammer drill” position of the collar 74 corresponds to a “0 degree” or “first rotational position” position of the collar 74, in which the recesses R1, R2, R3, R4, R5 of the selector ring 94 are respectively and approximately located at 0, 55, 145, 221, and 305 degrees counterclockwise from the plane 105, such that the apertures A1, A2, A3, A4, A5 are thereby aligned. When the collar 74 is rotated 18 degrees counterclockwise from the “hammer drill” position to the “drill only” or “second rotational position” as shown in FIG. 7, the recesses R1, R2, R3, R4, R5 are respectively and approximately located at 18 degrees, 73 degrees, 163 degrees, 239 degrees, and 323 degrees counterclockwise from the plane 105.

As shown in the Table below and in FIGS. 8-25, the operator may continue to cycle through eighteen additional rotational positions of the collar 74, each corresponding to a different clutch setting in “screwdriver mode”, by incrementally rotating the collar 74 counterclockwise by 18 degrees each time. The first clutch setting (FIG. 8) provides a torque limit that is slightly less than the predetermined maximum value of torque output by the motor 22 available in the “hammer drill” mode or the “drill only” mode. As the clutch setting number numerically increases, the torque threshold applied to the motor 22 decreases, with the eighteenth clutch setting (shown in FIG. 25) providing the lowest torque limit to the motor 22.

As can be seen in FIGS. 5 and 7-25, and the Table below, the “hammer drill” position in FIG. 5 is the only position in which all five apertures A1-A5 are aligned with all five recesses R1-R5, thereby disabling the hammer lockout mechanism 90 as described above. In every other setting of the collar 74 and selector ring 94, no more than two of any of the apertures A1-A5 are aligned with the recesses R1-R5. Therefore, in “drill-only” mode (FIG. 7) and “screwdriver mode” (FIGS. 8-25, clutch settings 1-18), at least three balls 98 inhibit the rearward movement of the spindle 18, via the first bearing 50, thereby enabling the hammer lockout mechanism 90 and preventing axial reciprocation of the spindle 18 as it rotates.

HAMMER LOCKOUT MECHANISM 90 (FIGS. 2-25)

| Degrees of collar rotation | A1 | A2 | A3 | A4 | A5 | Balls in recesses | Mode Setting | Clutch Setting | FIG. No. |
|---|---|---|---|---|---|---|---|---|---|
| | Aperture is aligned with which recess? | | | | | | | | |
| 0 | R1 | R2 | R3 | R4 | R5 | 5 | Hammer Drill | Max Torque | 5 |
| 18 | — | — | — | — | — | 0 | Drill Only | Max Torque | 7 |
| 36 | — | — | — | — | — | 0 | Screwdriver | 1 | 8 |
| 54 | R5 | R1 | — | — | — | 2 | Screwdriver | 2 | 9 |
| 72 | — | — | — | R3 | R4 | 2 | Screwdriver | 3 | 10 |
| 90 | — | — | R2 | — | R4 | 2 | Screwdriver | 4 | 11 |
| 108 | — | R5 | — | — | — | 1 | Screwdriver | 5 | 12 |
| 126 | — | — | — | — | — | 0 | Screwdriver | 6 | 13 |
| 144 | R4 | — | R1 | — | — | 2 | Screwdriver | 7 | 14 |
| 162 | — | — | — | R2 | R3 | 2 | Screwdriver | 8 | 15 |
| 180 | — | — | | — | — | 0 | Screwdriver | 9 | 16 |
| 198 | — | R4 | R5 | — | — | 2 | Screwdriver | 10 | 17 |
| 216 | R3 | — | — | R1 | — | 2 | Screwdriver | 11 | 18 |
| 234 | — | — | — | — | — | 0 | Screwdriver | 12 | 19 |
| 252 | — | — | — | — | R2 | 1 | Screwdriver | 13 | 20 |
| 270 | — | R3 | — | R5 | — | 2 | Screwdriver | 14 | 21 |
| 288 | — | — | R4 | R5 | — | 2 | Screwdriver | 15 | 22 |
| 306 | R2 | — | — | — | R1 | 2 | Screwdriver | 16 | 23 |
| 324 | — | — | — | — | — | 0 | Screwdriver | 17 | 24 |
| 342 | — | — | — | — | — | 0 | Screwdriver | 18 | 25 |
| 360 | R1 | R2 | R3 | R4 | R5 | 5 | Hammer Drill | Max Torque | 5 |

To adjust the hammer drill 10 between “screwdriver” mode, “drill only” mode, and “hammer drill” mode, the collar 74 may be rotated a full 360 degrees and beyond in a single rotational direction, clockwise or counterclockwise, without any stops which would otherwise limit the extent to which the collar 74 may be rotated. Therefore, if the operator is using the hammer drill 10 in “screwdriver mode” on the eighteenth clutch setting (FIG. 25), the operator needs only to rotate the collar 74 counterclockwise by an additional 18 degrees to switch the hammer drill 10 into “hammer drill” mode, rather than rotating the collar 74 in an opposite (clockwise) direction back through clutch settings 17 to 1 and “drill only” mode.

A different embodiment of a hammer lockout mechanism **90*a* is shown in FIGS. 26-41. In the embodiment of FIGS. 26-41, the five apertures A1-A5 are approximately located at 0 degrees, 72 degrees, 156 degrees, 203 degrees, and 300 degrees, respectively, measured in a clockwise direction from a vertical plane 112 containing the longitudinal axis 108 of the hammer drill 10 and bisecting aperture A1**.

Figure 26:
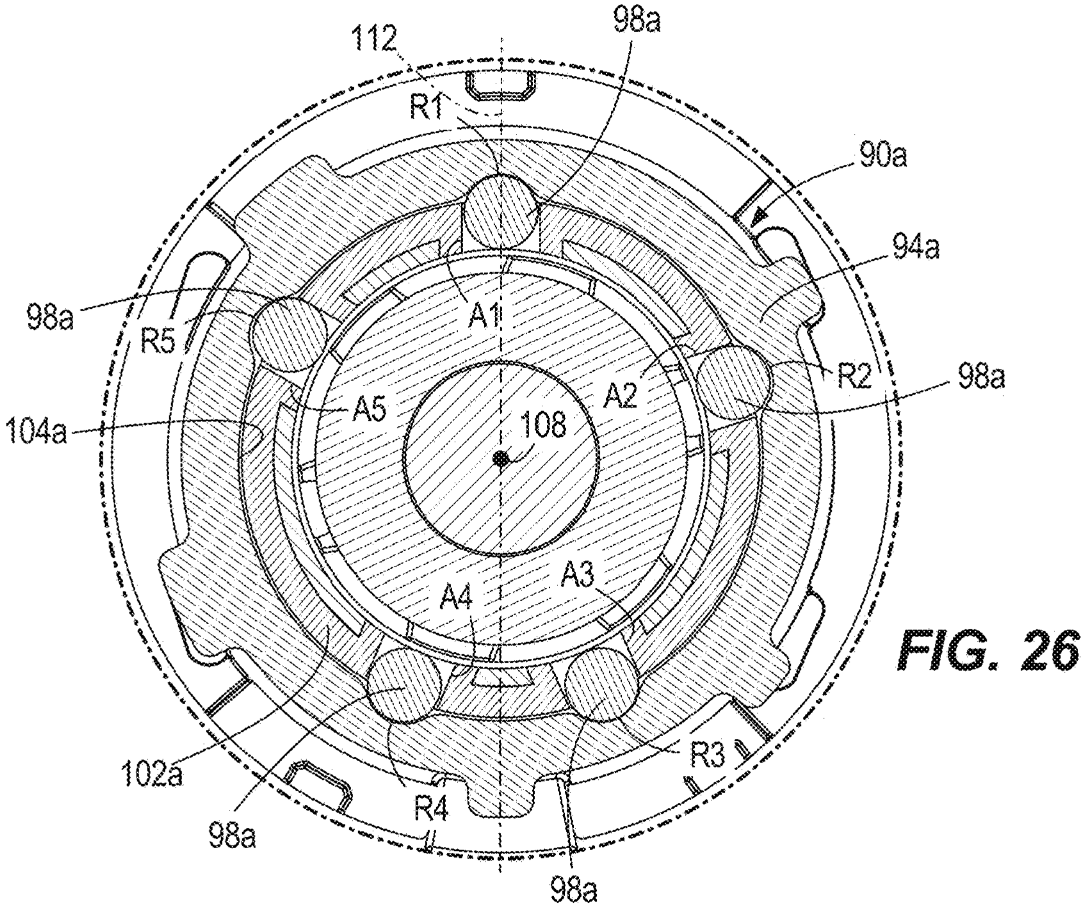
FIG. 26 is a lateral cross-sectional view of another embodiment of a hammer lock-out mechanism illustrating the hammer lock-out mechanism in a disabled mode, coinciding with a first rotational position of a collar of the hammer drill of FIG. 1.

In operation, as shown in FIG. 26 when the collar **74*a* and ring 94*a* are rotated together to a first position corresponding to a “hammer drill” mode, all five apertures A1-A5 are aligned with all five recesses R1-R5 in the selector ring 94***a*, respectively. Therefore, when the bit held by the jaws 38 contacts a workpiece, the normal force of the workpiece pushes the bit axially rearward, i.e., away from the workpiece. The axial force experienced by the tool bit is applied through the spindle 18 in a rearward direction, causing the spindle 18 to move axially rearward, thus forcing the first bearing 50 to move rearward and the edge 54 of the first bearing 50 to displace each of the balls 98*a* situated in the respective apertures A1-A5 radially outward to a “unlocking position”, in which the balls 98*a* are partially received into the recesses R1-R5, thereby disabling the hammer lockout mechanism 90*a*. Thus, the first ratchet 42 is permitted to engage with the second ratchet 46 to impart reciprocation to the spindle 18 as it rotates.

Figure 27:
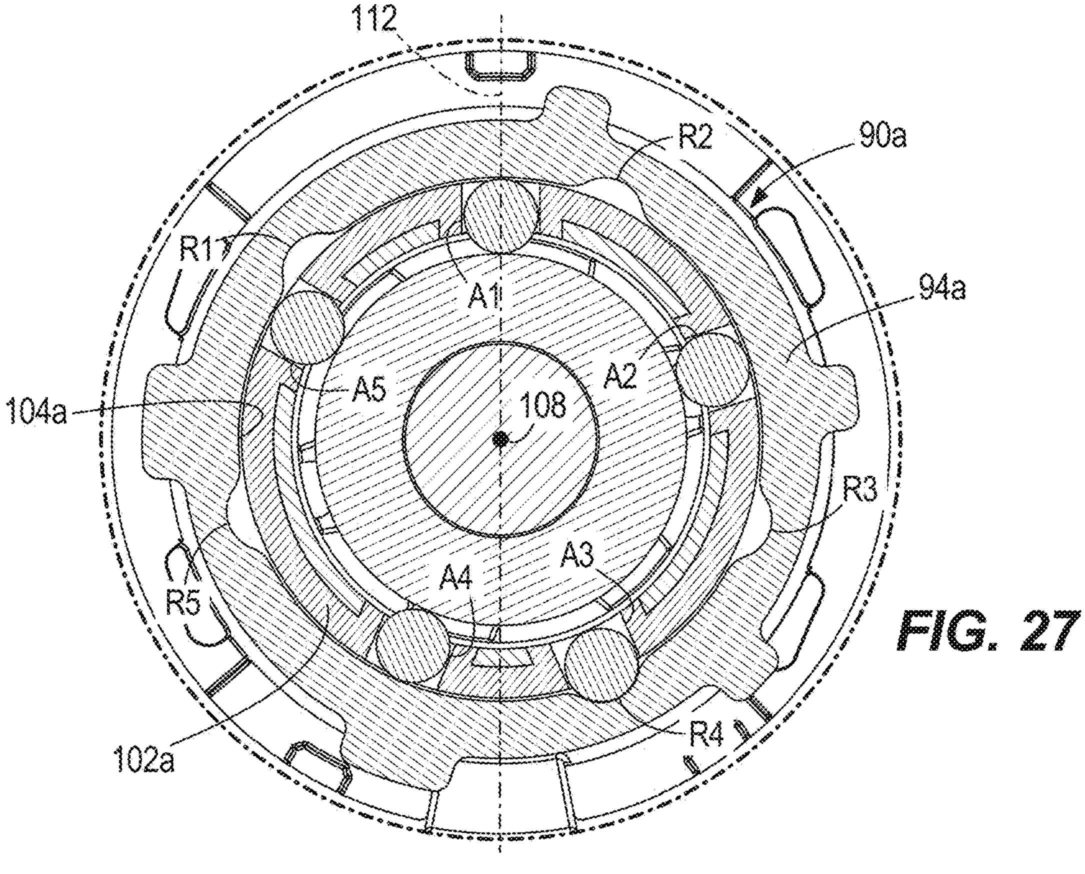
FIG. 27 is a lateral cross-sectional view of the hammer lock-out mechanism of FIG. 26 illustrating the hammer lock-out mechanism in an enabled mode, coinciding with a second rotational position of the collar.

However, when the collar 74*a* and selector ring 94*a* are rotated 36 degrees in a counterclockwise direction to the second rotational position shown in FIG. 27, only aperture A3 is aligned with the recess R4. Thus, in this second position of the collar 74*a* and selector ring 94*a*, the balls 98*a* in the respective apertures A1, A2, A4 and A5 are prevented from being radially displaced into any of the other recesses R1, R2, R3 and R5 in response to the tool bit contacting a workpiece, and the spindle 18 and bearing 50 attempting to move axially rearward. Rather, the edge 54 of the first bearing 50 presses against the balls 98*a*, which in turn abut against the inner periphery 104*a* of the selector ring 94*a* and are inhibited from displacing radially outward. In other words, the balls 98 remain in “locking positions” and each ball 98 is prevented from moving from the locking position to the unlocking position. Thus, the spindle 18 is blocked by the balls 98*a* in their locking positions, via the first bearing 50, and therefore the spindle 18 is prevented from moving rearward, maintaining a gap 110 between the first and second ratchets 42, 46. Thus, in the second rotational position of the collar 74 and the selector ring 94, the hammer lockout mechanism 90*a* is enabled, preventing the spindle 18 from reciprocating in an axial manner as it is rotated by the drive mechanism 14, operating the hammer drill 10 in a “drill only” mode.

Figure 28:
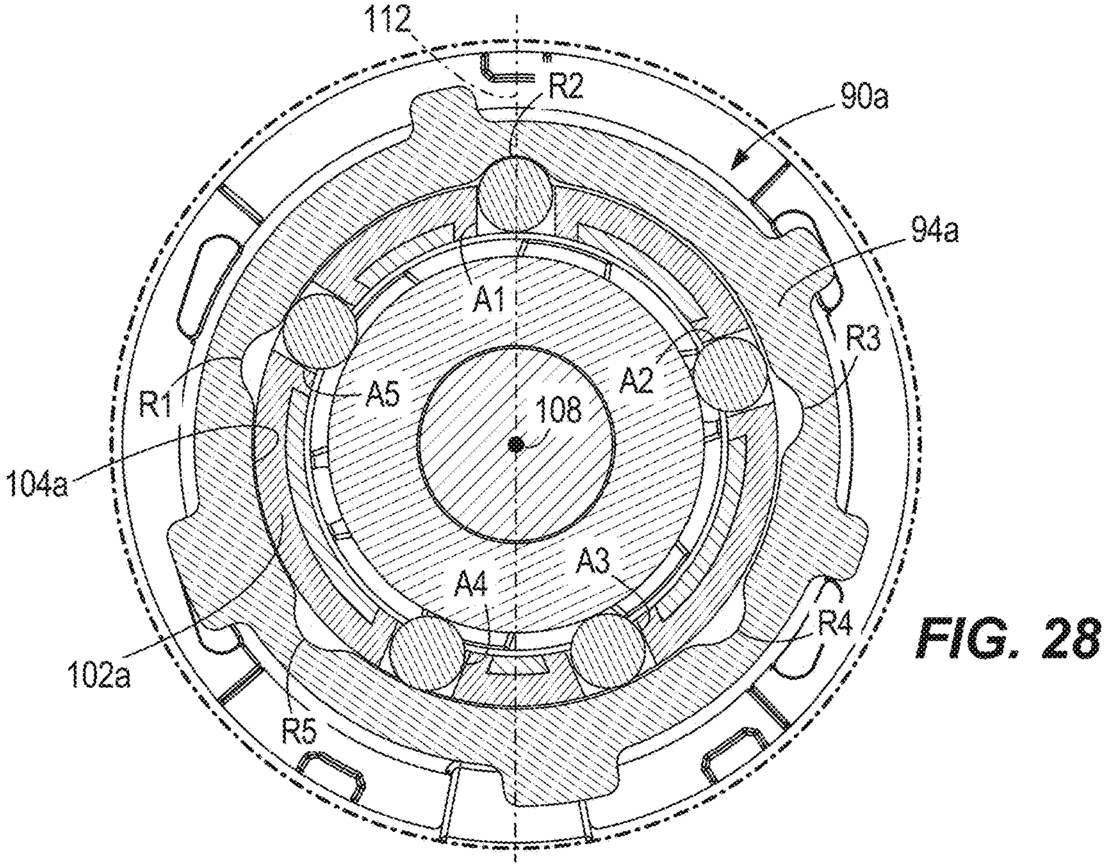
FIG. 28 is a lateral cross-sectional view of the hammer lock-out mechanism of FIG. 26 coinciding with a third rotational position of the collar.
Figure 29:
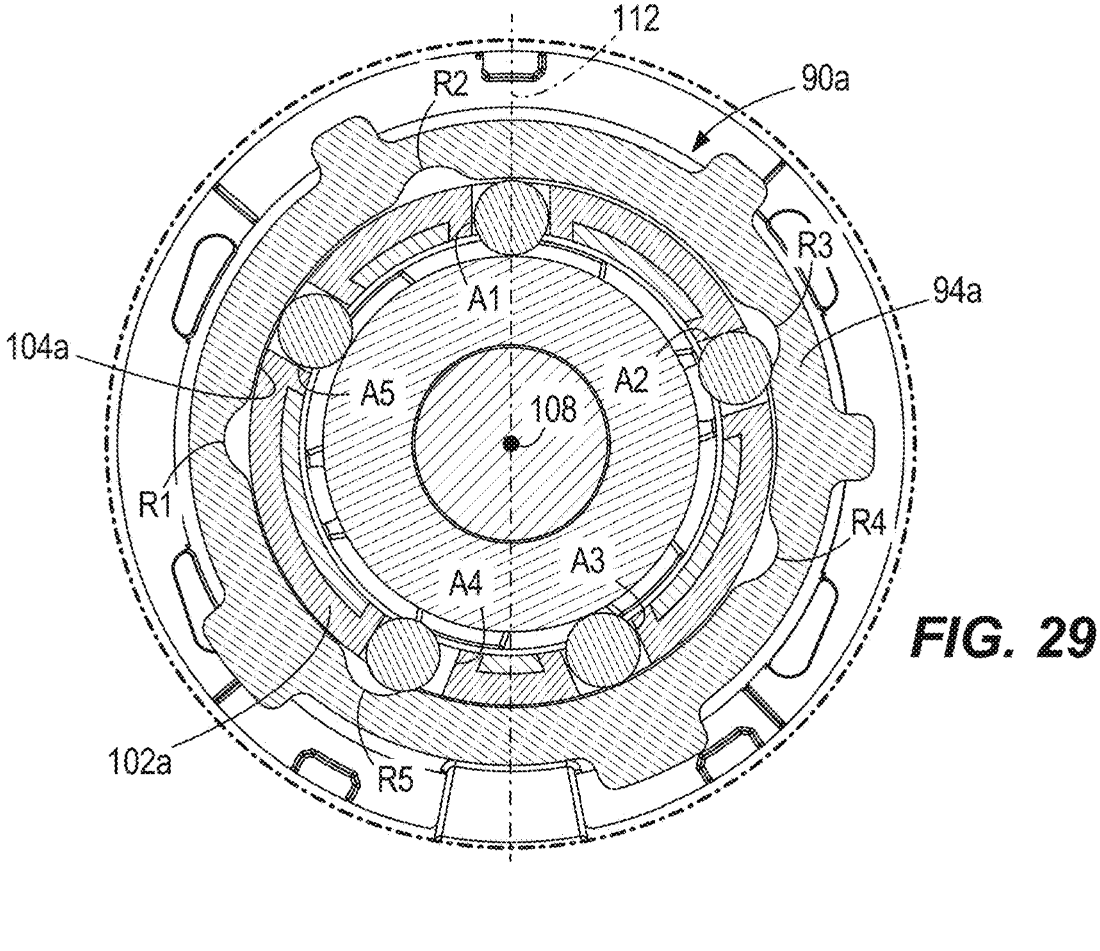
FIG. 29 is a lateral cross-sectional view of the hammer lock-out mechanism of FIG. 26 coinciding with a fourth rotational position of the collar.
Figure 30:
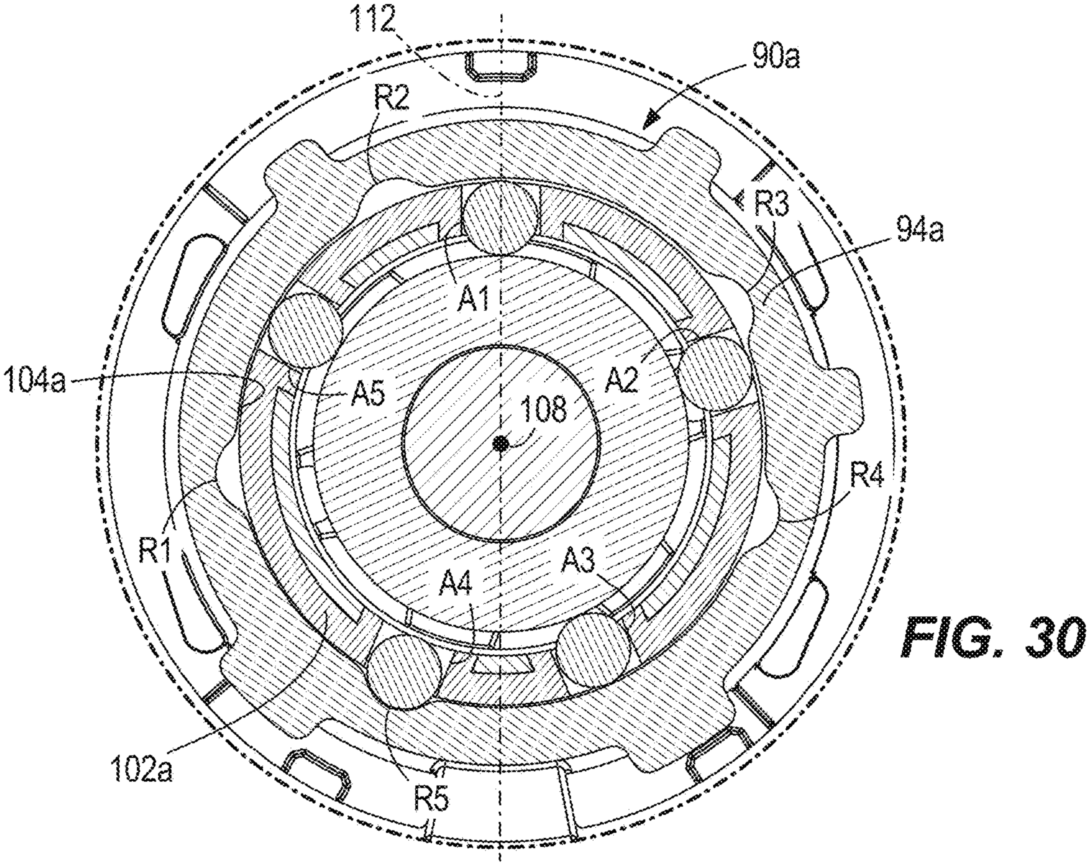
FIG. 30 is a lateral cross-sectional view of the hammer lock-out mechanism of FIG. 26 coinciding with a fifth rotational position of the collar.
Figure 31:
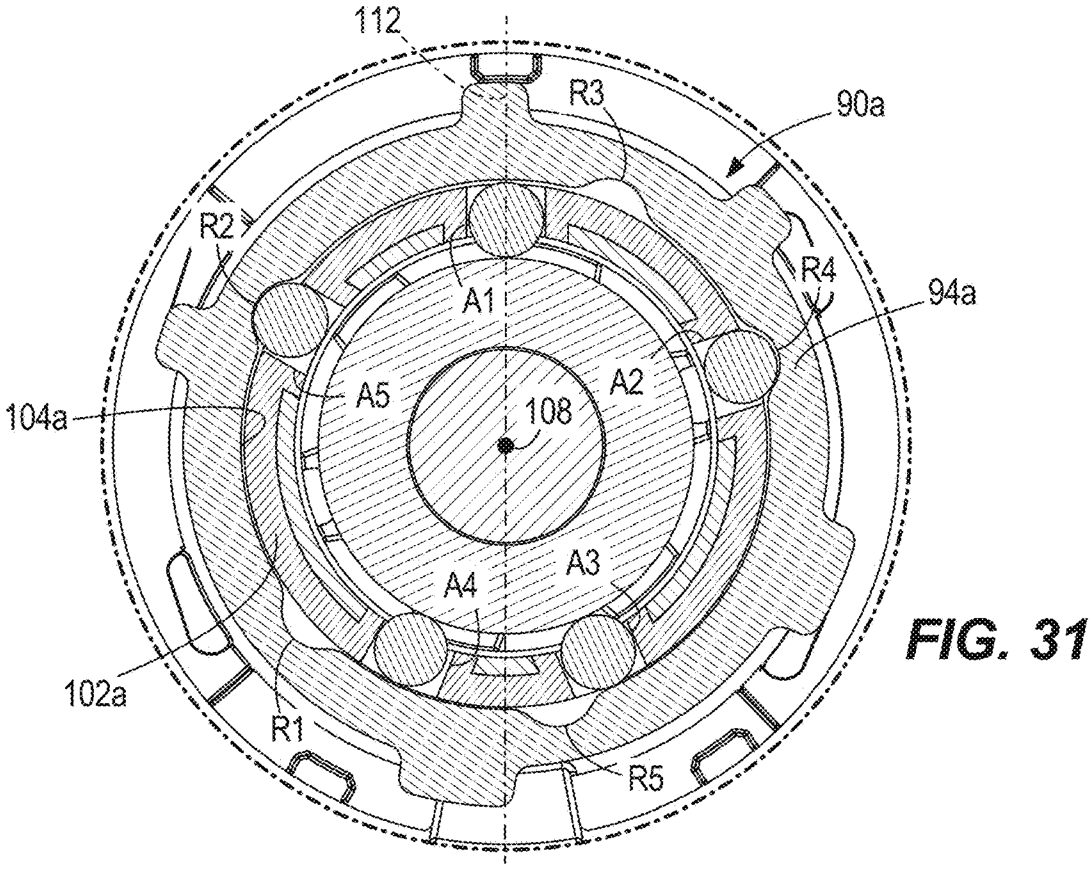
FIG. 31 is a lateral cross-sectional view of the hammer lock-out mechanism of FIG. 26 coinciding with a sixth rotational position of the collar.
Figure 32:
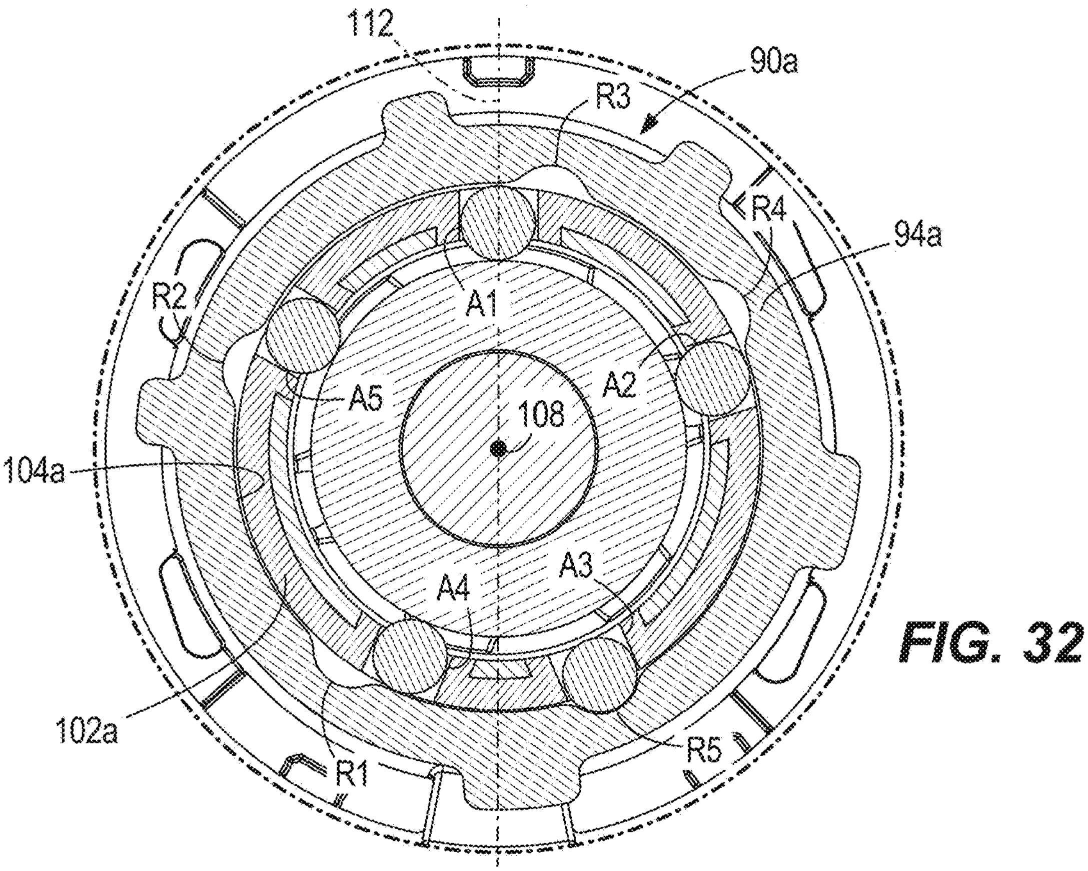
FIG. 32 is a lateral cross-sectional view of the hammer lock-out mechanism of FIG. 26 coinciding with a seventh rotational position of the collar.
Figure 33:
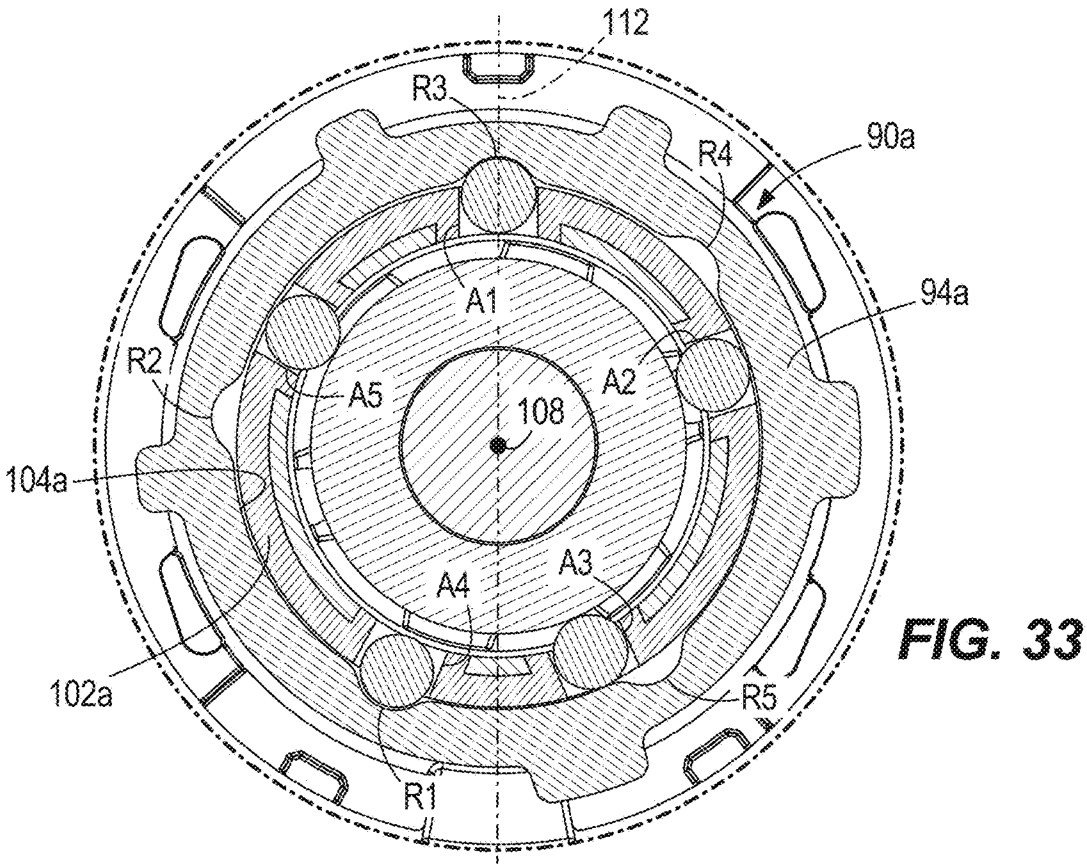
FIG. 33 is a lateral cross-sectional view of the hammer lock-out mechanism of FIG. 26 coinciding with an eighth rotational position of the collar.
Figure 34:
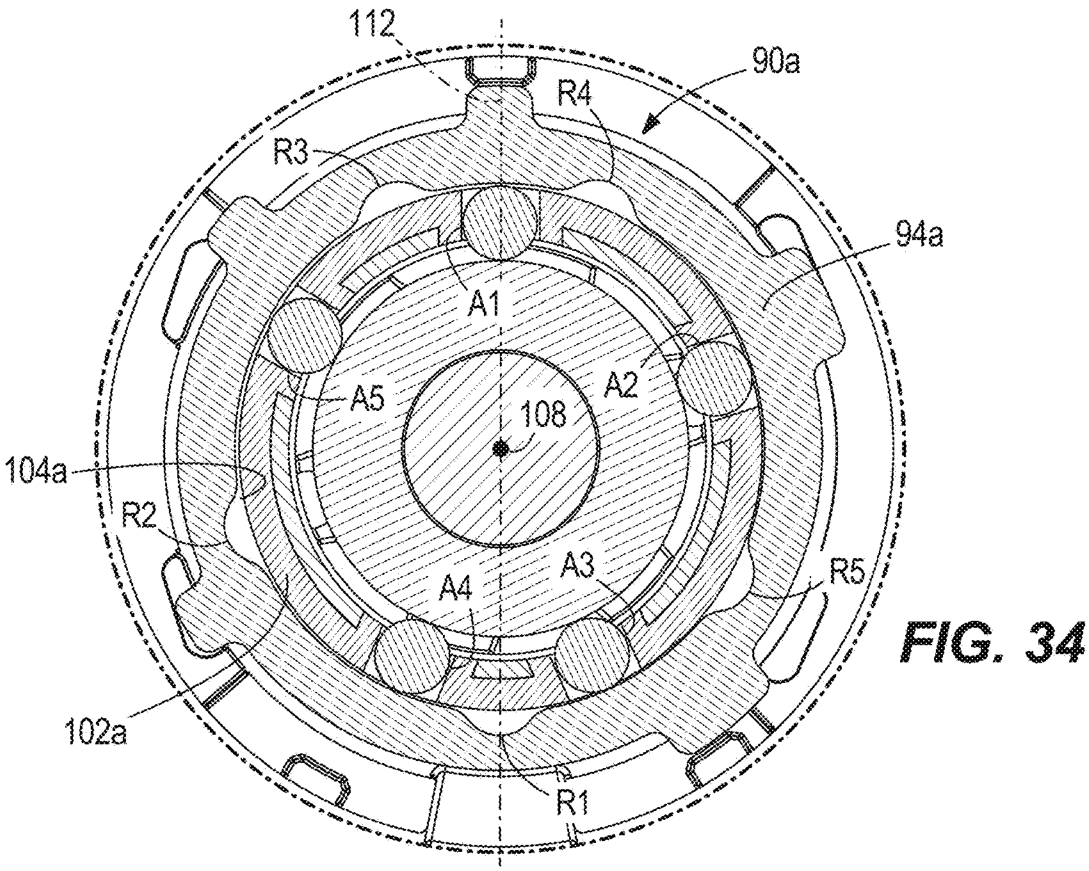
FIG. 34 is a lateral cross-sectional view of the hammer lock-out mechanism of FIG. 26 coinciding with a ninth rotational position of the collar.
Figure 35:
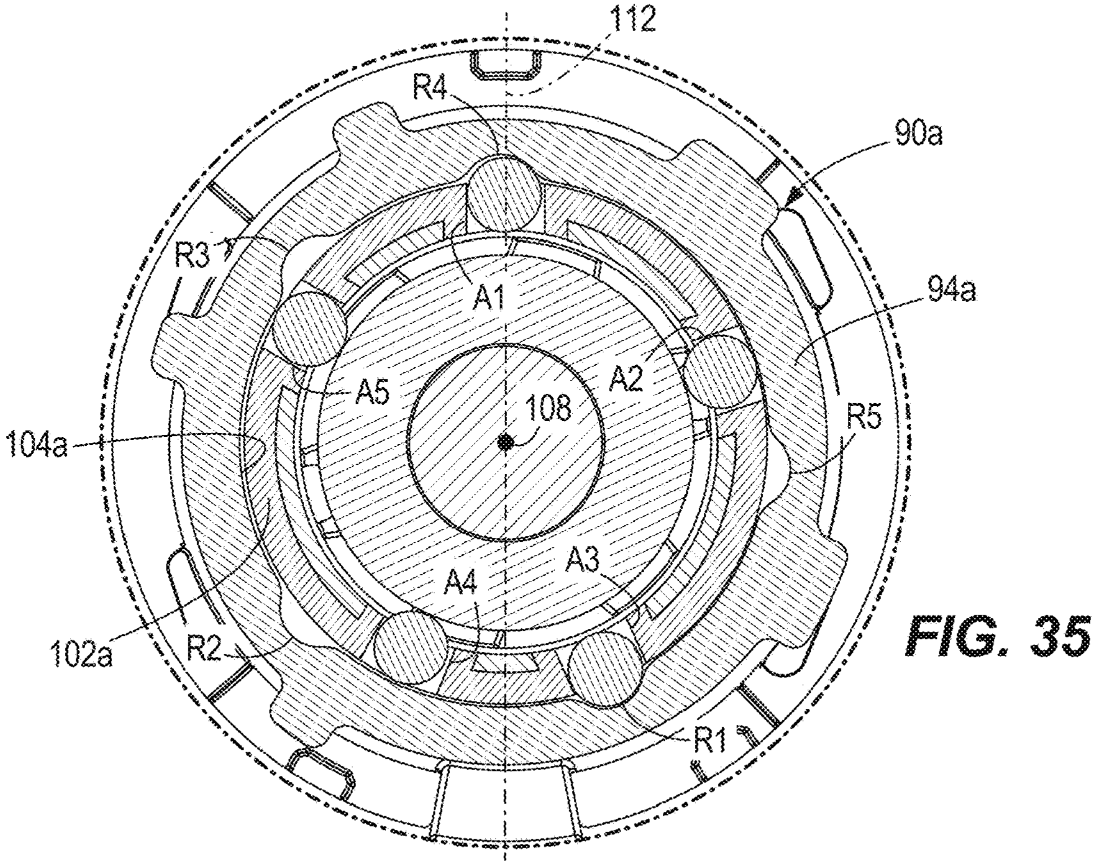
FIG. 35 is a lateral cross-sectional view of the hammer lock-out mechanism of FIG. 26 coinciding with a tenth rotational position of the collar.
Figure 36:
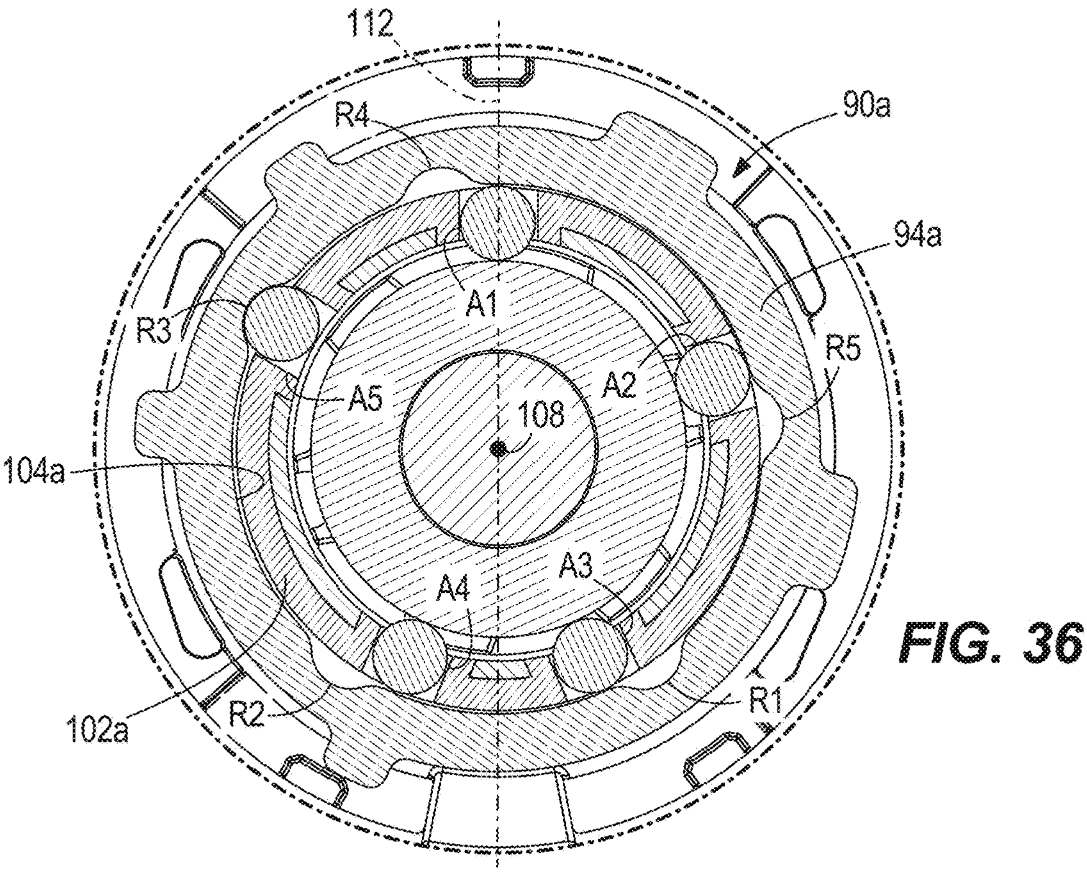
FIG. 36 is a lateral cross-sectional view of the hammer lock-out mechanism of FIG. 26 coinciding with a eleventh rotational position of the collar.
Figure 37:
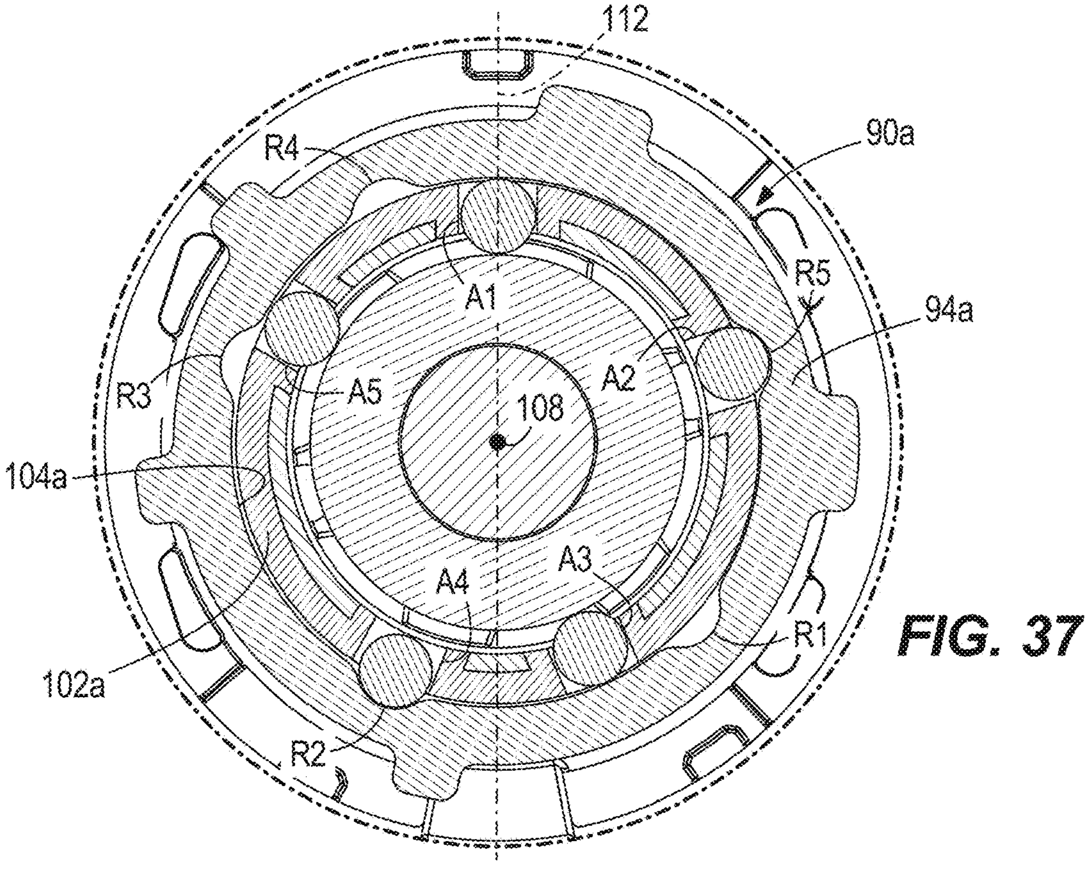
FIG. 37 is a lateral cross-sectional view of the hammer lock-out mechanism of FIG. 26 coinciding with a twelfth rotational position of the collar.
Figure 38:
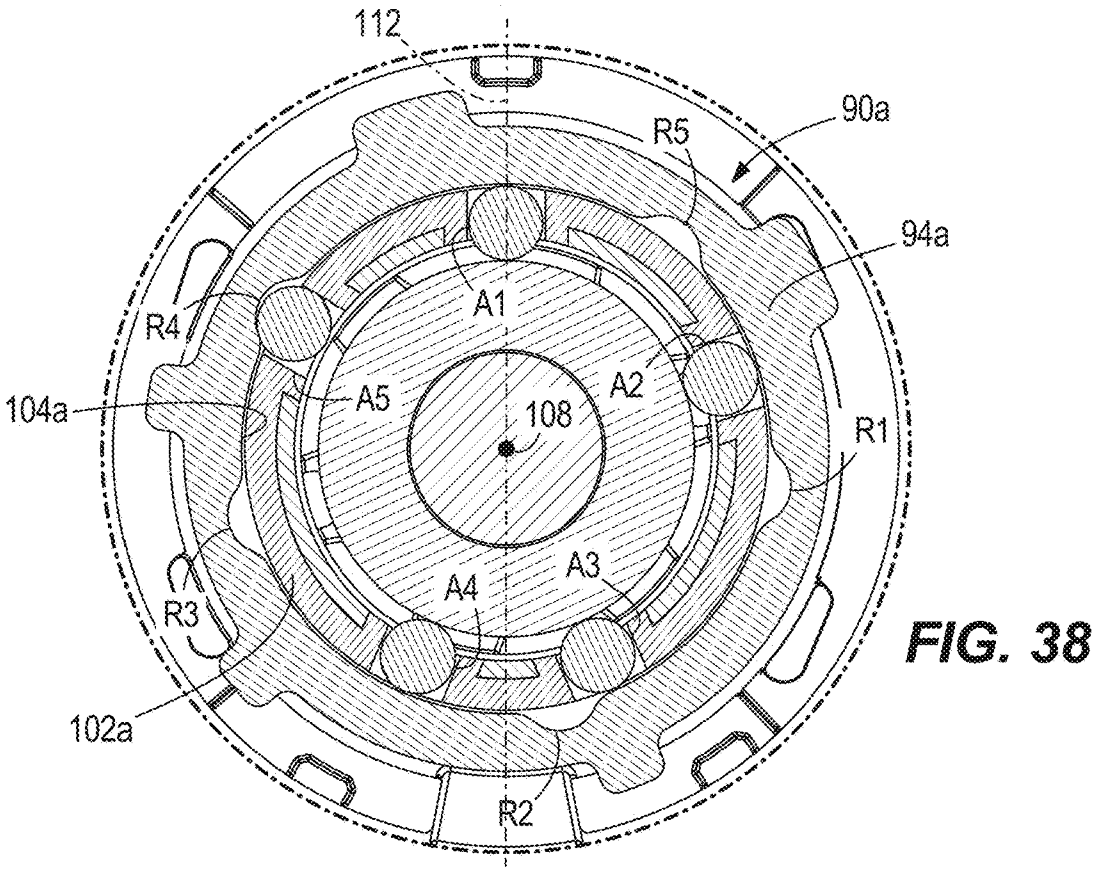
FIG. 38 is a lateral cross-sectional view of the hammer lock-out mechanism of FIG. 26 coinciding with a thirteenth rotational position of the collar.
Figure 39:
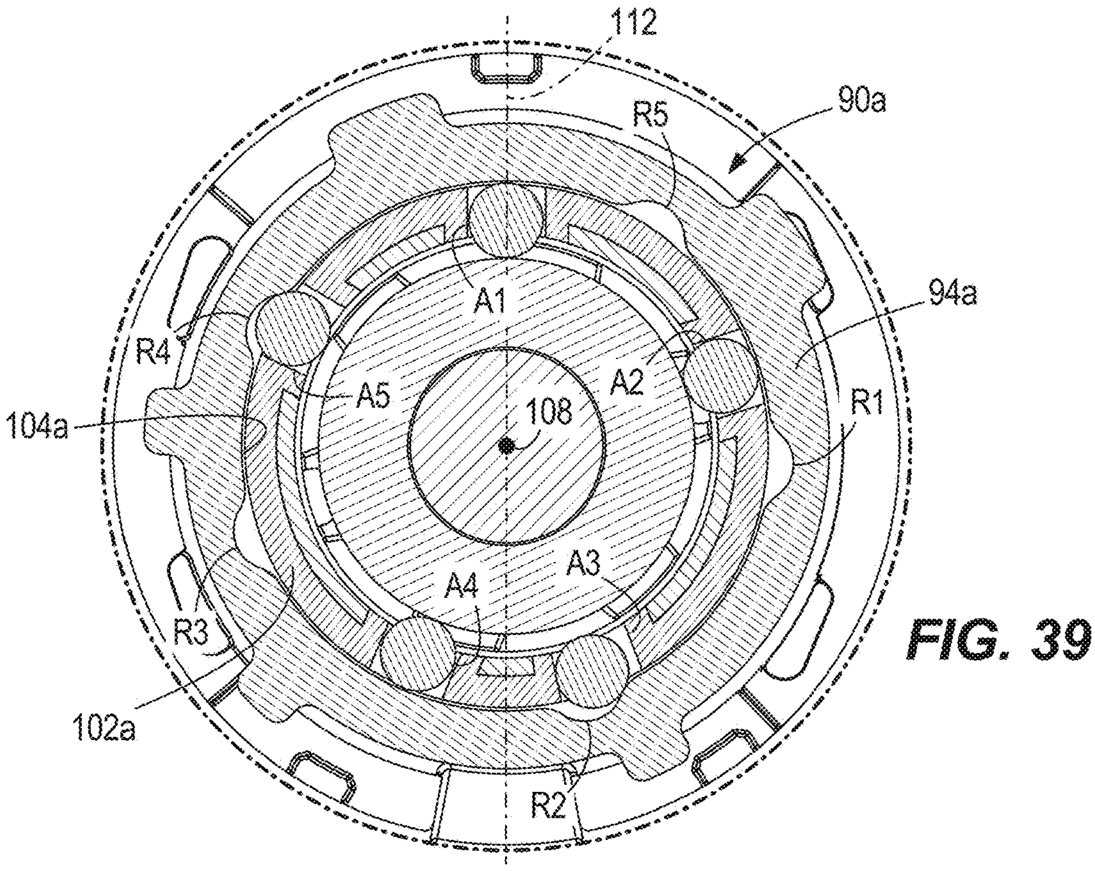
FIG. 39 is a lateral cross-sectional view of the hammer lock-out mechanism coinciding with a fourteenth rotational position of the collar.
Figure 40:
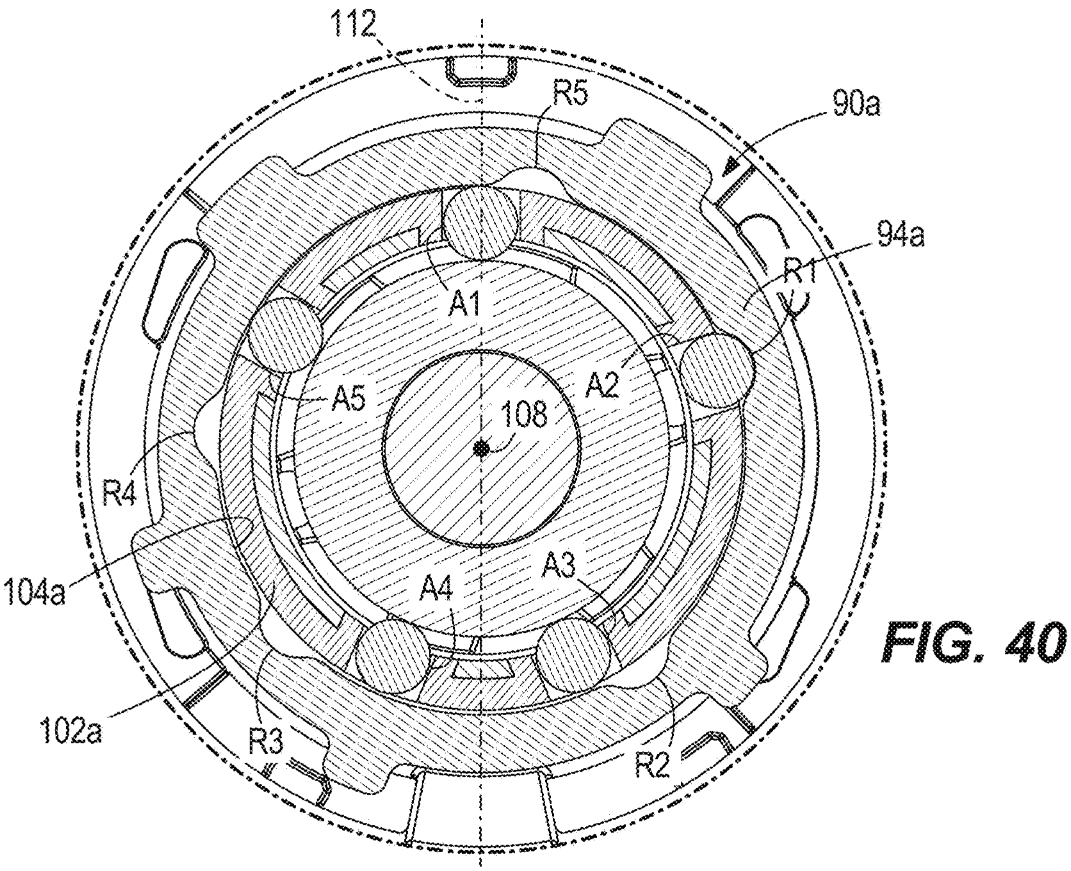
FIG. 40 is a lateral cross-sectional view of the hammer lock-out mechanism coinciding with a fifteenth rotational position of the collar.
Figure 41:
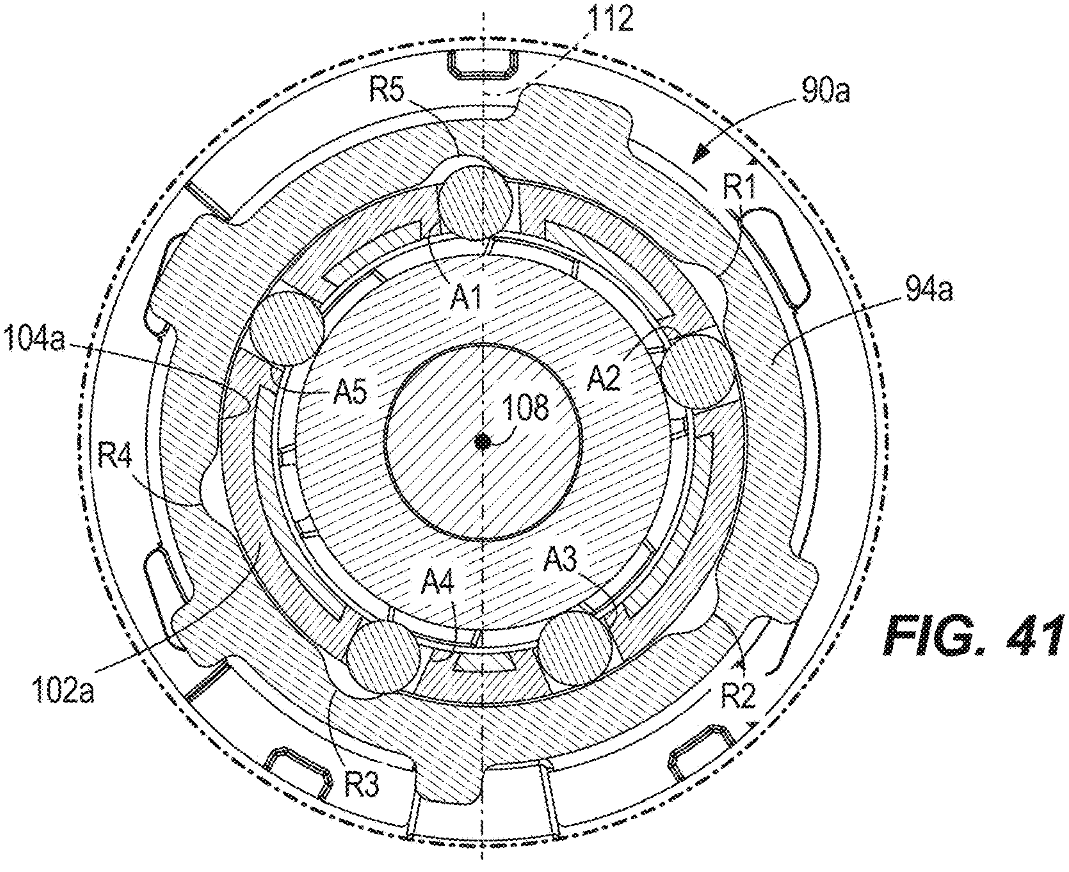
FIG. 41 is a lateral cross-sectional view of the hammer lock-out mechanism coinciding with a sixteenth rotational position of the collar.

When the collar 74*a* and selector ring 94*a* are again rotated 36 degrees in a counterclockwise direction to the third rotational position shown in FIG. 28, only aperture A1 is aligned with the recess R2. Thus, in this position of the collar 74*a* and selector ring 94*a*, the balls 98*a* in the respective apertures A2, A3, A4 and A5 are prevented from being radially displaced into any of the other recesses R1, R3, R4 and R5 in response to the spindle 18 contacting a workpiece (via the chuck 34 and an attached drill or tool bit). Thus, in the third rotational position of the collar 74*a* and the selector ring 94*a*, the hammer lockout mechanism 90*a* is enabled, preventing the spindle 18 from reciprocating in an axial manner as it is rotated by the drive mechanism 14, operating that hammer drill 10 in a “screwdriver mode” with the first clutch setting.

In the embodiment of hammer lockout mechanism 90*a* illustrated in FIGS. 26-41, there are a total of sixteen different positions between which the collar 74*a* and selector ring 94*a* can rotate. As described above, the collar 74*a* rotates 36 degrees counterclockwise from the first position (FIG. 26) to the second position (FIG. 27), and 36 degrees counterclockwise from the second position (FIG. 27) to the third position (FIG. 28). Subsequently, the collar 74*a* is incrementally rotated 18 degrees each time to incrementally switch to the fourth and through the sixteenth positions. The wiper is in electrical and sliding contact with the PCB 82 as the collar 74*a* is rotated between each of the sixteen positions. Depending upon which of the electrical pads 86 on the PCB 82 the wiper contacts, the electronic clutch 78 adjusts which clutch setting to apply to the motor 22. In the “hammer drill” mode and the “drill only” mode coinciding with the first and second rotational positions of the collar 74*a* and selector ring 94*a*, respectively, the electronic clutch 78 operates the motor 22 to output torque at a predetermined maximum value to the spindle 18. In some embodiments, the predetermined maximum value of torque output by the motor 22 may coincide with the maximum rated torque of the motor 22.

As shown in FIG. 26 and the Table below, the “hammer drill” position of the collar 74*a* corresponds to a “0 degree” or “first rotational position” position of the collar 74*a*, in which the recesses R1, R2, R3, R4, R5 of the selector ring 94*a* are respectively and approximately located at 0, 72, 156, 203 and 300 degrees clockwise from the plane 112, such that the apertures A1, A2, A3, A4, A5 are thereby aligned. When the collar 74*a* is rotated 36 degrees counterclockwise from the “hammer drill” position to the “drill only” or “second rotational position” as shown in FIG. 27, the recesses R1, R2, R3, R4, R5 are respectively and approximately located at 324 degrees, 36 degrees, 120 degrees, 167 degrees, and 264 degrees clockwise from the plane 112. When the collar 74*a* is subsequently rotated 36 degrees clockwise from the “drill only” position to the “third rotational position” corresponding to “screwdriver mode” with the first clutch setting as shown in FIG. 28, the recesses R1, R2, R3, R4, R5 are respectively and approximately located at 288 degrees, 0 degrees, 84 degrees, 131 degrees, and 228 degrees clockwise from the plane 112.

As shown in the Table below and in FIGS. 29-41, the operator may continue to cycle through thirteen additional rotational positions of the collar 74*a*, each corresponding to a different clutch setting in “screwdriver mode”, by incrementally rotating the collar 74*a* counterclockwise by 18 degrees each time. The first clutch setting (FIG. 28) provides a torque limit that is slightly less than the predetermined maximum value of torque output by the motor 22 available in the “hammer drill” mode or the “drill only” mode. As the clutch setting number numerically increases, the torque threshold applied to the motor 22 decreases, with the fourteenth clutch setting (shown in FIG. 41) providing the lowest torque limit to the motor 22. Unlike the collar 74 of hammer lockout mechanism 90 shown in FIGS. 2-25, the collar 74*a* of hammer lockout mechanism 90*a* cannot be rotated a full 360 degrees and beyond in a single rotational direction, clockwise or counterclockwise, without any stops which would otherwise limit the extent to which the collar 74*a* may be rotated. Rather, after reaching the fourteenth clutch setting shown in FIG. 41, the collar 74*a* may only be rotated back in a clockwise direction as viewed in FIGS. 26-41, cycling chronologically downward through clutch settings thirteen through one in “screwdriver mode” (FIGS. 42-28), then “drill only” (FIG. 27), then “hammer drill” (FIG. 26).

As can be seen in FIGS. 26-41, and the Table below, the “hammer drill” position in FIG. 26 is the only position in which all five apertures A1-A5 are aligned with all five recesses R1-R5, thereby disabling the hammer lockout mechanism 90*a* as described above. In every other setting of the collar 74*a* and selector ring 94*a*, no more than two of the apertures A1-A5 are aligned with the recesses R1-R5. Therefore, in “drill-only” mode (FIG. 27) and “screwdriver mode” (FIGS. 28-41, clutch settings 1-14), at least three balls 98*a* inhibit the rearward movement of the spindle 18, via the first bearing 50, thereby enabling the hammer lockout mechanism 90*a* and preventing axial reciprocation of the spindle 18 as it rotates.

HAMMER LOCKOUT MECHANISM 90a (FIGS. 26-41)

| Degrees of collar rotation | A1 | A2 | A3 | A4 | A5 | Balls in recesses | Mode Setting | Clutch Setting | FIG. No. |
|---|---|---|---|---|---|---|---|---|---|
| | Aperture is aligned with which recess? | | | | | | | | |
| 0 | R1 | R2 | R3 | R4 | R5 | 5 | Hammer Drill | Max Torque | 26 |
| 36 | — | — | R4 | — | — | 1 | Drill Only | Max Torque | 27 |
| 72 | R2 | — | — | — | — | 1 | Screwdriver | 1 | 28 |
| 90 | — | R3 | — | R5 | — | 2 | Screwdriver | 2 | 29 |
| 108 | — | — | — | R5 | — | 1 | Screwdriver | 3 | 30 |
| 126 | — | R4 | — | — | R2 | 2 | Screwdriver | 4 | 31 |
| 144 | — | — | R5 | — | — | 1 | Screwdriver | 5 | 32 |
| 162 | R3 | — | — | R1 | — | 2 | Screwdriver | 6 | 33 |
| 180 | — | — | — | — | — | 0 | Screwdriver | 7 | 34 |
| 198 | R4 | — | R1 | — | — | 2 | Screwdriver | 8 | 35 |
| 216 | — | — | — | — | R3 | 1 | Screwdriver | 9 | 36 |
| 234 | — | — | — | R2 | — | 2 | Screwdriver | 10 | 37 |
| 252 | — | — | — | — | R4 | 1 | Screwdriver | 11 | 38 |
| 270 | — | — | R2 | — | R4 | 2 | Screwdriver | 12 | 39 |
| 288 | — | R1 | — | — | — | 1 | Screwdriver | 13 | 40 |
| 306 | R5 | — | — | R3 | — | 2 | Screwdriver | 14 | 41 |

In the hammer lockout mechanism 90*a* of FIGS. 26-41, besides hammer drill mode, there is never a setting in which two adjacent apertures (e.g., A1 and A2, A3 and A4, A1 and A5) are both aligned with recesses. In other words, when the collar 74*a* is in the second-sixteenth rotational positions, an aperture that is aligned with a recess is always in between a pair of apertures that are not aligned with recesses. Thus, there are never two adjacent balls 98*a* permitted to displace radially outwards in response to the spindle 18 contacting a workpiece. In this manner, the load of the balls 98*a* which prevent rearward displacement of spindle 18 in drill mode and the fourteen settings of screwdriver mode is more evenly distributed around the circumference of the bearing 50, preventing the spindle 18 from tilting and more securely retaining the spindle 18 while it is locked out from hammer mode.

Figure 42:
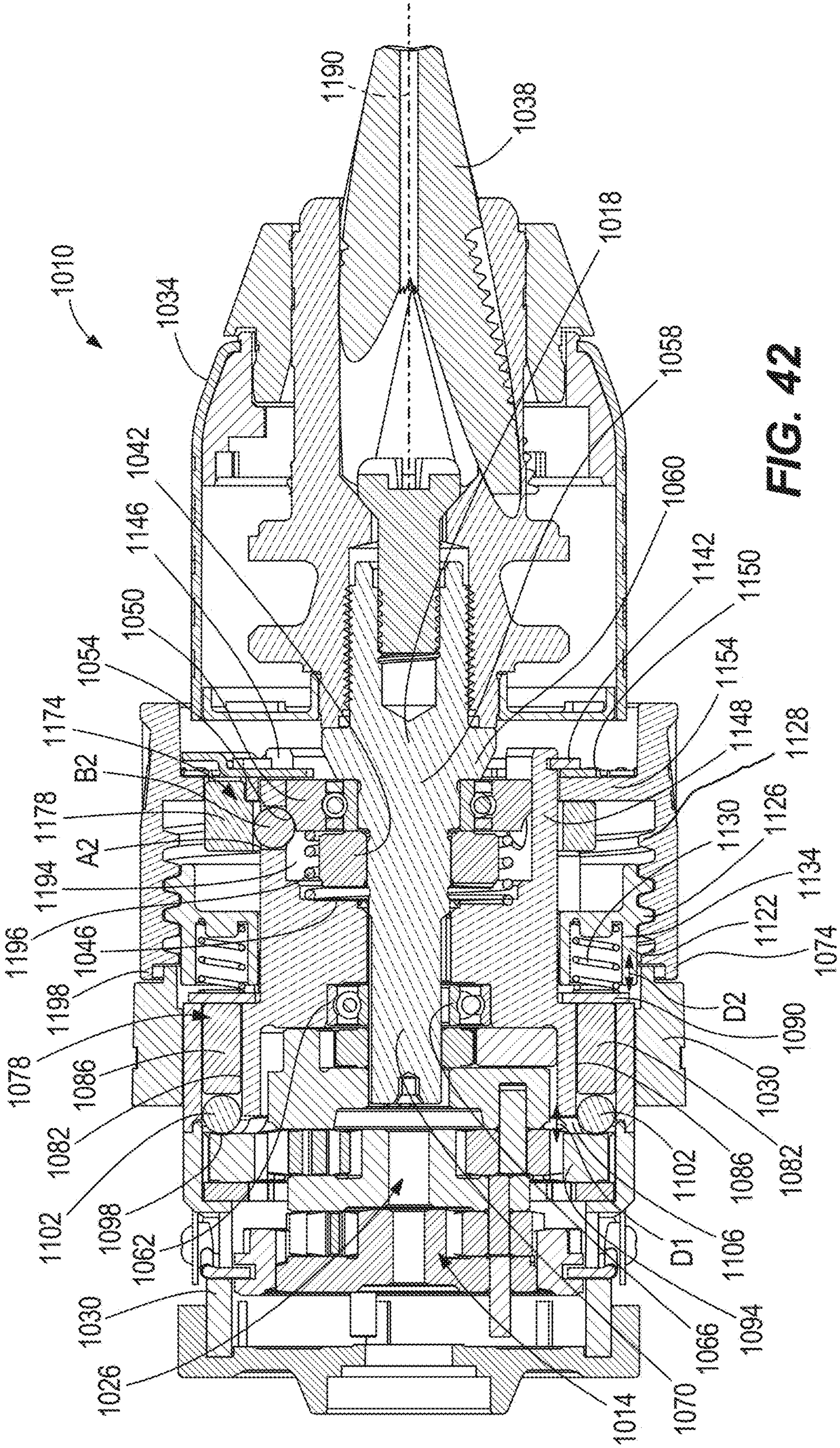
FIG. 42 is a longitudinal cross-sectional view of another embodiment of the hammer drill of FIG. 1.

In another embodiment of a hammer drill 1010 shown in FIGS. 42-50, the hammer drill 1010 includes a drive mechanism 1014 and a spindle 1018 rotatable in response to receiving torque from the drive mechanism 1014. As shown in FIG. 42, the drive mechanism 1014 includes an electric motor (not shown) and a multi-speed transmission 1026 between the motor and the spindle 1018. The drive mechanism 1014 is at least partially enclosed by a transmission housing 1030. As shown in FIG. 42, a chuck 1034 is provided at the front end of the spindle 1018 so as to be co-rotatable with the spindle 1018. The chuck 1034 includes a plurality of jaws 1038 configured to secure a tool bit or a drill bit (not shown), such that when the drive mechanism 1014 is operated, the bit can perform a rotary and/or percussive action on a fastener or workpiece. The hammer drill 1010 may be powered by an on-board power source (e.g., a battery, not shown) or a remote power source (e.g., an alternating current source) via a cord (also not shown).

Figure 44:
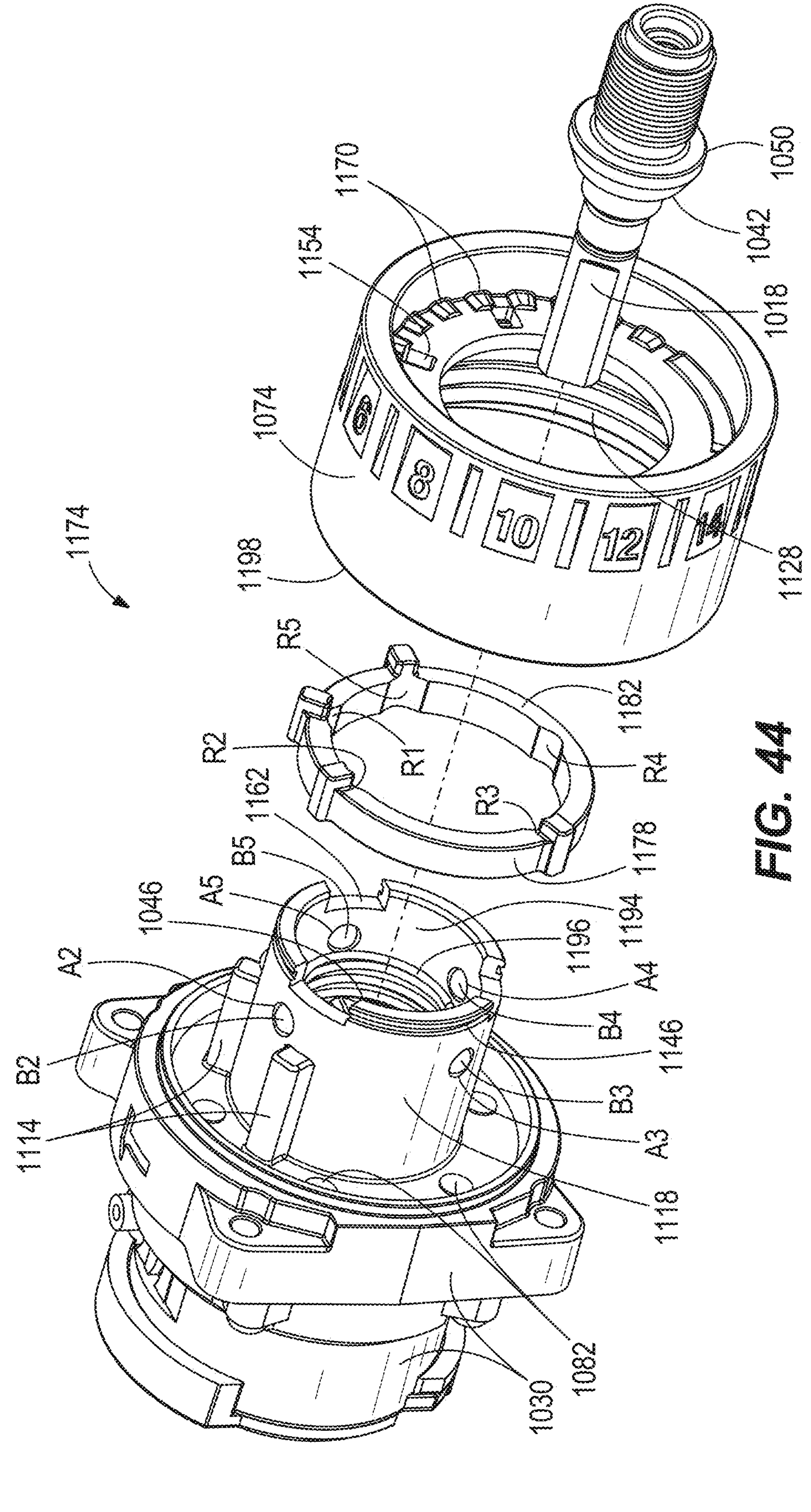
FIG. 44 is an enlarged, exploded view of a front portion of the hammer drill of FIG. 42, with portions removed.

With reference to FIGS. 42 and 44, the hammer drill 1010 includes a first ratchet 1042 coupled for co-rotation with the spindle 1018 and a second ratchet 1046 axially and rotationally fixed to the transmission housing 1030. In some embodiments, the second ratchet 1046 is rotationally fixed to the transmission housing 1030 but allowed to translate axially with respect to the transmission housing 1030. As shown in FIGS. 42, 44, 46 and 48, a first bearing 1050 with an edge 1054 is radially positioned between the transmission housing 1030 and the spindle 1018 and supports a front portion 1058 of the spindle 1018. In the illustrated embodiment, the edge 1054 is concave, but in other embodiments, the edge 1054 may be chamfered or a combination of chamfered and concave. As shown in FIGS. 42, 47 and 49, the front portion of the spindle 1018 includes a radially outward-extending shoulder 1060 adjacent to and axially in front of the bearing 1050, such that the spindle 1018 is not capable of translating axially rearwards unless the bearing 1050 also translates axially rearward. In some embodiments, the bearing 1050 is omitted and the edge 1054 is located on the spindle 1018.

Figure 46:
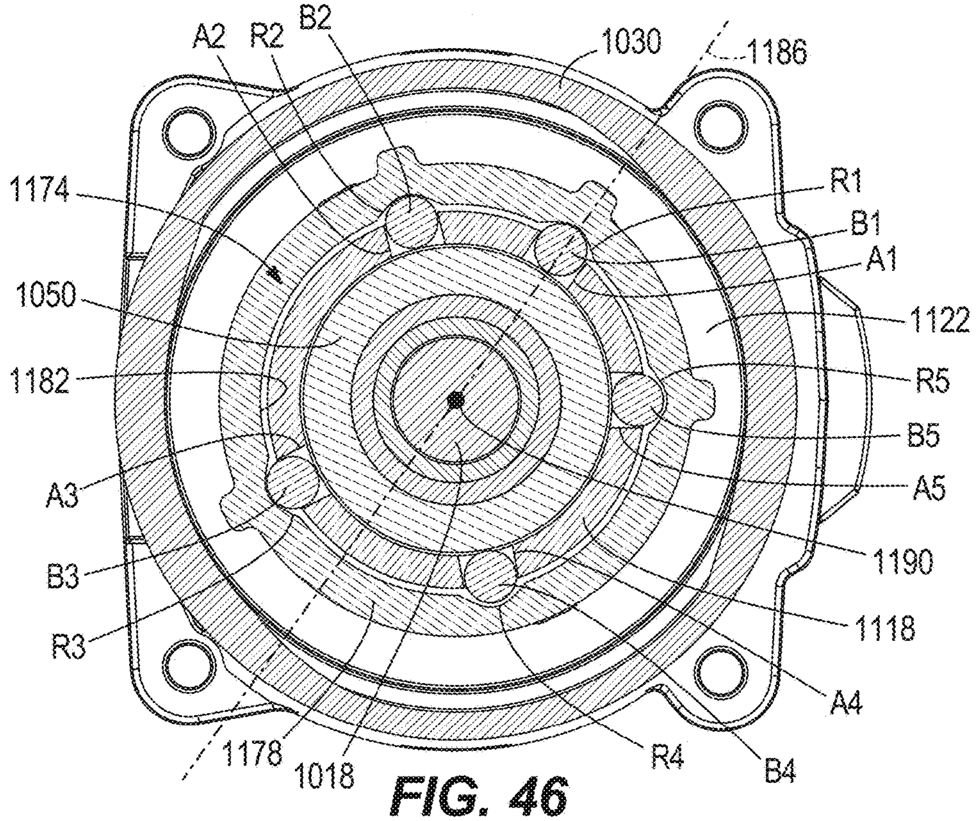
FIG. 46 is a lateral cross-sectional view of a hammer lock-out mechanism coinciding with a first rotational position of a collar of the hammer drill of FIG. 42.
Figure 47:
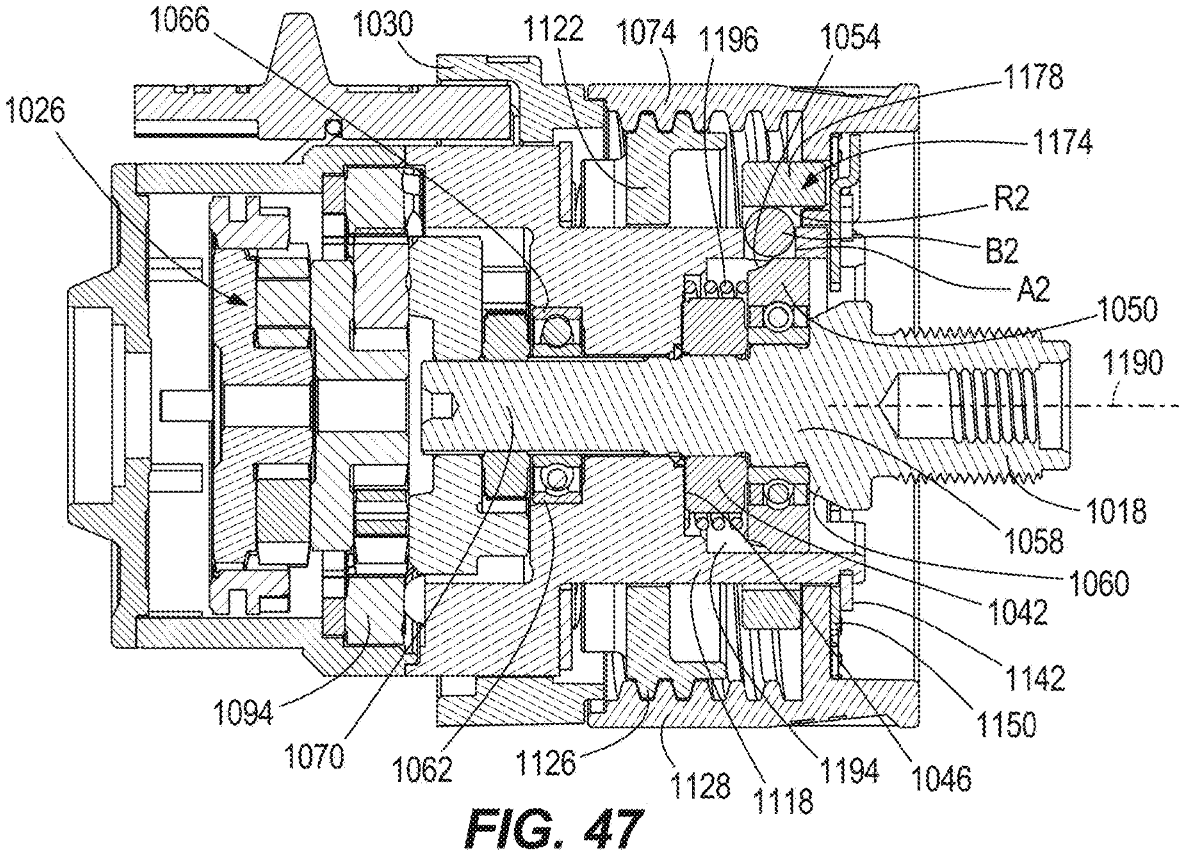
FIG. 47 is an enlarged view of the hammer drill of FIG. 42, with portions removed, illustrating the hammer lock-out mechanism in a disabled mode coinciding with the first rotational position of the collar of FIG. 46.
Figure 48:
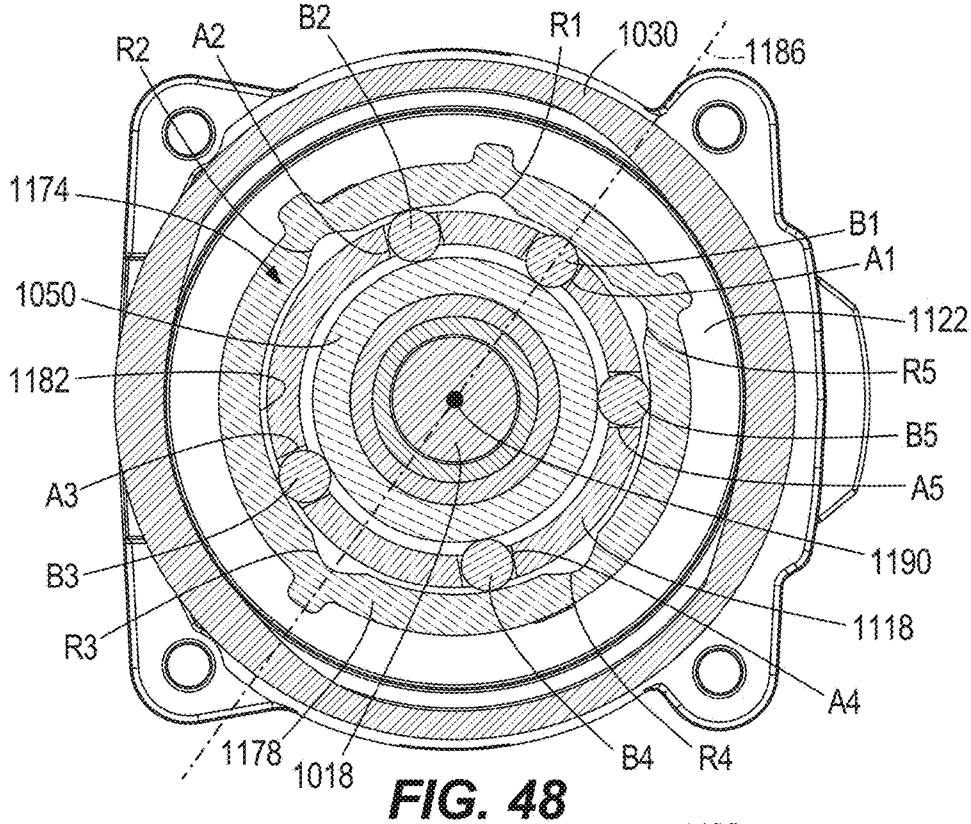
FIG. 48 is a lateral cross-sectional view of the hammer lock-out mechanism coinciding with a second rotational position of the collar of the hammer drill of FIG. 42.
Figure 49:
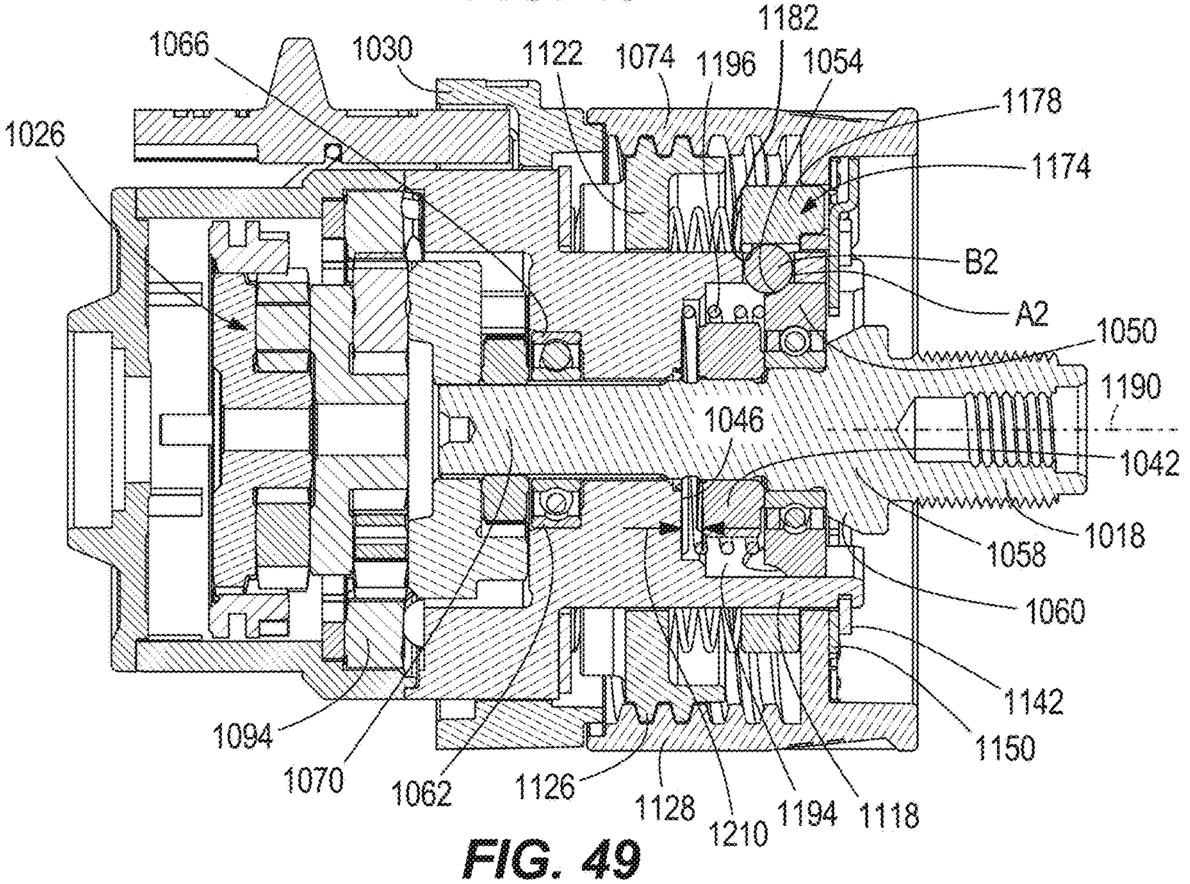
FIG. 49 is an enlarged view of the hammer drill of FIG. 42, with portions removed, illustrating the hammer lock-out mechanism in an enabled mode coinciding with the second rotational position of the collar of FIG. 48.

As shown in FIGS. 42, 46 and 48, the second ratchet 1046 includes a bearing pocket 1062 defined in a rear end of the second ratchet 1046. A second bearing 1066 is at least partially positioned in the bearing pocket 1062 and supports a rear portion 1070 of the spindle 1018. In the illustrated embodiment, the second bearing 1066 is wholly received in the bearing pocket 1062, but in other embodiments the second bearing 1066 may at least partially extend from the bearing pocket 1062. By incorporating the bearing pocket 1062 in the second ratchet 1046, the second bearing 1066 is arranged about the rear portion 1070 of the spindle 1018 in a nested relationship within the second ratchet 1046, thereby reducing the overall length of the hammer drill 1010 while also supporting rotation of the spindle 1018. In other embodiments (not shown), the second ratchet 1046 does not include a bearing pocket and the second bearing 1066 is press-fit to the transmission housing 1030.

With reference to FIGS. 42-49, the hammer drill 10 includes a collar 1074 that is rotatably adjustable by an operator of the hammer drill 1010 to shift between "hammer drill," "drill-only," and "screwdriver" modes of operation, and to select a particular clutch setting when in "screwdriver mode." Thus, the collar 1074 is conveniently provided as a single collar 1074 that can be rotated to select different operating modes of the hammer drill 1010 and different clutch settings.

Figure 43:
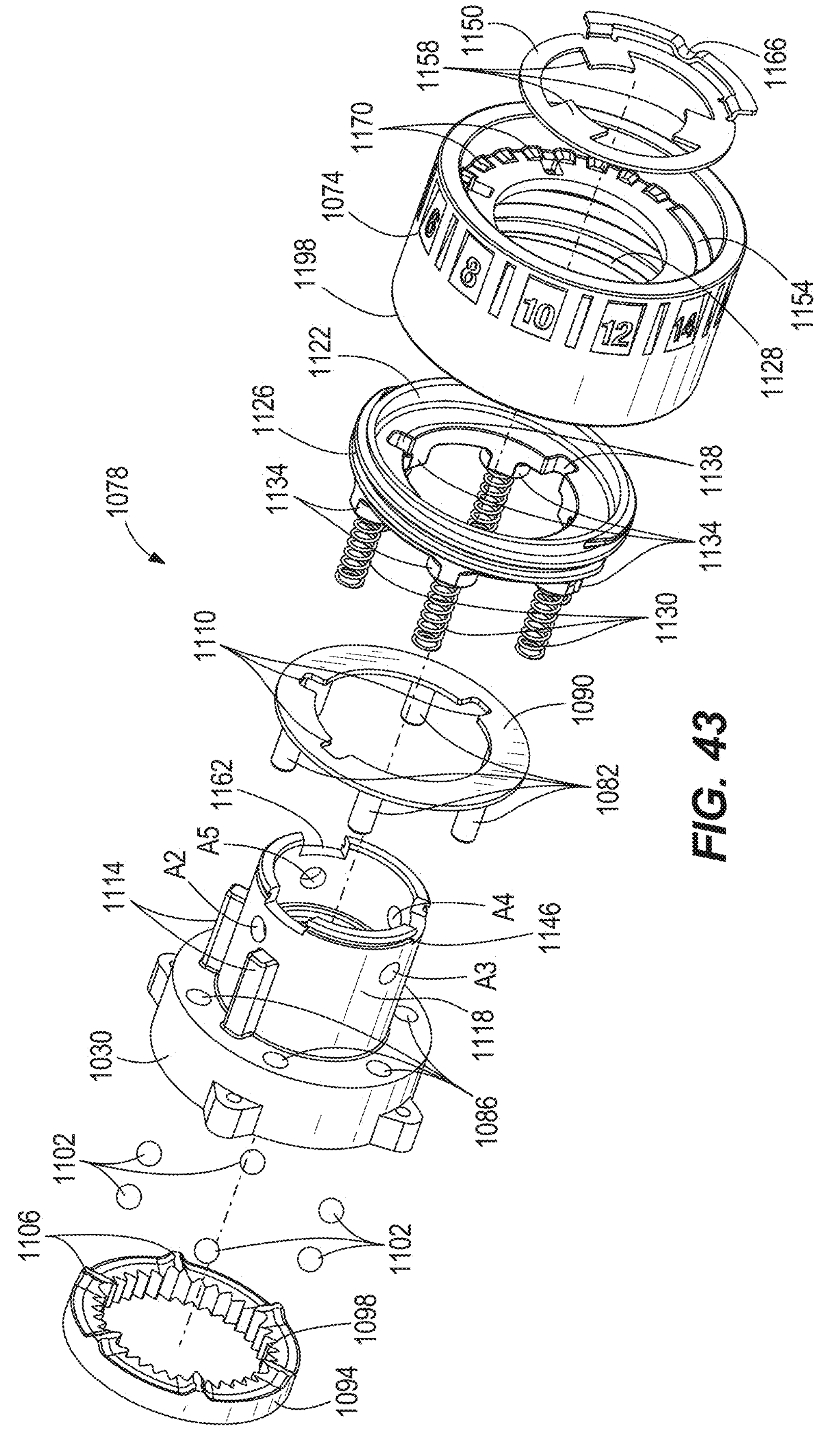
FIG. 43 is an enlarged, exploded view of a front portion of the hammer drill of FIG. 42, with portions removed.

As shown in FIGS. 42 and 43, the hammer drill 1010 includes a mechanical clutch mechanism 1078 capable of limiting the amount of torque that is transferred from the spindle 1018 to a fastener (i.e., when in "screwdriver mode"). The clutch mechanism 1078 includes a plurality of cylindrical pins 1082 received within respective apertures 1086 in the transmission housing 1030, a clutch plate 1090, a clutch face 1098 defined on an outer ring gear 1094 of the transmission 1026, and a plurality of followers, such as balls 1102, positioned between the respective pins 1082 and the clutch face 1098. The outer ring gear 1094 is positioned in the transmission housing 1030 of the drill and is part of the third planetary stage of the transmission 1026. The clutch face 1098 includes a plurality of ramps 1106 over which the balls 1102 ride when the clutch mechanism 1078 is engaged. The ramps 1106 extend an axial distance D1 from the clutch face 1098, such that the balls 1102 must be able to axially translate at least a distance of D1 away from clutch face 1098 in order to ride over the ramps 1106 and thereby clutch the hammer drill 1010. The clutch plate 1090 includes a plurality of first keyways 1110 that are received onto respective keys 1114, which extend radially outward from and axially along an annular portion 1118 of the transmission housing 1030. As such, the clutch plate 1090 is axially movable along the annular portion 1118, but is prevented from rotating with respect to the annular portion 1118.

With continued reference to FIGS. 42 and 43, the clutch mechanism 1078 further includes a retainer 1122 with a first (outer) threaded portion 1126. The first threaded portion 1126 threadably engages a second (inner) threaded portion 1128 on the collar 1074. The clutch mechanism 1078 also includes plurality of biasing members, such as compression springs 1130, that are received in respective seats 1134 on the retainer 1122. Thus, the compression springs 1130 are biased between the retainer 1122 and the clutch plate 1090. A second axial distance D2 coinciding with a gap between the clutch plate 1090 and the retainer 1122, when the hammer drill 1010 is not in operation, is shown in FIG. 42. As will be described in further detail below, the second axial distance D2 is adjustable by rotation of the collar 1074 and corresponding axial adjustment of the retainer 1122. Like the clutch plate 1090, the retainer 1122 includes a plurality of second keyways 1138 that are also received onto the respective keyways 1114. Thus, the retainer 1122 is prevented from rotating with respect to the annular portion 1118 but is allowed to slide axially along the annular portion 1118 as the clutch mechanism 1078 is adjusted by the collar 1074, as will be described in further detail below. In the illustrated embodiment there are six pins 1082, apertures 1086, balls 1102, ramps 1106, and springs 1130. However, other embodiments may include more than six or fewer than six pins, apertures, balls, ramps and springs.

With continued reference to FIGS. 42 and 43, a retaining clip 1142 is locked within a circumferential groove 1146 in the annular portion 1118. The retaining clip 1142 prevents forward axial displacement of a detent ring 1150, which is arranged between a forward portion 1154 of the collar 1074 and the retaining clip 1142. The detent ring 1150 has a plurality of protrusions 1158 that extend radially inward and are designed to fit within gaps 1162 on the annular portion 1118 of the transmission housing, thereby rotationally locking the detent ring 1150 with respect to the annular portion 1118. The detent ring 1150 also has an axially rearward-extending detent portion 1166 that is configured to selectively engage a plurality of valleys 1170 on the forward portion 1154 of the collar 1074, as will be explained in further detail below.

With reference to FIGS. 42 and 44-49, the hammer drill 1010 also includes a hammer lockout mechanism 1174 for selectively inhibiting the first and second ratchets 1042, 1046 from engaging when the hammer drill 1010 is in a "screwdriver mode" or a "drill-only mode." The hammer lockout mechanism 1174 includes a lockout ring 1178 coupled for co-rotation with and positioned inside the collar 1074, and a plurality of detents, such as balls B1, B2, B3, B4 and B5 situated within corresponding radial apertures A1, A2, A3, A4, and A5 asymmetrically positioned around the annular portion 1118 of the transmission housing 1030. As shown in FIGS. 44, 45, 46 and 48, the lockout ring 1178 includes a plurality of recesses R1, R2, R3, R4, and R5 asymmetrically positioned about an inner surface 1182 of the lockout ring 1178. The number of recesses R1-R5 corresponds to the number of apertures A1-A5 and the number of balls B1-B5 within the respective apertures A1-A5.

In the illustrated embodiment, five apertures A1-A5 containing five balls B1-B5 are located in the annular portion 1118 of the transmission housing 1030 and five recesses R1-R5 are defined in the lockout ring 1178. However, in other embodiments, the hammer lockout mechanism 1174 could employ more or fewer apertures, balls, and recesses. As shown in FIGS. 46 and 48, the five apertures A1-A5 are approximately located at 0 degrees, 55 degrees, 145 degrees, 221 degrees, and 305 degrees, respectively, measured in a counterclockwise direction from an oblique plane 1186 containing a longitudinal axis 1190 of the hammer drill 1010 and bisecting aperture A1.

Figure 45:
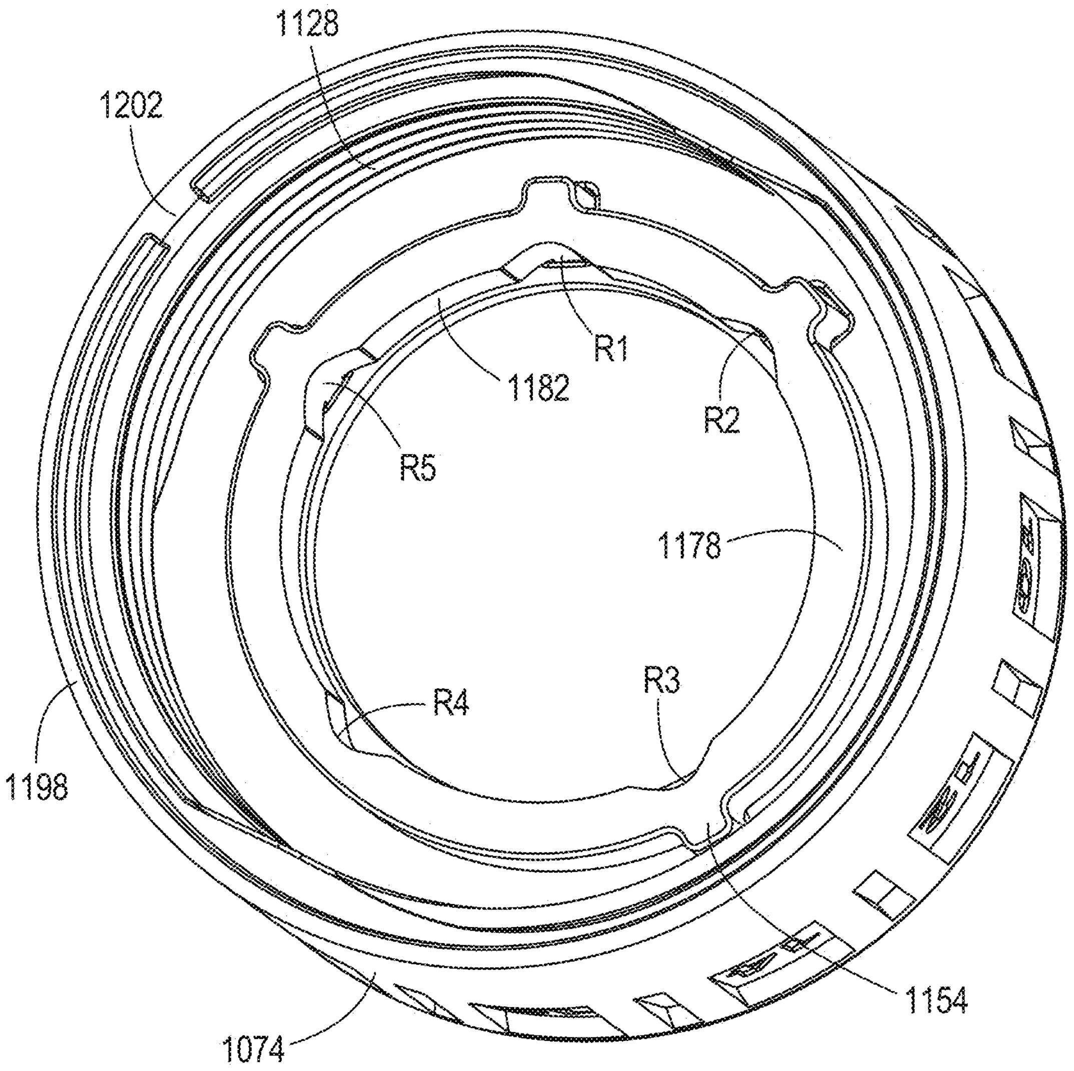
FIG. 45 is a rear perspective view of a collar and a lockout ring of the hammer drill of FIG. 42.
Figure 50:
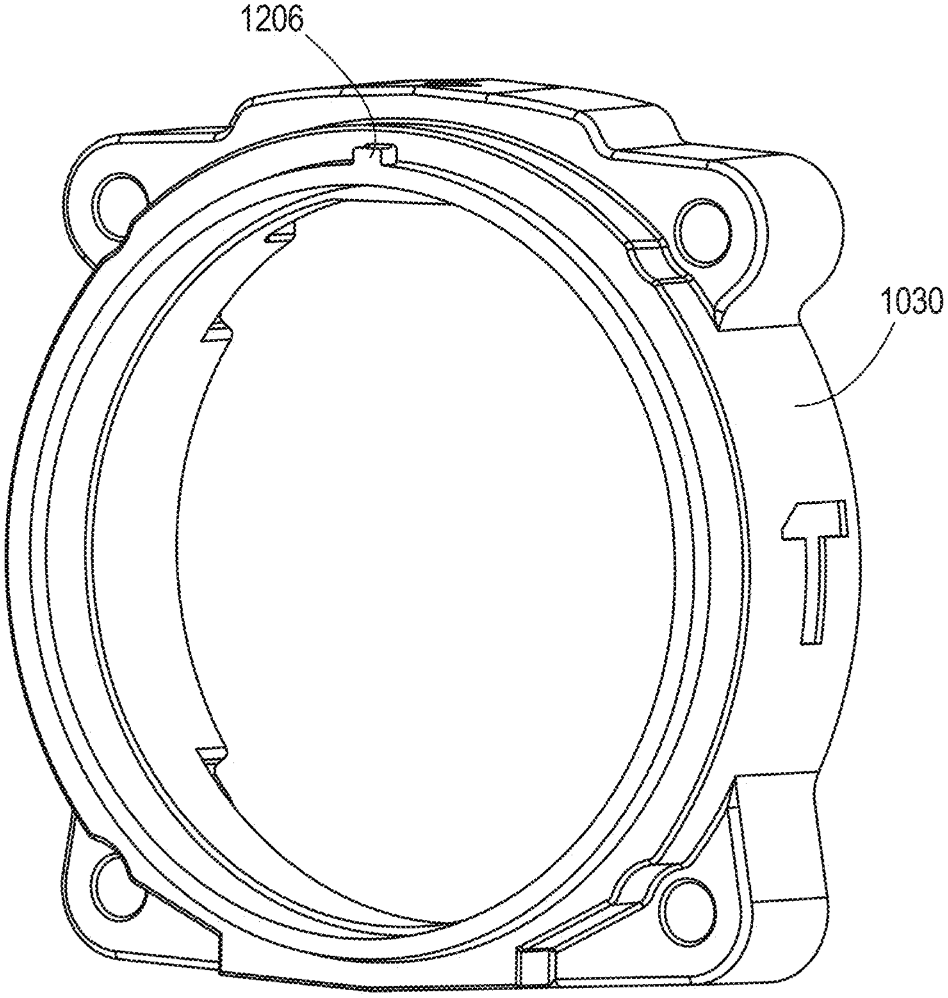
FIG. 50 is a perspective view of a portion of a transmission housing of the hammer drill of FIG. 42.

As shown in FIGS. 42, 44, 47 and 49, the first ratchet 1042 and the first bearing 1050 are set within a cylindrical cavity 1194 defined within the annular portion 1118 of the transmission housing 1030, and the lockout ring 1178 is radially arranged between the annular portion 1118 and the collar 1074, surrounding the apertures A1-A5. As shown in FIGS. 42 and 44, a lockout spring 1196 is also arranged within the cavity 1194 between the second ratchet 1046 and the first bearing 1050. The lockout spring 1196 biases the first bearing 1050 away from the second ratchet 1046. As shown in FIG. 45, a rear rim 1198 of the collar 1074 includes a first stop 1202 that extends radially inward. The first stop 1202 is configured to abut against a second stop 1206 on the transmission housing 1030, as shown in FIG. 50 and as will be explained in further detail below.

In operation, as shown in FIGS. 46 and 47, when the collar 1074 and lockout ring 1178 are rotated together to a position corresponding to a "hammer drill" mode, all five apertures A1-A5 are aligned with all five recesses R1-R5 in the lockout ring 1178, respectively. Therefore, when the bit held by the jaws 1038 contacts a workpiece, the normal force of the workpiece pushes the bit axially rearward, i.e., away from the workpiece. The axial force experienced by the tool bit is applied through the spindle 1018 in a rearward direction, causing the spindle 1018 to move axially rearward, thus forcing the first bearing 1050 to move rearward and the edge 1054 of the first bearing 1050 to displace each of the balls B1-B5 situated in the respective apertures A1-A5 radially outward to a "unlocking position", in which the balls B1-B5 are respectively partially received into the recesses R1-R5, thereby disabling the hammer lockout mechanism 1174. Thus, the first ratchet 1042 is permitted to engage with the second ratchet 1046 to impart reciprocation to the spindle 1018 as it rotates.

However, when the collar 1074 and lockout ring 1178 are incrementally rotated (e.g., by 18 degrees) in a counterclockwise direction to a second rotational position shown in FIGS. 48 and 49, none of the apertures A1-A5 are aligned with the recesses R1-R5. Thus, in this position of the collar 1074 and lockout ring 1178, the balls B1-B5 in the respective apertures A1-A5 are prevented from being radially displaced into the recesses R1-R5 in response to the tool bit contacting a workpiece and the spindle 1018 and first bearing 1050 attempting to move axially rearward. Rather, the edge 1054 of the first bearing 1050 presses against the balls B1-B5, which in turn abut against the inner surface 1182 of the lockout ring 1178 and are inhibited from displacing radially outward. In other words, the balls B1-B5 remain in "locking positions" and each ball is prevented from moving from the locking position to the unlocking position. Thus, the spindle 1018 is blocked by the balls B1-B5 in their locking positions, via the first bearing 1050, and therefore the spindle 1018 is prevented from moving rearward, maintaining a gap 1210 between the first and second ratchets 1042, 1046. Thus, in the second rotational position of the collar 1074 and the lockout ring 1178, the hammer lockout mechanism 1174 is enabled, preventing the spindle 1018 from reciprocating in an axial manner as it is rotated by the drive mechanism 1014, operating the hammer drill 1010 in a "drill only" mode.

There are a total of twenty different positions between which the collar 1074 and lockout ring 1178 can rotate, such that the collar 1074 is rotated 18 degrees between each of the positions. As the collar 1074 is rotated, the retainer 1122 axially adjusts along the annular portion 1118 via the threaded engagement between the first threaded portion 1126 of the retainer 1122 and the second threaded portion 1128 of the collar 1074. Thus, depending on which position the collar 1074 has been rotated to, the axial adjustment of the retainer 1122 adjusts the pre-load on the springs 1130, thereby increasing or decreasing the torque limit of the clutch mechanism 1078. Further, as the retainer 1122 is adjusted axially away from the clutch plate 1090, the second axial distance D2 is increased, and as the retainer 1122 is adjusted axially towards the clutch plate 1090, the second axial distance D2 is decreased. For each position the collar 1074 is rotated to, the detent portion 1166 engages one of the valleys 1170 on the forward portion 1154 of the collar 1074, thereby temporarily locking the collar 1074 in the respective rotational position.

As shown in FIG. 46 and the Table below, the "hammer drill" position of the collar 1074 corresponds to a "0 degree" or "first rotational position" position of the collar 1074, in which the recesses R1, R2, R3, R4, R5 of the lockout ring 1178 are respectively and approximately located at 0, 55, 145, 221, and 305 degrees counterclockwise from the plane 1186, such that the apertures A1, A2, A3, A4, A5 are thereby aligned. When the collar 1074 is rotated 18 degrees counterclockwise from the "hammer drill" position to the "drill only" or "second rotational position" as shown in FIG. 48, the recesses R1, R2, R3, R4, R5 are respectively and approximately located at 18 degrees, 73 degrees, 163 degrees, 239 degrees, and 323 degrees counterclockwise from the plane 1186.

As shown in FIGS. 46 and 47, in the "hammer drill" mode coinciding with the first rotational position of the collar 1074 and lockout ring 1178, respectively, the retainer 1122 is adjusted to a first axial position with respect to the transmission housing 1030. The first axial position of the retainer 1122 corresponds to a minimum value of the second axial distance D2, in which D2 is less than the first axial distance D1. In operation during "hammer drill" mode, the clutch plate 1090 is capable of being axially translated by balls 1102 and pins 1082 towards the retainer 1122 by a maximum axial distance of D2. Thus, balls 1102 are capable of axially translating a maximum distance of D2 away from clutch face 1098, but because D2 is less than D1, the balls 1102 are prevented from riding over ramps 1106, which have an axial length of D1. Thus, in "hammer drill" mode, the clutch mechanism 1078 is locked out and the motor is permitted to output torque at a maximum value to the spindle 1018. In some embodiments, the maximum value of torque output by the motor may coincide with the maximum rated torque of the motor.

As shown in FIGS. 48 and 49, in the "drill only" mode coinciding with the second rotational position of the collar 1074 and lockout ring 1178, the retainer 1122 is axially adjusted to a second axial position that is a slight axial distance away from the first axial position and the transmission housing 1030, such that there is a slight increase in the second axial distance D2 and thus a slight decrease in the preload on the springs 1130. However, in the second axial position the second axial distance D2 is still less than the first axial distance D1. Thus, the clutch mechanism 1078 is still locked-out in "drill only" mode, allowing the motor to output torque at a maximum value to the spindle 1018.

As shown in the Table below, the operator may continue to cycle through eighteen additional rotational positions of the collar 1074, each corresponding to a different clutch setting in "screwdriver mode", by incrementally rotating the collar 1074 counterclockwise by 18 degrees each time. As the clutch setting number numerically increases, the retainer 1122 moves progressively axially farther away from the first axial position, causing the pre-load on the springs 1130, and thus the torque limit of the clutch mechanism 1078, to progressively decrease, with the eighteenth clutch setting providing the lowest torque limit to the motor. In all eighteen clutch settings of "screwdriver mode", the retainer 1122 is axially far enough away from the first axial position that the second axial distance D2 is greater than the first axial distance D1. Thus, in all eighteen clutch settings of "screwdriver mode', the clutch mechanism 1078 reduces the torque output of the spindle 1018, as described below.

In operation of "screwdriver mode", torque is transferred from the electric motor, through the transmission 1026, and to the spindle 1018, during which time the outer ring gear 1094 remains stationary with respect to the transmission housing 1030 due to the pre-load exerted on the clutch face 1098 by the springs 1130, the clutch plate 1090, the pins 1082 and the balls 1102. Upon continued tightening of the fastener to a particular torque, a corresponding reaction torque is imparted to the spindle 1018, causing the rotational speed of the spindle 1018 to decrease. When the reaction torque exceeds the torque limit set by the collar 1074 and retainer 1122, the motor torque is transferred to the outer ring gear 1094, causing it to rotate with respect to the transmission housing 1030, thereby engaging the clutch mechanism 1078 and diverting the motor torque from the spindle 1018. As a result, and because the second axial distance D2 is greater than first axial distance D1, the balls 1102 are permitted to axially translate far enough away from clutch face 1098 that the balls 1102 are allowed them to ride up and down the ramps 1106 on the clutch face 1098, causing the clutch plate 1090 to reciprocate along the transmission housing 1030 against the bias of the springs 1130.

As can be seen in FIG. 46 and the Table below, the "hammer drill" position in FIG. 46 is the only position in which all five apertures A1-A5 are aligned with all five recesses R1-R5, thereby disabling the hammer lockout mechanism 1174 as described above. In every other setting of the collar 1074 and lockout ring 1178, no more than two of any of the apertures A1-A5 are aligned with the recesses R1-R5. Therefore, in "drill-only" mode (FIG. 48) and "screwdriver mode" (clutch settings 1-18), at least three of the balls B1-B5 inhibit the rearward movement of the spindle 1018, via the first bearing 1050, thereby enabling the hammer lockout mechanism 1174 and preventing axial reciprocation of the spindle 1018 as it rotates.

HAMMER LOCKOUT MECHANISM 1090 (FIGS. 42-50)

| Degrees of collar rotation | A1 | A2 | A3 | A4 | A5 | Balls in recesses | Mode Setting | Clutch Setting | FIG. No. |
|---|---|---|---|---|---|---|---|---|---|
| | Aperture is aligned with which recess? | | | | | | | | |
| 0 | R1 | R2 | R3 | R4 | R5 | 5 | Hammer Drill | Max Torque | 46 |
| 18 | — | — | — | — | — | 0 | Drill Only | Max Torque | 48 |
| 36 | — | — | — | — | — | 0 | Screwdriver | 1 | N/A |
| 54 | R5 | R1 | — | — | — | 2 | Screwdriver | 2 | N/A |
| 72 | — | — | — | R3 | R4 | 2 | Screwdriver | 3 | N/A |
| 90 | — | — | R2 | — | R4 | 2 | Screwdriver | 4 | N/A |
| 108 | — | R5 | — | — | — | 1 | Screwdriver | 5 | N/A |
| 126 | — | — | — | — | — | 0 | Screwdriver | 6 | N/A |
| 144 | R4 | — | R1 | — | — | 2 | Screwdriver | 7 | N/A |
| 162 | — | — | — | R2 | R3 | 2 | Screwdriver | 8 | N/A |
| 180 | — | — | — | — | — | 0 | Screwdriver | 9 | N/A |
| 198 | — | R4 | R5 | — | — | 2 | Screwdriver | 10 | N/A |
| 216 | R3 | — | — | R1 | — | 2 | Screwdriver | 11 | N/A |
| 234 | — | — | — | — | — | 0 | Screwdriver | 12 | N/A |
| 252 | — | — | — | — | R2 | 1 | Screwdriver | 13 | N/A |
| 270 | — | R3 | — | R5 | — | 2 | Screwdriver | 14 | N/A |
| 288 | — | — | R4 | R5 | — | 2 | Screwdriver | 15 | N/A |
| 306 | R2 | — | — | — | R1 | 2 | Screwdriver | 16 | N/A |
| 324 | — | — | — | — | — | 0 | Screwdriver | 17 | N/A |
| 342 | — | — | — | — | — | 0 | Screwdriver | 18 | N/A |

In some embodiments, the hammer drill 1010 is adjustable between "hammer drill" mode, "drill only" mode and the eighteen clutch settings of "screwdriver" mode by rotating the collar 342 degrees, but the collar is prevented from rotating a full 360 degrees because the first stop 1202 of the collar (FIG. 45) physically abuts the second stop 1206 on the transmission housing 1030 (FIG. 50). Thus, when an operator is using the hammer drill 1010 in the eighteenth clutch setting of "screwdriver" mode, but desires to set the hammer drill 1010 back to "hammer drill" mode, the operator must rotate the collar 1074 in an opposite (clockwise) direction back through clutch settings 17 to 1 and "drill only" mode before arriving at the first rotational position, which corresponds to the "hammer drill" setting (FIG. 47).

However, in other embodiments, the first and second stops 1202, 1206 are omitted, and the collar 1074 may be rotated a full 360 degrees and beyond in a single rotational direction, clockwise or counterclockwise, without any stops which would otherwise limit the extent to which the collar 1074 may be rotated. Therefore, if the operator is using the hammer drill 1010 in "screwdriver mode" on the eighteenth clutch setting, the operator needs only to rotate the collar 1074 counterclockwise by an additional 18 degrees to switch the hammer drill 1010 into "hammer drill" mode, rather than rotating the collar 1074 in an opposite (clockwise) direction back through clutch settings 17 to 1 and "drill only" mode.

Various features of the invention are set forth in the following claims.

What is claimed is:

1. A power tool comprising:

a drive mechanism including an electric motor;

a housing enclosing at least a portion of the drive mechanism;

a spindle rotatable about a longitudinal axis in response to receiving torque from the drive mechanism;

a lockout mechanism including a plurality of detents asymmetrically positioned around the longitudinal axis, each of the detents being movable between a locking position and an unlocking position; and a collar rotatably coupled to the housing, the collar including a plurality of recesses asymmetrically positioned around the longitudinal axis, wherein in the unlocking position, each of the detents is received in one of the recesses and the spindle is axially movable within the housing, and wherein in the locking position, at least one of the detents is not received in one of the recesses and axial movement of the spindle along the longitudinal axis in a direction toward the drive mechanism is prevented by the lockout mechanism.

2. The power tool of claim 1, further comprising a clutch adjustable between a first state in which a torque output of the spindle is a predetermined maximum value, and a second state in which torque output of the spindle is limited to a value less than the predetermined maximum value.

3. The power tool of claim 2, wherein the clutch is an electronic clutch.

4. The power tool of claim 3, wherein the electronic clutch comprises:

a printed circuit board having a plurality of electronic pads corresponding to different values of the torque output of the electric motor; and a wiper coupled for co-rotation with the collar, wherein the wiper is in electrical contact with the pads as the collar rotates relative to the printed circuit board.

5. The power tool of claim 3, wherein the electronic clutch includes one or more of a potentiometer, a Hall-effect sensor, and an inductive sensor.

6. The power tool of claim 2, wherein the clutch is a mechanical clutch.

7. The power tool of claim 6, further comprising a multi-stage planetary transmission having a ring gear, wherein the mechanical clutch includes a clutch face defined in the ring gear and a plurality of followers engaged with the clutch face, wherein in the first state, the followers are biased against the clutch face at a first preload value, and wherein in the second state, the followers are biased against the clutch face at a second preload value.

8. The power tool of claim 7, wherein the mechanical clutch includes a retainer in which a plurality of springs are received, each one of the springs respectively biasing one of the followers against the clutch face, and wherein movement of the collar from a first rotational position to a second rotational position moves the retainer from a first axial position to a second axial position.

9. The power tool of claim 1, wherein the collar is rotatable to a first rotational position in which all the detents are in the unlocking position.

10. The power tool of claim 9, wherein the collar is rotatable to a different, second rotational position in which at least one of the detents is in the locking position.

11. A power tool comprising:

a drive mechanism including an electric motor;

a housing enclosing at least a portion of the drive mechanism;

a spindle rotatable about a longitudinal axis in response to receiving torque from the drive mechanism;

a lockout mechanism including a plurality of detents asymmetrically positioned around the longitudinal axis; and a collar rotatably coupled to the housing and including a plurality of recesses asymmetrically positioned around the longitudinal axis, the collar movable between a first rotational position, in which all the recesses are aligned with the corresponding detents, and a second rotational position in which at least one of the detents is misaligned with one of the recesses, wherein in the first rotational position of the collar, the detents are radially displaced in response to axial movement of the spindle along the longitudinal axis in a direction towards the drive mechanism, and wherein in the second rotational position of the collar, the detents are maintained in a radially inward position to prevent axial movement of the spindle along the longitudinal axis in a direction towards the drive mechanism.

12. The power tool of claim 11, wherein the collar may be rotated more than 360 degrees in a single rotational direction.

13. The power tool of claim 12, wherein the first rotational position of the collar is the only rotational position in which each of the detents is radially displaced.

14. The power tool of claim 13, wherein in all other rotational positions of the collar besides the first rotational position, at least one of the detents is maintained in a radially inward position to prevent axial movement of the spindle along the longitudinal axis in a direction towards the drive mechanism.

15. The power tool of claim 11 further comprising a clutch adjustable between a first state in which a torque output of the spindle is a predetermined maximum value, and a second state in which torque output of the spindle is limited to a value less than the predetermined maximum value.

16. The power tool of claim 15, wherein the clutch is an electronic clutch.

17. The power tool of claim 16, wherein the electronic clutch comprises:

a printed circuit board having a plurality of electronic pads corresponding to different values of the torque output of the electric motor; and a wiper coupled for co-rotation with the collar, wherein the wiper is in electrical contact with the pads as the collar rotates relative to the printed circuit board.

18. The power tool of claim 16, wherein the electronic clutch includes one or more of a potentiometer, a Hall-effect sensor, and an inductive sensor.

19. The power tool of claim 15, wherein the clutch is a mechanical clutch.

20. The power tool of claim 19, wherein in the first rotational position the clutch is locked out thereby transferring a maximum torque developed by the motor to the spindle, and wherein in the second rotational position the clutch reduces a torque output of the spindle.

* * * * *